United States Patent
Pohl

(10) Patent No.: US 10,056,811 B2
(45) Date of Patent: Aug. 21, 2018

(54) ELECTRIC TRACTION DRIVES

(71) Applicant: Fallbrook Intellectual Property Company LLC, Cedar Park, TX (US)

(72) Inventor: Brad P. Pohl, Leander, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 6 days.

(21) Appl. No.: 15/436,471

(22) Filed: Feb. 17, 2017

(65) Prior Publication Data
US 2017/0163138 A1    Jun. 8, 2017

Related U.S. Application Data

(63) Continuation of application No. 15/053,954, filed on Feb. 25, 2016, now Pat. No. 9,574,643, which is a
(Continued)

(51) Int. Cl.
*F16H 15/50* (2006.01)
*H02K 19/16* (2006.01)
(Continued)

(52) U.S. Cl.
CPC ............ *H02K 19/16* (2013.01); *B60K 17/12* (2013.01); *B60L 11/18* (2013.01); *F16H 15/50* (2013.01);
(Continued)

(58) Field of Classification Search
CPC .................................. F16H 15/50; F16H 15/52
See application file for complete search history.

(56) References Cited

U.S. PATENT DOCUMENTS

| 719,595 A | 2/1903 | Huss |
| 971,148 A | 9/1910 | Rhodes |

(Continued)

FOREIGN PATENT DOCUMENTS

| CH | 118064 | 12/1926 |
| CN | 88102290 | 11/1988 |

(Continued)

OTHER PUBLICATIONS

Office Action dated Feb. 16, 2012 for U.S. Appl. No. 13/287,790.
(Continued)

*Primary Examiner* — Derek D Knight
(74) *Attorney, Agent, or Firm* — Knobbe Martens Olson & Bear LLP

(57) ABSTRACT

Inventive embodiments are directed to components, subassemblies, systems, and/or methods for electric traction drives employing a continuously variable transmission (CVT) having a variator provided with a plurality of tilting traction planets and opposing traction rings. In one embodiment, an electric traction drive is provided with an electromotive device configured to transfer power to or from a traction sun of a CVT. In other embodiments, an electric traction drive is provided with an electromotive device that couples to certain components of a CVT such as a traction ring, a carrier assembly, and a main axle. Various inventive shifting assemblies having shift cams and shift cam cages can be used to facilitate adjusting the transmission speed ratio of a CVT. Various related devices include embodiments of, for example, a power input apparatus, a speed ratio shifter, a shift cam actuator, a shift nut, and a carrier assembly configured to support the tilting traction planets.

19 Claims, 66 Drawing Sheets

Related U.S. Application Data continuation of application No. 13/790,667, filed on Mar. 8, 2013, now Pat. No. 9,273,760, which is a continuation of application No. 12/596,979, filed as application No. PCT/US2008/061052 on Apr. 21, 2008, now Pat. No. 8,393,989.

(60) Provisional application No. 60/913,771, filed on Apr. 24, 2007, provisional application No. 60/915,872, filed on May 3, 2007.

(51) Int. Cl.
    *B60K 17/12*     (2006.01)
    *H02K 7/116*     (2006.01)
    *B60L 11/18*     (2006.01)

(52) U.S. Cl.
    CPC .......... *H02K 7/116* (2013.01); *B60Y 2400/60* (2013.01); *B60Y 2400/72* (2013.01); *B60Y 2400/73* (2013.01)

(56) References Cited

U.S. PATENT DOCUMENTS

| | | | |
|---|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,610,666 A | 12/1926 | Farrell |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,088,599 A | 8/1937 | Johnson |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,153,252 A | 4/1939 | Hunsdorf |
| 2,191,872 A | 2/1940 | Upton |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,561,131 A | 7/1951 | Oropeza |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,885,579 A | 5/1959 | Lemp |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 2,974,547 A | 3/1961 | Joseph |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,488,533 A | 1/1970 | Pope |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,056,746 A | 11/1977 | Burtis |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |

(56) References Cited

U.S. PATENT DOCUMENTS

| | | |
|---|---|---|
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,027,023 A * | 6/1991 | Koivikko ............ H02K 7/116 310/83 |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,089,734 A | 2/1992 | Bickraj |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,260,617 A | 11/1993 | Leibowitz |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,487,438 A | 1/1996 | Kinoshita |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,833,564 A | 11/1998 | Harris |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A * | 4/2000 | Koide ............ F16H 15/38 475/3 |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,239,524 B1 | 5/2001 | Leibowitz |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,459,978 B2 | 10/2002 | Tamiguchi et al. |
| 6,461,268 B1 | 10/2002 | Milner |

(56) References Cited

U.S. PATENT DOCUMENTS

| | | |
|---|---|---|
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,558,285 B1 | 5/2003 | Sieber |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,707,190 B2 | 3/2004 | Leibowitz |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,083,545 B2 | 8/2006 | Ibamoto et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,226,379 B2 | 6/2007 | Ibamoto et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,383,749 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |

(56) References Cited

U.S. PATENT DOCUMENTS

| | | |
|---|---|---|
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2* | 11/2014 | Lohr ................. F16H 15/50 475/189 |
| 8,900,085 B2 | 12/2014 | Pohl et al. |
| 8,920,285 B2 | 12/2014 | Smithson et al. |
| 8,924,111 B2 | 12/2014 | Fuller |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,506,562 B2 | 11/2016 | Miller et al. |
| 9,528,561 B2 | 12/2016 | Nichols et al. |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,656,672 B2 | 5/2017 | Schieffelin |
| 9,677,650 B2* | 6/2017 | Nichols ................. B62M 6/55 |
| 9,878,719 B2 | 1/2018 | Carter et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0161503 A1 | 10/2002 | Joe et al. |
| 2002/0169051 A1 | 11/2002 | Oshidari |
| 2002/0179348 A1 | 12/2002 | Tamai et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0084549 A1* | 4/2006 | Smithson ............. F16H 15/28 476/40 |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |

(56) References Cited

U.S. PATENT DOCUMENTS

| | | |
|---|---|---|
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0093480 A1* | 4/2010 | Pohl .............. F02B 67/04 475/214 |
| 2010/0145573 A1 | 6/2010 | Vasilescu |
| 2010/0181130 A1 | 7/2010 | Chou |
| 2010/0267510 A1* | 10/2010 | Nichols .............. B62M 11/16 475/189 |
| 2011/0127096 A1 | 6/2011 | Schneidewind |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0337971 A1 | 12/2013 | Kostrup |
| 2014/0148303 A1 | 5/2014 | Nichols et al. |
| 2014/0206499 A1 | 7/2014 | Lohr |
| 2014/0274536 A1 | 9/2014 | Versteyhe |
| 2014/0329637 A1 | 11/2014 | Thomassy et al. |
| 2014/0335991 A1 | 11/2014 | Lohr et al. |
| 2015/0018154 A1 | 1/2015 | Thomassy |
| 2015/0051801 A1 | 2/2015 | Quinn et al. |
| 2015/0080165 A1 | 3/2015 | Pohl et al. |
| 2015/0226323 A1 | 8/2015 | Pohl et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2016/0003349 A1 | 1/2016 | Kimura et al. |
| 2016/0031526 A1 | 2/2016 | Watarai |
| 2016/0040763 A1 | 2/2016 | Nichols et al. |
| 2016/0061301 A1 | 3/2016 | Bazyn et al. |
| 2016/0131231 A1 | 5/2016 | Carter et al. |
| 2016/0146342 A1 | 5/2016 | Vasiliotis et al. |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 1054340 | 9/1991 |
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |

(56) References Cited

FOREIGN PATENT DOCUMENTS

| | | |
|---|---|---|
| JP | 44-1098 | 1/1969 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-501349 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-133896 | 6/2008 |
| JP | 2010-069005 | 4/2010 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | 200610666 | 4/2006 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 07/077502 | 7/2007 |
| WO | WO 08/078047 | 7/2008 |
| WO | WO 08/100792 | 8/2008 |
| WO | WO 10/135407 | 11/2010 |
| WO | WO 11/064572 | 6/2011 |
| WO | WO 11/101991 | 8/2011 |
| WO | WO 11/121743 | 10/2011 |

(56) References Cited

FOREIGN PATENT DOCUMENTS

| WO | WO 12/030213 | 3/2012 |
|---|---|---|
| WO | WO 13/042226 | 3/2013 |
| WO | WO 14/186732 | 11/2014 |
| WO | WO 16/062461 | 4/2016 |

OTHER PUBLICATIONS

Office Action dated Jun. 22, 2012 for U.S. Appl. No. 12/596,979.
Office Action dated Mar. 25, 2014 in U.S. Appl. No. 13/790,667.
Office Action dated Oct. 20, 2014 in U.S. Appl. No. 13/790,667.
Office Action dated Jul. 1, 2015 in U.S. Appl. No. 13/790,667.
Notification of the First Office Action dated Nov. 18, 2014 in Chinese Patent Application No. 201210470676.8.
Second Office Action dated Sep. 1, 2015 in Chinese Patent Application No. 201210470676.8.
Examination Report dated Apr. 24, 2013 in European Patent Application No. 08780555.2.
Japanese Office Action dated Feb. 5, 2013 for Japanese Patent Application No. 2010-506421.
Office Action dated Jan. 7, 2014 for Japanese Patent Application No. 2010-506421.
Decision to Grant of Patent dated Jul. 1, 2014 for Japanese Patent Application No. 2010-506421.
Office Action dated Jul. 28, 2015 in Japanese Patent Application No. 2014-154234.
Office Action dated May 31, 2016 in Japanese Patent Application No. 2014-154234.
International Search Report dated Oct. 28, 2009 for PCT Application No. PCT/US2008/061052, 21 pages.
Preliminary Notice of First Office Action dated Jan. 23, 2014 in Taiwanese Patent Application No. 097114878.
Office Action dated Jun. 22, 2016 in Taiwan Patent Application No. 103125522.
Thomassy: An Engineering Approach to Simulating Traction EHL. CVT-Hybrid International Conference Mecc/Maastricht/The Netherlands, Nov. 17-19, 2010, p. 97.
Office Action dated Jul. 5, 2016 in U.S. Appl. No. 15/053,954.
First Office Action dated Jun. 19, 2017 in Chinese Patent Application No. 201610024939.0.
Second Office Action dated Feb. 24, 2018 in Chinese Patent Application No. 201610024939.0.
Extended European Search Report dated Jun. 27, 2017 in European Patent Application No. 12199246.5.
Extended European Search Report dated Jun. 27, 2017 in European Patent Application No. 12199298.6.

\* cited by examiner

DETAIL A

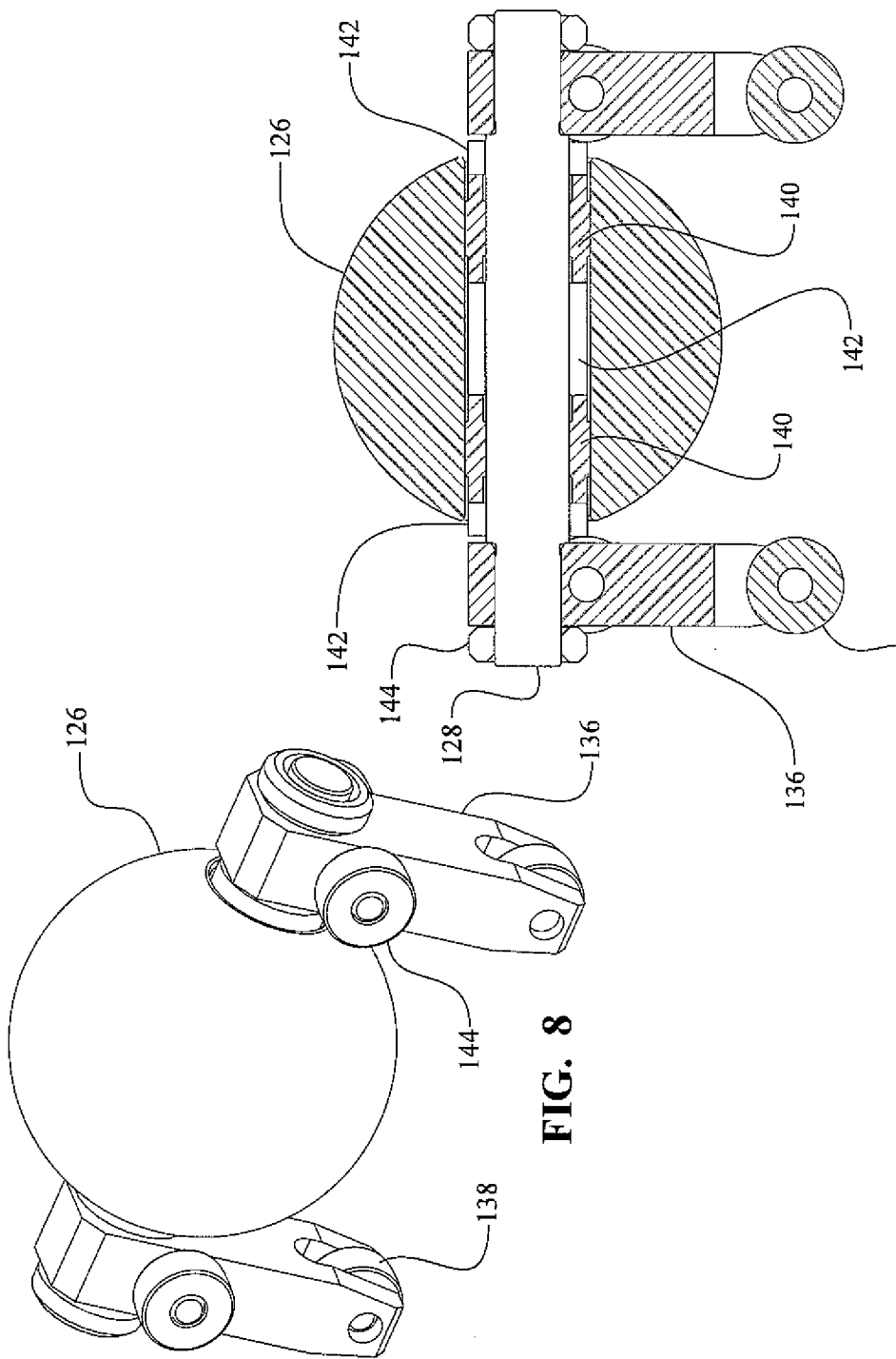

DETAIL B

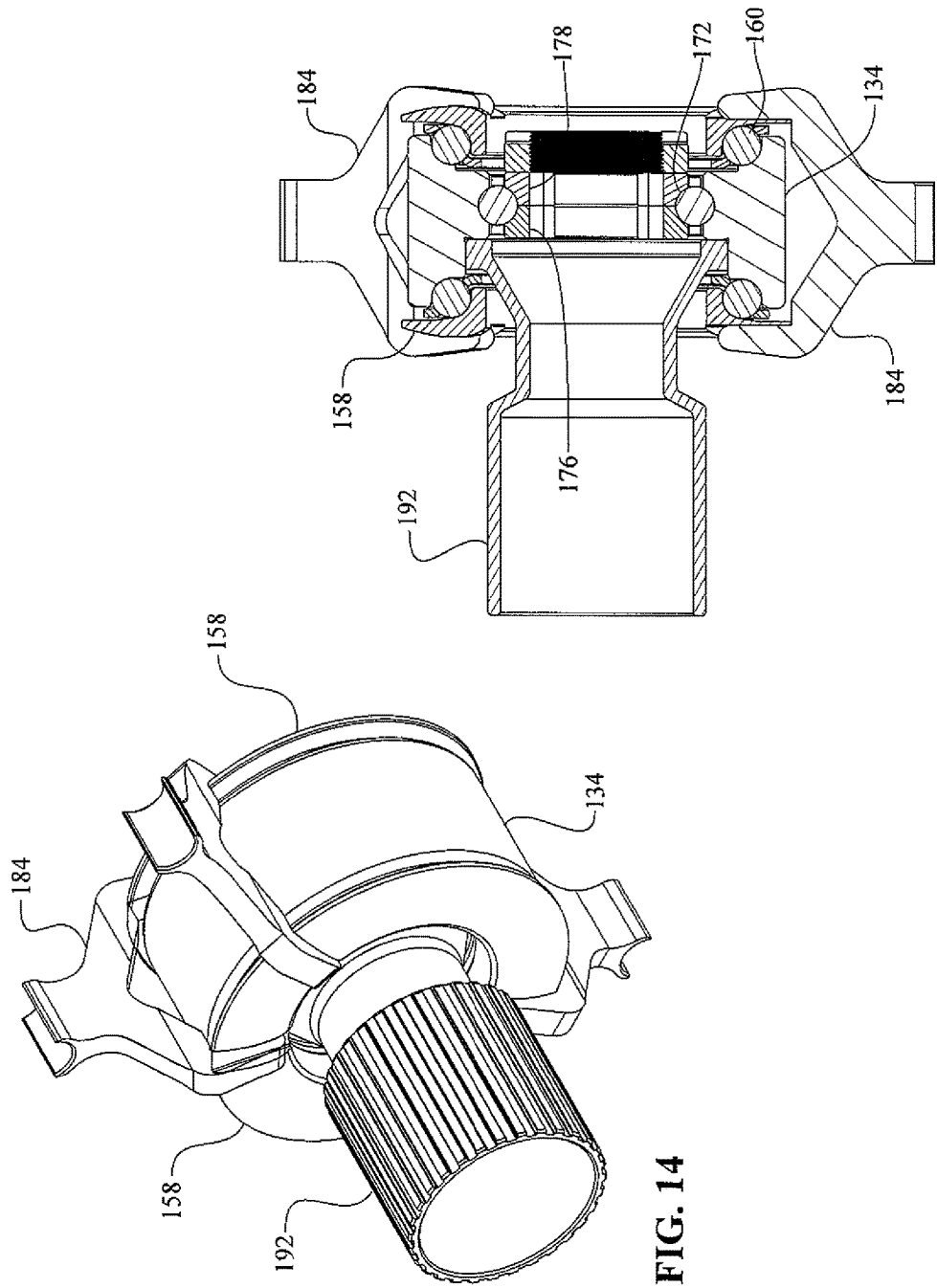

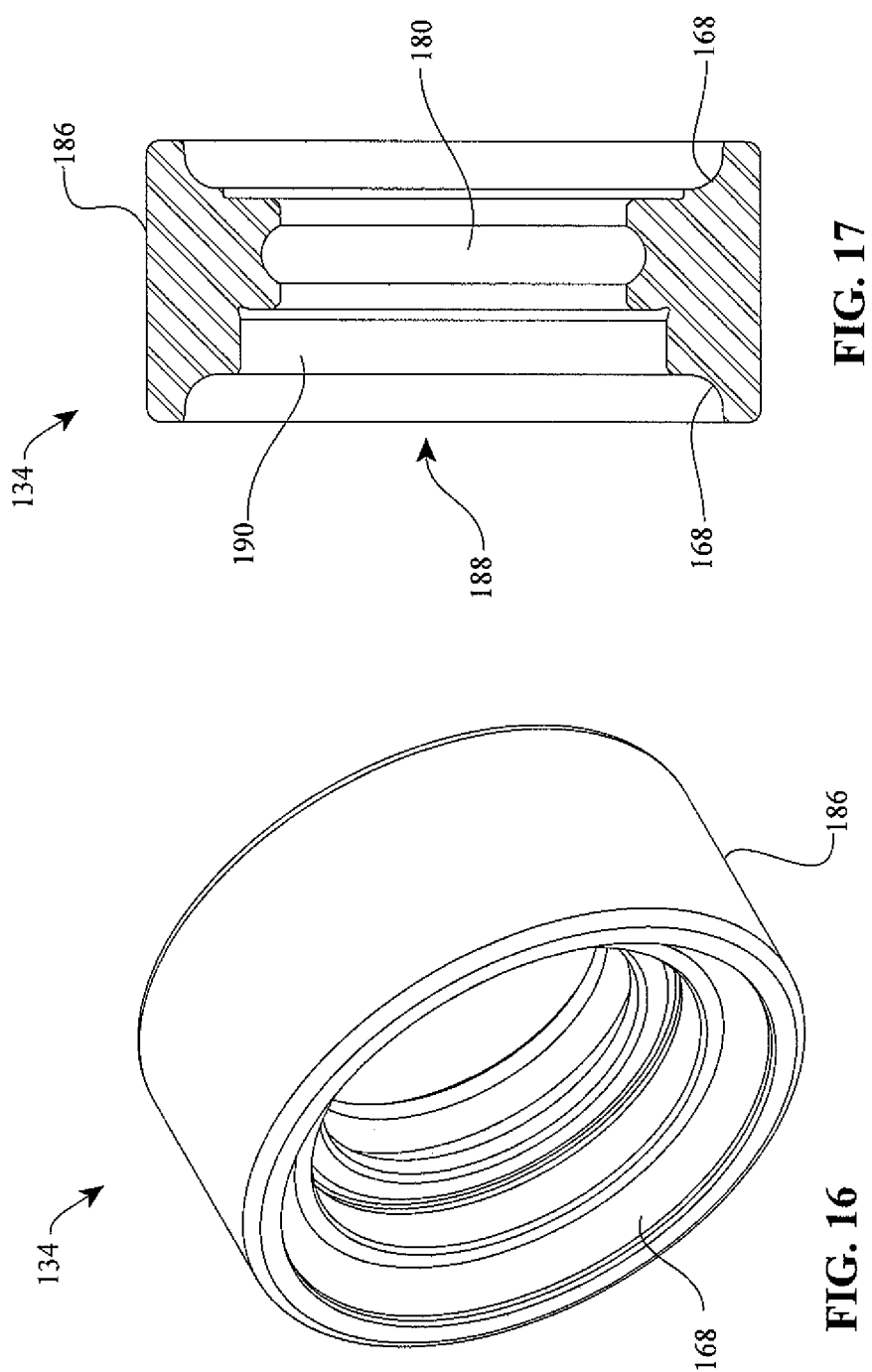

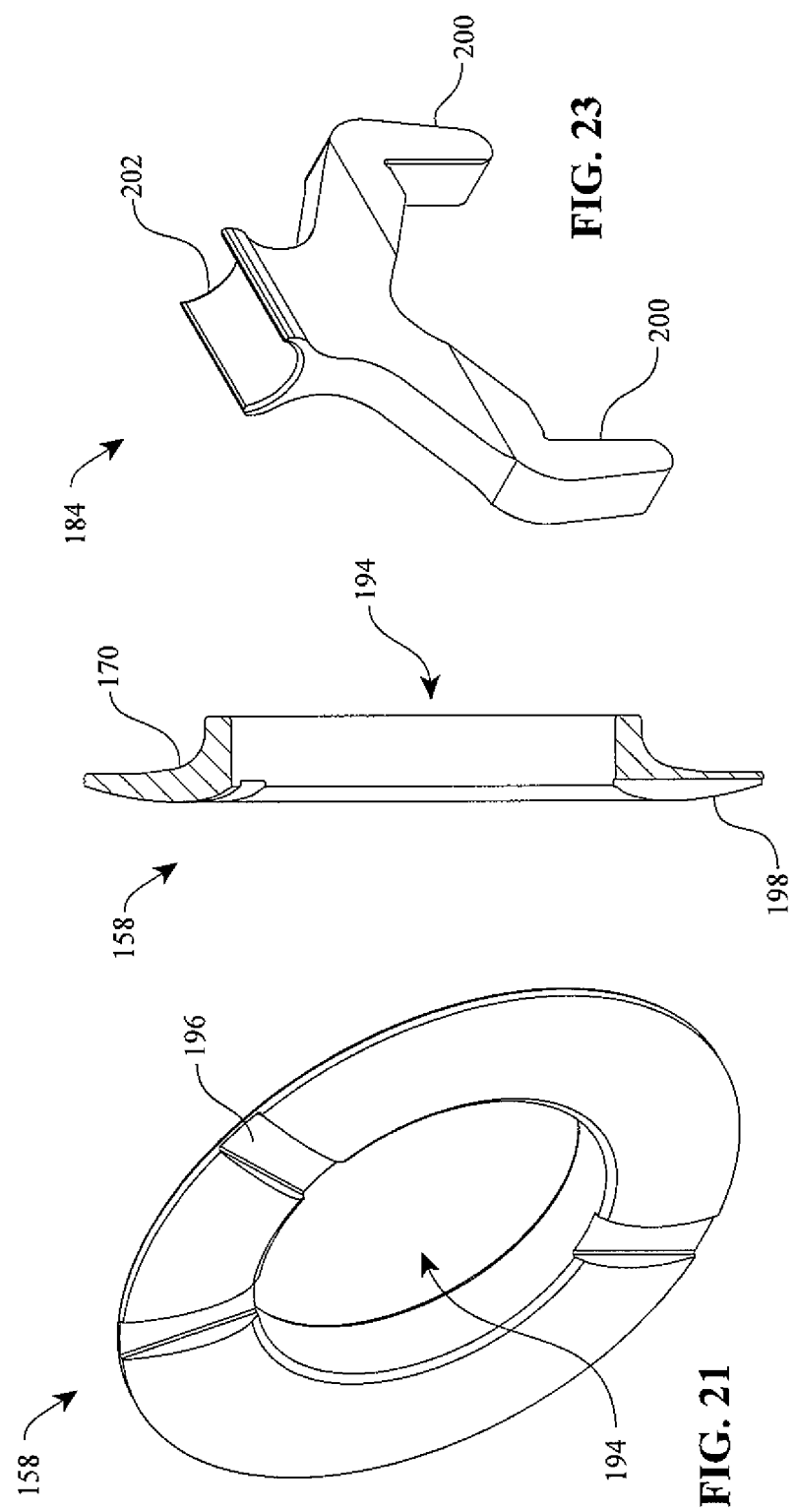

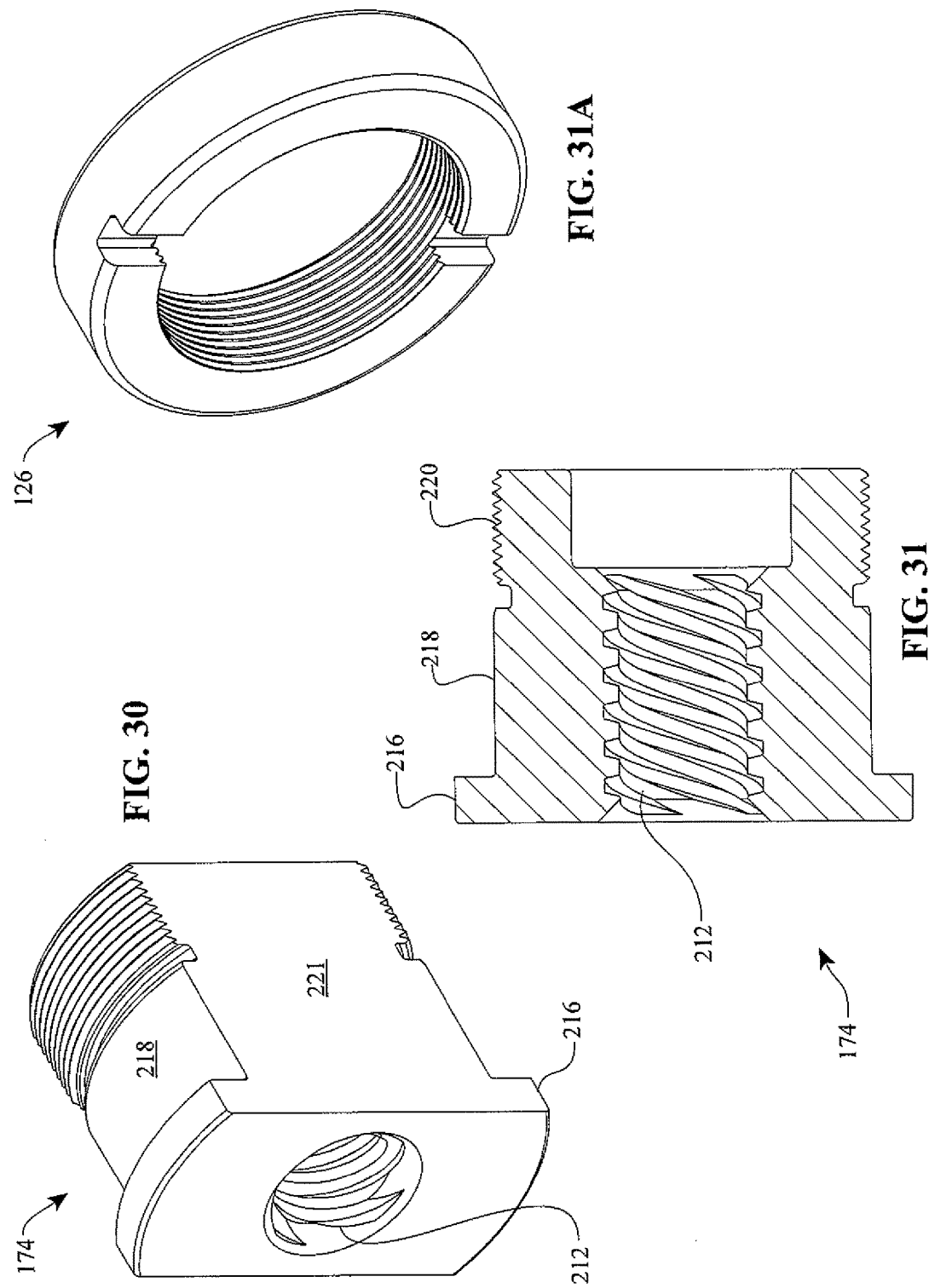

DETAIL C

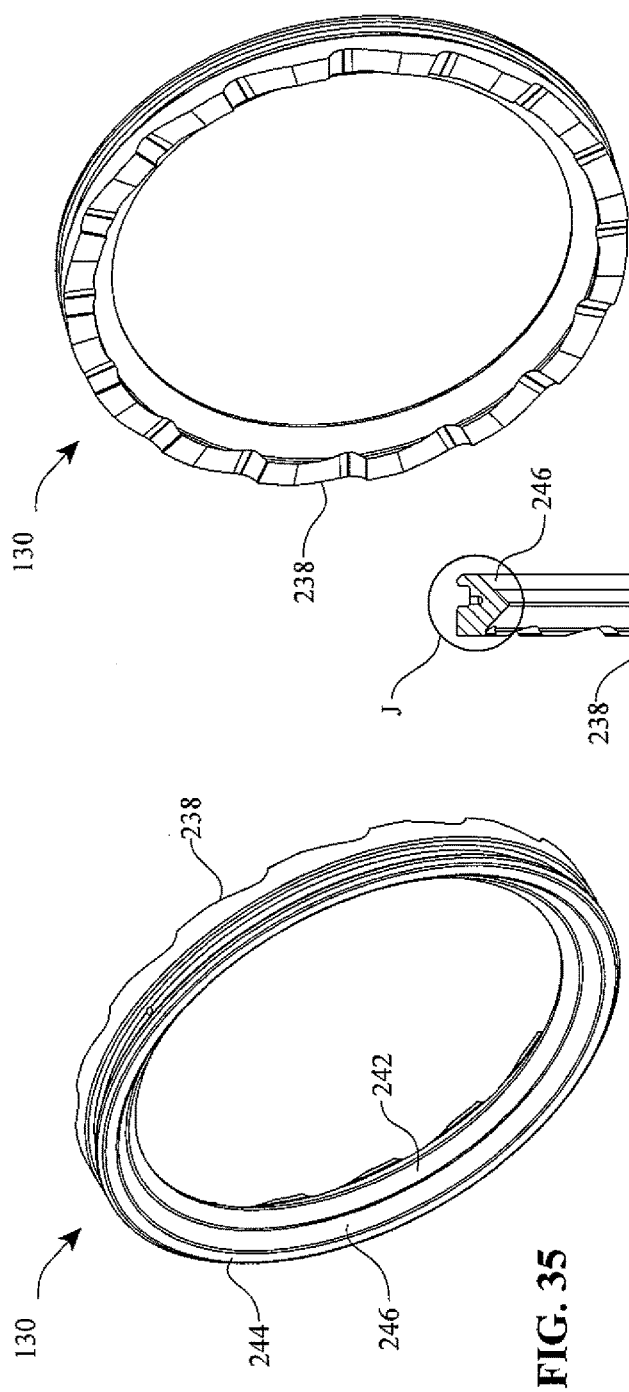
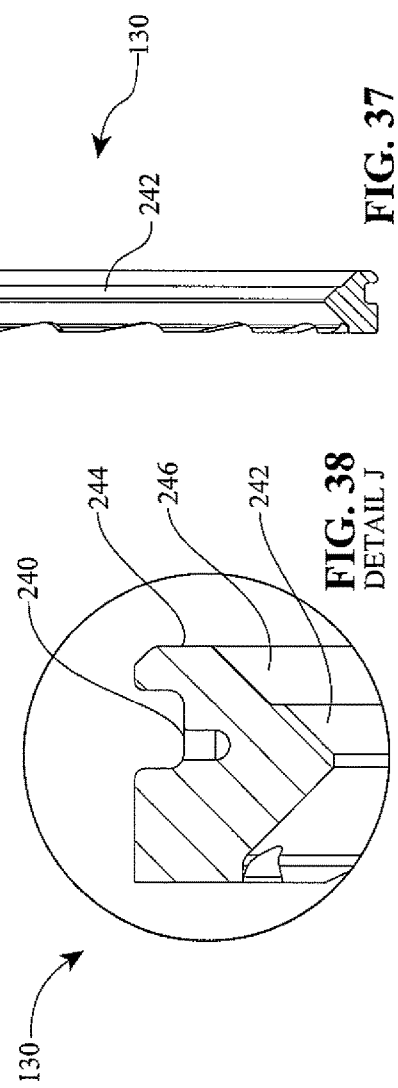
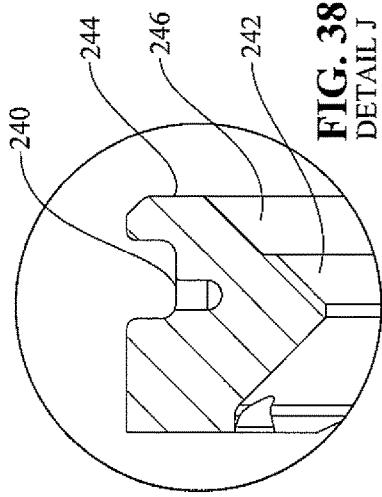

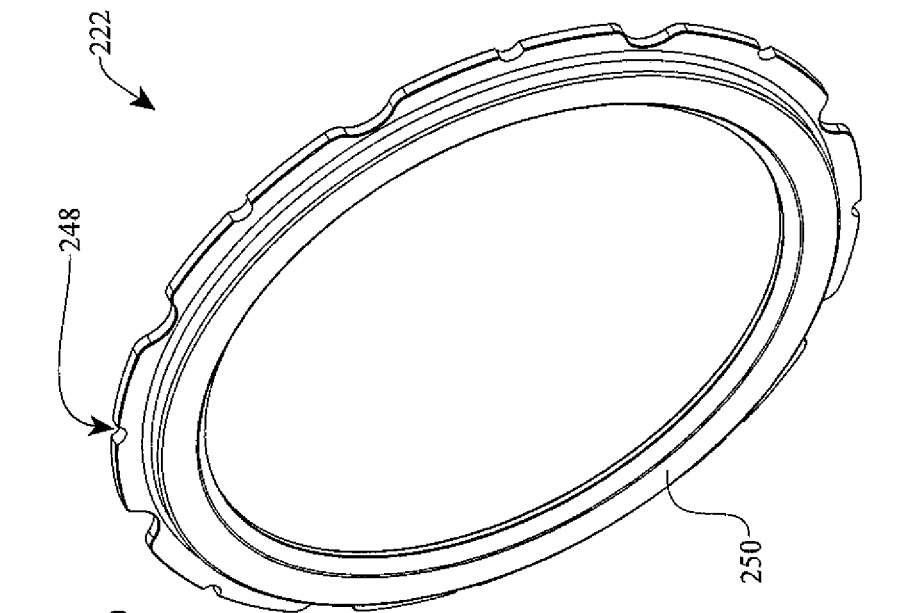
FIG. 40
FIG. 41
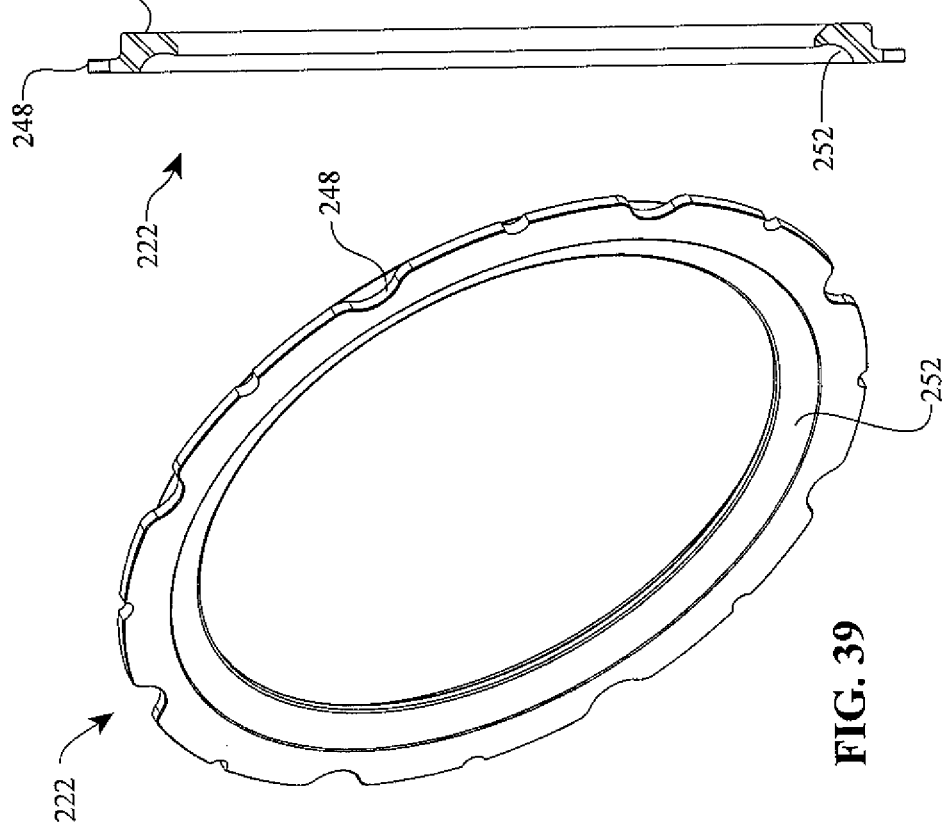
FIG. 39

DETAIL K

DETAIL D

DETAIL E

DETAIL F

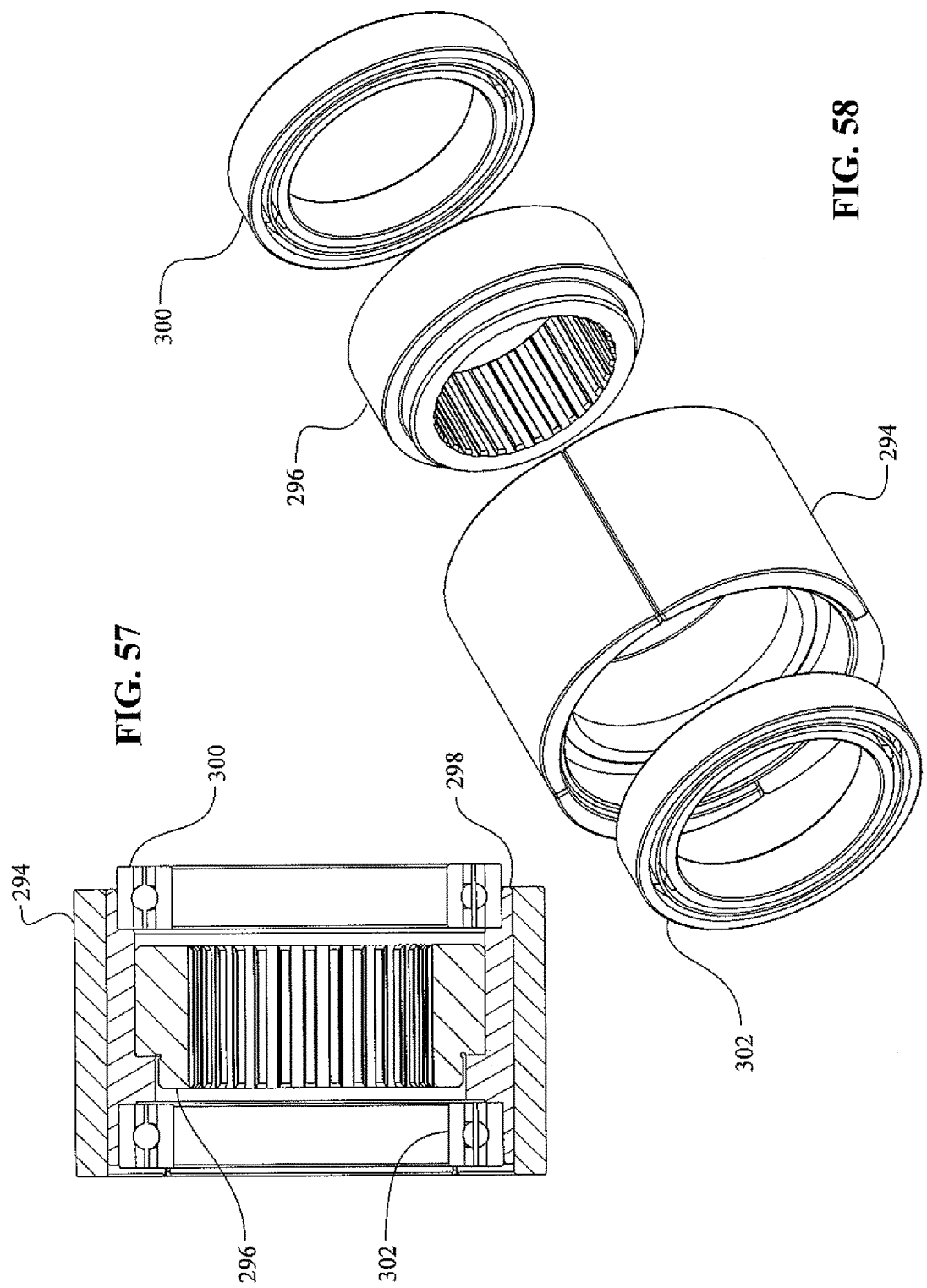

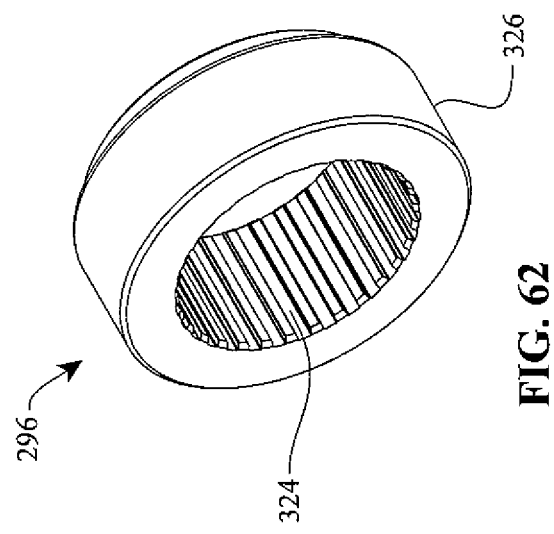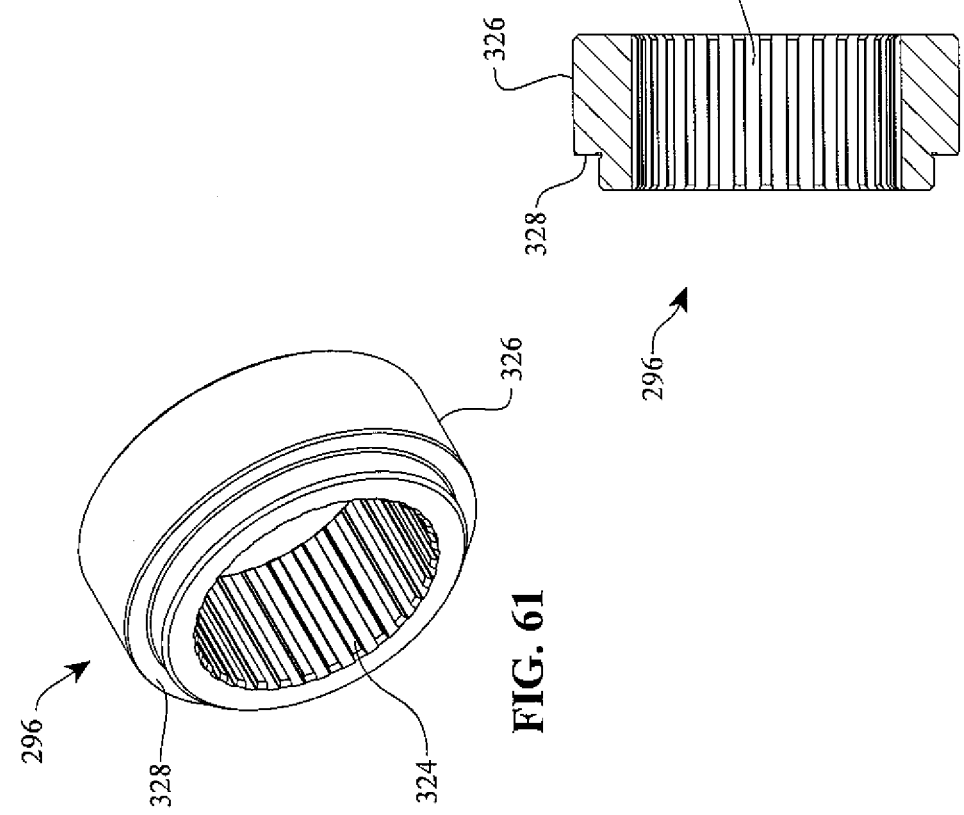

DETAIL G

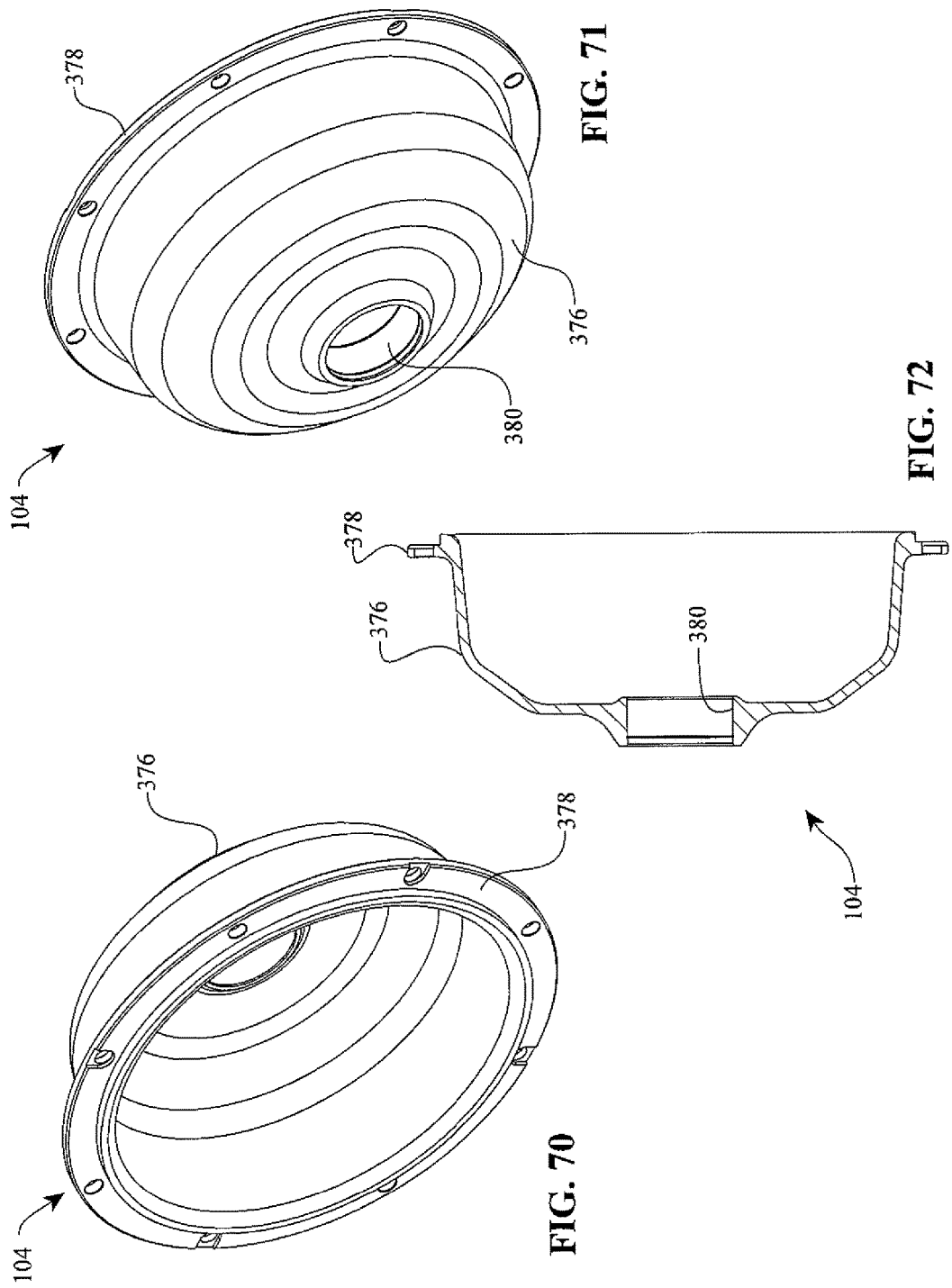

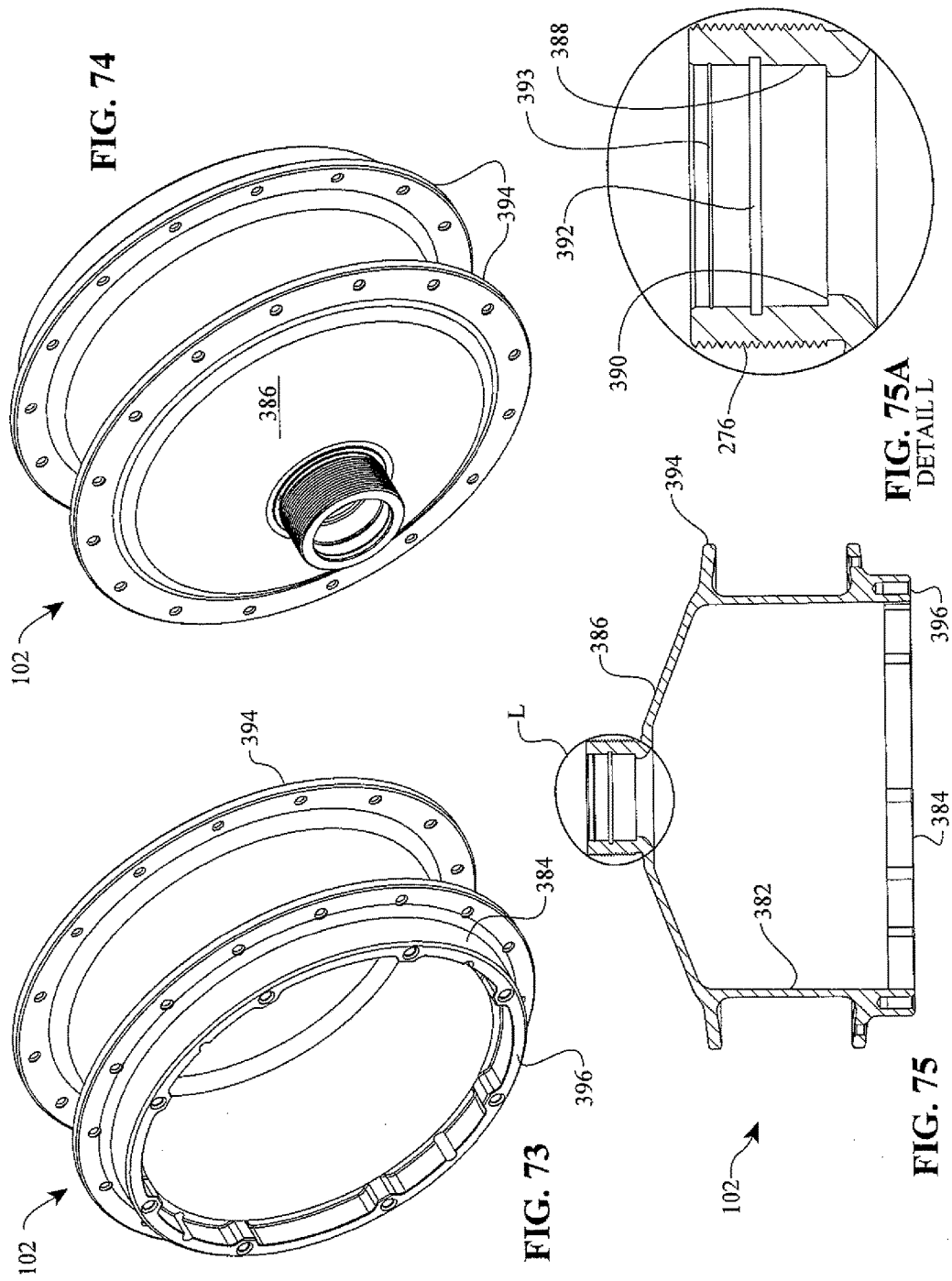

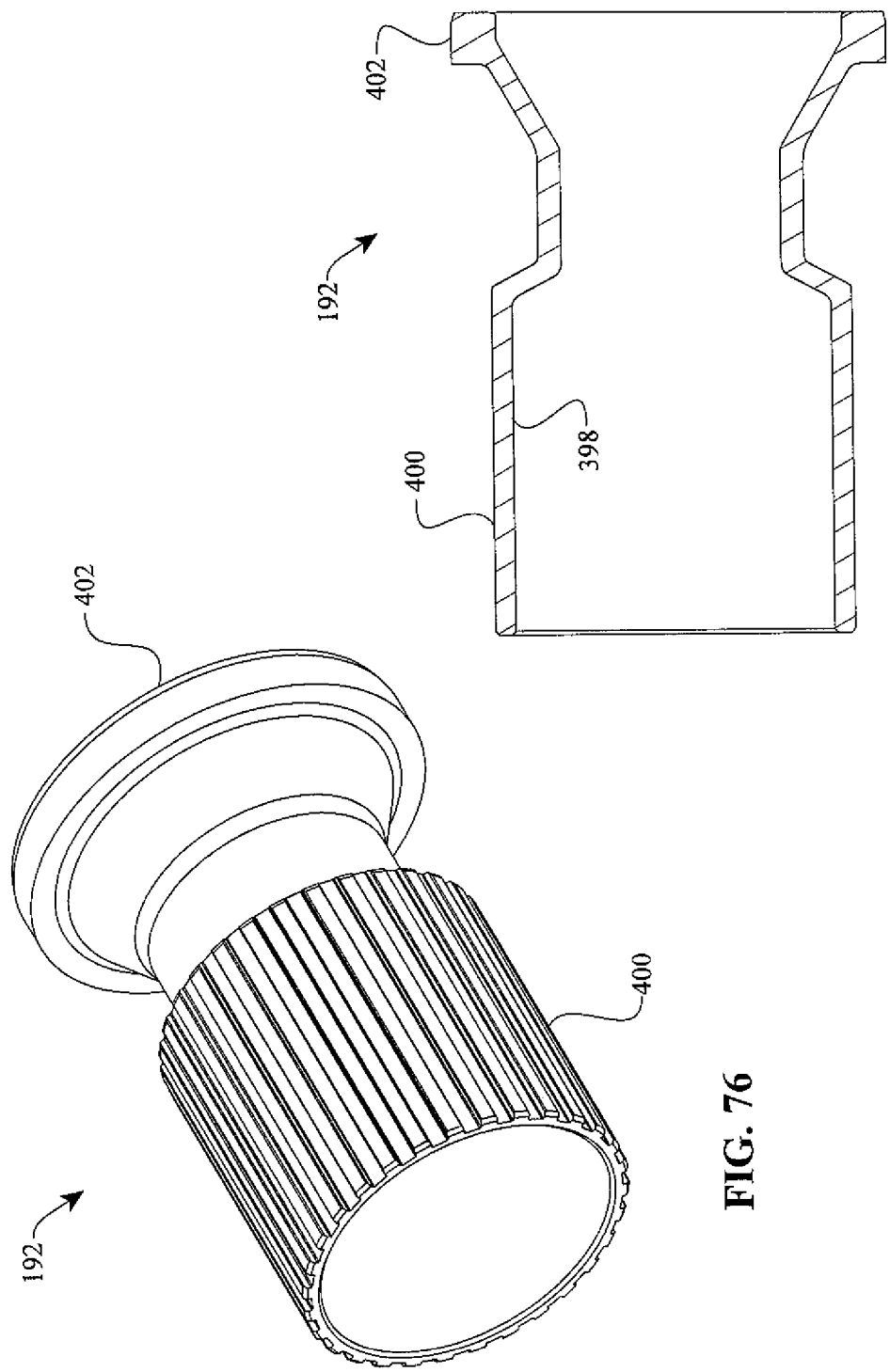

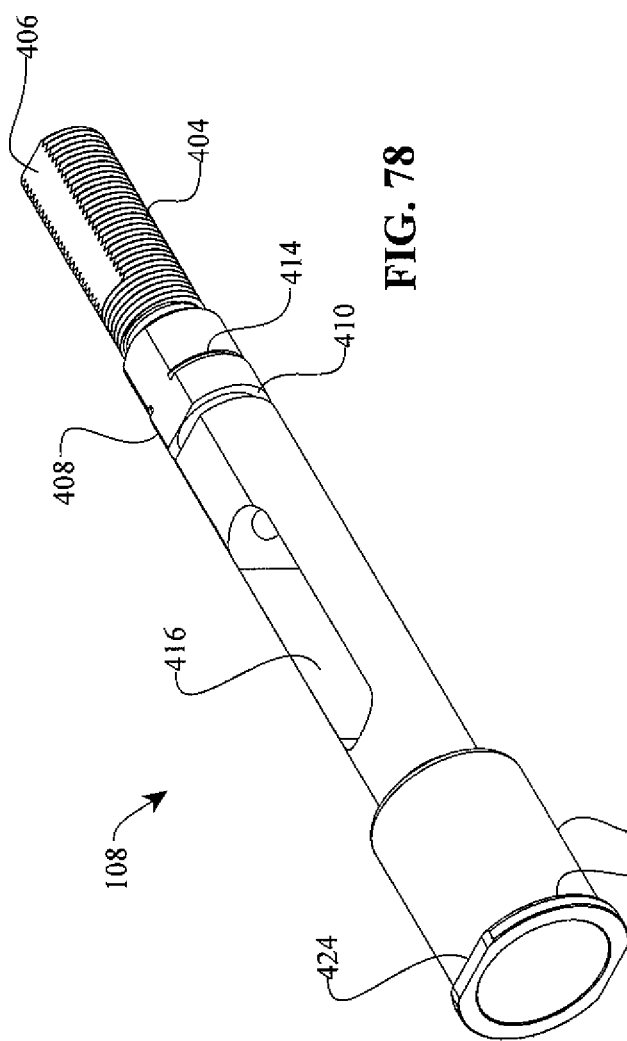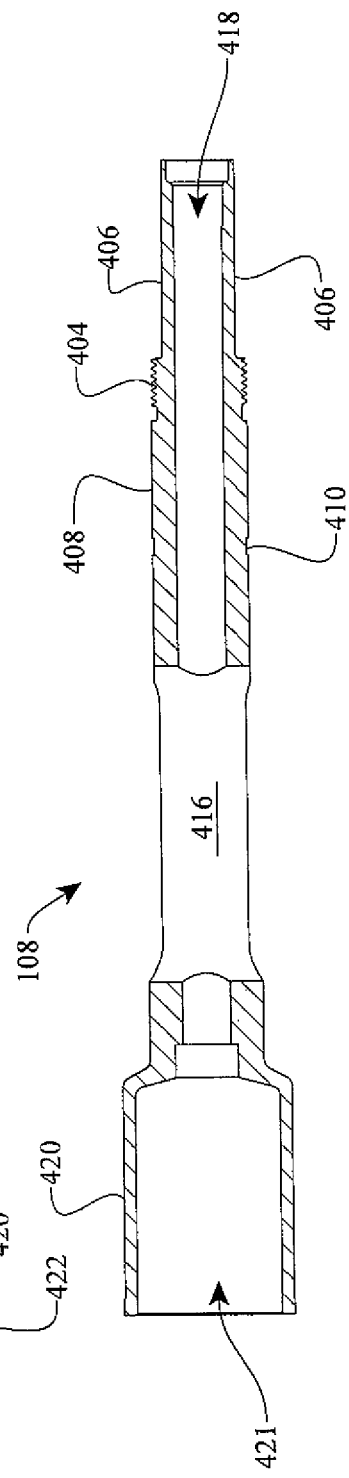
FIG. 78
FIG. 79

DETAIL H

ELECTRIC TRACTION DRIVES

CROSS-REFERENCE TO RELATED APPLICATIONS

This application is a continuation of U.S. patent application Ser. No. 15/053,954, filed Feb. 25, 2016 and scheduled to issue on Feb. 21, 2017 as U.S. Pat. No. 9,574,643, which is a continuation of U.S. patent application Ser. No. 13/790,667, filed Mar. 8, 2013 and issued as U.S. Pat. No. 9,273,760 on Mar. 1, 2016, which is a continuation of U.S. patent application Ser. No. 12/596,979, filed Oct. 21, 2009 and issued as U.S. Pat. No. 8,393,989 on Mar. 12, 2013, which is a national phase application of International Application No. PCT/US2008/061052, filed Apr. 21, 2008, which claims the benefit of U.S. Provisional Application No. 60/913,771, filed on Apr. 24, 2007, and U.S. Provisional Application No. 60/915,872, filed on May 3, 2007. The disclosures of all of the above-referenced prior applications, publications, and patents are considered part of the disclosure of this application, and are incorporated by reference herein in their entirety.

BACKGROUND OF THE INVENTION

Field of the Invention

The field of the inventive embodiments disclosed here relates generally to systems and methods for electromechanical or electromotive drives, and more particularly the inventive embodiments relate to drives that use methods and assemblies that incorporate electrical device components and continuously or infinitely variable transmission components.

Description of the Related Art

To provide a continuously variable transmission (CVT) or an infinitely variable transmission (IVT), various traction roller transmissions in which power flows through traction rollers between torque input and output rings have been developed. In such transmissions, the traction rollers mount on structures that when pivoted cause the traction rollers to engage the torque rings in circles of varying diameters depending on a desired transmission ratio.

A known CVT includes a shaft about which input and output rings rotate. The input and output rings mount on the shaft and contact a plurality of traction rollers disposed equidistantly and angularly about the shaft. The traction rollers are in frictional or tractional contact with both rings and transmit power from the input ring to the output ring. An idler located concentrically over the shaft and between the balls applies a force to keep the traction rollers in contact with the input ring and output ring.

An electric motor producing variable speed and constant power is highly desired in some vehicle and industrial uses. In such constant power applications, torque and speed vary inversely. For example, torque increases as speed decreases or torque decreases as speed increases. Some electric motors can provide constant power above their rated power; for example, a 1750 rpm AC motor can provide constant power when speed increases above 1750 rpm because torque can be designed to decrease proportionally with the speed increase. However, a motor by itself cannot produce constant power when operating at a speed below its rated power. Frequently torque remains constant or even decreases as the motor speed decreases. Controllers can be used to increase current, and torque, into the electric motor at low speeds, but an increase in the wire diameter of the windings is required to accommodate the additional current to avoid overheating. This is undesirable because the motor becomes larger and more expensive than necessary for typical operating conditions. The electronic controller also increases expense and complexity. Another method to achieve sufficient low speed torque is to use a bigger motor. However, this increases cost, size, weight, and makes the motor more difficult to package with the machine it powers. Thus, there exists a need for an improved method to provide variable speed and constant power with an electric motor. The continuously variable transmission can be integrated with an electric motor for some applications.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to an electric traction having a longitudinal axis and a group of traction planets distributed radially about the longitudinal axis. Each traction planet can be configured to rotate about a tiltable axis. The electric traction drive includes a first traction ring in contact with each of the traction planets, and includes a traction sun rotatable about the longitudinal axis. In one embodiment, the traction sun is positioned radially inward of and in contact with each of the traction planets, and the traction sun is capable of transferring power. The electric traction drive also includes a second traction ring in contact with each of the traction planets. In one embodiment, the electric traction drive includes an electricity producing generator having a set of non-rotating field windings coupled to a non-rotating component of the drive. The electricity producing generator can also have a group of rotating permanent magnets coupled to a rotating component of the drive. The electric traction drive also includes a ratio control device operably coupled to the traction sun.

Another aspect of the invention concerns an apparatus for shifting a traction drive. The apparatus includes a traction sun and a first shift cam. The first shift cam can be operably coupled to a first end of the traction sun. The apparatus also includes a second shift cam operably coupled to a second end of the traction sun, and includes at least one shift cam clip coupled to the first and the second shift cam.

Yet another aspect of the invention involves an apparatus for delivering power to a traction drive. In one embodiment, the apparatus has a drive shaft positioned along a longitudinal axis of the traction drive. The drive shaft can have a splined portion configured to couple to a power source. The drive shaft can be rotatable about and axially translatable with respect to the longitudinal axis. In one embodiment, the apparatus can include a traction sun coupled to the drive shaft. The traction sun is arranged radially outward from the drive shaft. The apparatus can also include a first shift cam operably coupled to the idler. The shift cam is substantially non-rotatable.

One aspect of the invention concerns a shift cam having a substantially disc-shaped body with a central bore and a shift cam profile formed on a first face of the disc-shaped body. In one embodiment the shift cam includes a set of anti-rotation extensions extending radially outward from the disc-shaped body. The shift cam can also include a grip portion formed on an end of one of the set of anti-rotation extensions.

Another aspect of the invention relates to a shift nut having a threaded central bore. In one embodiment, the shift nut has a first flat side arranged parallel to a longitudinal axis of the threaded central bore. The shift nut can also have a second flat side arranged parallel to the first flat side. In one embodiment, the shift nut has a shift nut flange extending radially outward from the threaded central bore. The shift nut can also include a threaded portion positioned radially outward from the central bore.

Yet one more aspect of the invention addresses an electromotive device having a number of stator laminations. In one embodiment, the electromotive device includes a set of electrical conductor windings coupled to the stator laminations. The electromotive device includes a support frame coupled to the stator laminations. The support frame can have a generally circular body with a central passage. In one embodiment, the support frame has a sensor board recess located on the circular body. The support frame can also include an electrical conductor passage located on the circular body.

In another aspect, the invention concerns a shift cam cage for a traction drive. The shift cam cage includes a first shift cam and a second shift cam coupled to the first shift cam. In one embodiment, the shift cam cage includes a synchronizing plate adapted to couple to at least the first shift cam.

Another aspect of the invention relates to a carrier assembly for a traction drive. In one embodiment, the carrier assembly includes a first stator plate and a second stator plate coupled to the first stator plate. Each of the first and the second stator plates includes a generally circular body have a central bore. The first and the second stator plate can include a number of stator extensions extending radially from the central bore. The first and the second stator plate can also include a number of stator pivot surfaces formed on the circular body.

One aspect of the invention relates to a speed ratio shifter for a traction drive. In one embodiment, the speed ratio shifter includes a main axle arranged along a longitudinal axis of the traction drive. The main axle can have a hollow bore and a slot. The speed ratio shifter includes an electric motor configured to be received in the main axle. The speed ratio shifter also includes a shift rod operably coupled to the electric motor. In one embodiment, the shift rod is arranged in the hollow bore of the main axle. The speed ratio shifter also includes a shift nut coupled to the shift rod. The shift nut can be positioned in the slot of the main axle.

Another aspect of the invention addresses a main axle for a traction drive. The main axle has an elongated body having a tubular portion on one end and a threaded portion on a second end. The main axle can have a through slot formed in the elongated body between the tubular portion and the threaded portion. In one embodiment, the tubular portion is configured to enclose an electric motor of the traction drive. The tubular portion is also provided with a passage to the through slot.

One more aspect of the invention concerns an electric traction drive having a longitudinal axis. In one embodiment, the electric traction drive includes a group of traction planets distributed radially about the longitudinal axis. Each traction planet is configured to rotate about a tiltable axis. The electric traction drive has a first traction ring in contact with the traction planets. The electric traction drive also has a rotatable traction sun coaxial about the longitudinal axis. The traction sun is positioned radially inward of and in contact with each of the traction planets. The electric traction drive includes a second traction ring in contact with the traction planets. In one embodiment, the electric traction drive has an electromotive device operably coupled to the second traction ring. The electromotive device includes an electric motor winding and an electric rotor. The electric motor winding and the electric rotor are configured to rotate in opposite directions on axes coincident with the longitudinal axis.

Yet another aspect of the invention involves an electric traction drive that has a longitudinal axis. In one embodiment, the electric traction drive includes a group of traction planets distributed radially about the longitudinal axis. Each traction planet is configured to rotate about a tiltable axis. The electric traction drive includes a first traction ring in contact with the traction planets. The electric traction drive has a means for delivering an input power to the first traction ring. In one embodiment, the electric traction drive includes a second traction ring in contact with the traction planets. The electric traction drive can also include an alternator/generator operably coupled to the second traction ring.

Another aspect of the invention relates to an apparatus for facilitating the shifting of a traction drive having a plurality of tilting traction planets. The apparatus includes a carrier assembly adapted to support the tilting traction planets. In one embodiment, the apparatus has a shift cam cage positioned radially inward of, and substantially enclosed by, the carrier assembly. The shift cam cage can be operably coupled to each of the traction planets. The apparatus also includes a set of shift cam actuators radially distributed about the carrier assembly. Each of the shift cam actuators has a first end, a second end, and a middle portion.

Yet one more aspect of the invention addresses an electric traction drive having a longitudinal axis. In one embodiment, the electric traction drive has a group of traction planets distributed radially about the longitudinal axis. Each traction planet is configured to rotate about a tiltable axis. The electric traction drive includes a first traction ring in contact with the traction planets. In one embodiment, the electric traction drive has a drive shaft operably coupled to the first traction ring. The drive shaft can be adapted to transfer power to and/or from an external power source to the first traction ring. The electric traction drive can include a rotatable traction sun coaxial about the longitudinal axis. The traction sun is positioned radially inward of and in contact with each of the traction planets. The electric traction drive can have a traction sun drive shaft coupled to the traction sun. The electric traction drive can also have an electric rotor assembly coupled to the traction sun drive shaft. In one embodiment, the electric traction drive includes a second traction ring in contact with the traction planets. The electric traction drive can also include a main shaft arranged along the longitudinal axis and radially inward of the traction sun drive shaft. The main shaft is configured to transfer power to and/or from the second traction ring.

In another aspect, the invention concerns an electric traction drive having a longitudinal axis. The electric traction drive includes a group of traction planets distributed radially about the longitudinal axis. Each traction planet is configured to rotate about a tiltable axis. The electric traction drive has a first traction ring in contact with the traction planets. The electric traction drive includes a drive shaft operably coupled to the first traction ring. The drive shaft can be adapted to transfer power to and/or from an external power source to the first traction ring. The electric traction drive has a rotatable traction sun coaxial about the longitudinal axis. The traction sun is positioned radially inward of and in contact with each of the traction planets. In one embodiment, the electric traction drive has a second traction ring in contact with each of the traction planets. The electric traction drive can also include a carrier assembly operably coupled to each of the traction planets, and the electric traction drive can have an electrical device operably coupled to the carrier and to the second traction ring.

Another aspect of the invention relates to an electric traction drive having a longitudinal axis. In one embodiment, the electric traction drive can include a group of traction planets distributed radially about the longitudinal axis. Each traction planet can be configured to rotate about a tiltable axis. The electric traction drive has a traction ring in contact with the traction planets. The electric traction drive includes a load cam driver operably coupled to the traction ring, and the drive include an electric rotor coupled to the load cam driver. In one embodiment, the electric traction drive includes a rotatable traction sun coaxial about the longitudinal axis and positioned radially inward of and in contact with each of the traction planets. The electric traction drive has a fixed member arranged coaxial about the longitudinal axis. In one embodiment, the electric traction drive includes a set of field windings coupled to the fixed member. The field windings configured to interact electromagnetically with the electric rotor.

One aspect of the invention relates to an electric traction drive that has a longitudinal axis. The electric drive has a group of traction planets distributed radially about the longitudinal axis, and each traction planet is configured to rotate about a tiltable axis. In one embodiment, the electric traction drive has a first traction ring in contact with the traction planets, and the drive has a second traction ring in contact with the traction planets. The electric traction drive also includes an electromagnetic device configured to transfer power to and from the first traction ring.

Another aspect of the invention addresses an electric traction drive having a longitudinal axis. The electric traction drive has a group of traction planets distributed radially about the longitudinal axis. Each traction planet is configured to rotate about a tiltable axis. The electric traction drive includes a first traction ring in contact with the traction planets, and a second traction ring in contact with the traction planets. In one embodiment, the electric traction drive includes a carrier assembly coaxial about the longitudinal axis. The carrier assembly is configured to operably couple to each of the traction planets. The electric traction drive has a rotatable traction sun that is coaxial about the longitudinal axis and is positioned radially inward of and in contact with each of the traction planets. The electric traction drive includes a traction sun shaft coupled to the traction sun. The electric traction drive also includes an electromagnetic device operably coupled to the traction sun and the carrier assembly.

One more aspect of the invention concerns a housing for a traction drive. The housing has a housing cap and a main shell. The housing cap has a generally bowl-shaped body, a flange extending from a periphery of the bowl-shaped body, and a central bore adapted to support a bearing. The main shell includes a generally cylindrical body that has an open end and a substantially closed end. The substantially closed end has a central bore. The main shell has a threaded input surface extending axially from the central bore of the closed end. The main shell also has a first flange extending radially from an outer periphery of the cylindrical body. The first flange is in proximity to the substantially closed end.

Yet another aspect of the invention involves an electric traction drive that has a longitudinal axis. The electric traction drive has a group of traction planets distributed radially about the longitudinal axis. Each traction planet is configured to rotate about a tiltable axis. The electric traction drive includes a first traction ring in contact with the traction planets, and includes a second traction ring in contact with the traction planets. In one embodiment, the electric traction drive has a carrier assembly that is coaxial about the longitudinal axis. The electric traction drive can have a rotatable traction sun that is coaxial about the longitudinal axis and is positioned radially inward of and in contact with each of the traction planets. The electric traction drive has a shifter shaft operably coupled to the traction sun. In one embodiment, the electric traction drive includes a first electrical device coupled to the carrier. The first electrical device can be operably coupled to the second traction ring. The electric traction drive also includes a second electrical device coupled to the shifter shaft and to the second traction ring.

BRIEF DESCRIPTION OF THE DRAWINGS

FIG. 8 is a perspective view of a planet and shift lever assembly that can be used with the ETD of FIG. 5.

FIG. 9 is cross-sectional view of the planet and shift lever assembly of FIG. 8.

FIG. 14 is a perspective view of an assembly of certain components shown in FIG. 13.

FIG. 15 is a cross-sectional view of the assembly of FIG. 14.

FIG. 16 is perspective view of a traction sun that can be used with the ETD of FIG. 5.

FIG. 17 is a cross-sectional view of the traction sun of FIG. 16.

FIG. 21 is a perspective view of a shift cam that can be used with the traction-sun-and-shift-rod subassembly of FIG. 12.

FIG. 22 is a cross-sectional view of the shift cam of FIG. 21.

FIG. 23 is a perspective view of a shift cam clip that can be used with the subassembly of FIG. 12.

FIG. 30 is a perspective view of a shift rod nut that can be used with the subassembly of FIG. 12.

FIG. 31 is a cross-sectional view of the shift rod nut of FIG. 30.

FIG. 31A is a perspective view of a retainer nut that can be used with the subassembly of FIG. 12.

FIG. 35 is a perspective view of a traction ring that can be used with the ETD of FIG. 5.

FIG. 36 is a second perspective view of the traction ring of FIG. 35.

FIG. 37 is a cross-sectional view of the traction ring of FIG. 35.

FIG. 38 is a Detail J view of the traction ring of FIG. 37.

FIG. 39 is a perspective view of a drive ring that can be used with the subassembly of FIG. 32.

FIG. 40 is a second perspective view of the drive ring of FIG. 39.

FIG. 41 is a cross-sectional view of the driver ring of FIG. 39.

FIG. 57 is a cross-sectional view of certain components of the electromotive device subassembly of FIG. 55.

FIG. 58 is an exploded view of the components of FIG. 57.

FIG. 61 is a perspective view of a drive shaft adapter that can be used with the magnet rotor subassembly of FIG. 59.

FIG. 62 is a second perspective view of the drive shaft adapter of FIG. 61.

FIG. 63 is a cross-sectional view of the drive shaft adapter of FIG. 62.

FIG. 70 is a perspective view of a housing cap that can be used with the ETD of FIG. 3.

FIG. 71 is a second perspective view of the housing cap of FIG. 70.

FIG. 72 is a cross-sectional view of the housing cap of FIG. 71.

FIG. 73 is a perspective view of a main housing shell that can be used with the ETD of FIG. 5.

FIG. 74 is a second perspective view of the main housing shell of FIG. 73.

FIG. 75 is a cross-sectional view of the main housing shell of FIG. 74.

FIG. 75A is a Detail L view of the main housing shell of FIG. 75.

FIG. 76 is a perspective view of a drive shaft that can be used with the ETD of FIG. 5.

FIG. 77 is a cross-sectional view of the drive shaft of FIG. 77.

FIG. 78 is a perspective view of a main axle that can be used with the ETD of FIG. 5.

FIG. 79 is a cross-sectional view of the main axle of FIG. 78.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is used in conjunction with a detailed description of certain specific embodiments of the invention. Furthermore, embodiments of the invention may include several novel features, no single one of which is solely responsible for its desirable attributes or which is essential to practicing the inventions described.

The inventive embodiments disclosed here relate generally to variators and transmissions of the type sometimes referred to as ball-planetary continuously, or infinitely, variable transmissions (CVT/IVT). Certain embodiments of said type of variator or transmissions are described in U.S. Pat. Nos. 6,241,636, 6,419,608, 6,689,012, 7,011,600, 7,166,052, and U.S. patent application Ser. Nos. 11/585,677 and 11/543,311. The entire disclosure of each of these patents and patent applications is hereby incorporated herein by reference.

For description purposes, as used here the term "radial" indicates a direction or position that is generally perpendicular relative to a longitudinal axis of a transmission or variator. As used here, the term "axial" refers to a direction or position along an axis that is generally parallel to a main or longitudinal axis of a transmission or variator. For clarity and conciseness, at times similar components labeled similarly (for example, stator plate 148A and stator plate 148B) will be referred to collectively by a single label (for example, stator plate 148A).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives typically involve the transfer of power between elements by shear forces in a thin fluid layer trapped between the elements. Typically, friction drives generally relate to transferring power between elements by frictional (or coulombic) forces between the elements. For the purposes of this disclosure, it should be understood that embodiments of the devices disclosed herein can operate in tractive, frictional, or tractive and/or frictional applications, depending on the embodiment. For example, in one embodiment an electric traction drive is employed in a bicycle application, said electric traction drive can operate at times as a friction drive and at other times as a traction drive, depending on the torque and speed conditions present during operation.

Figures 1, 2:
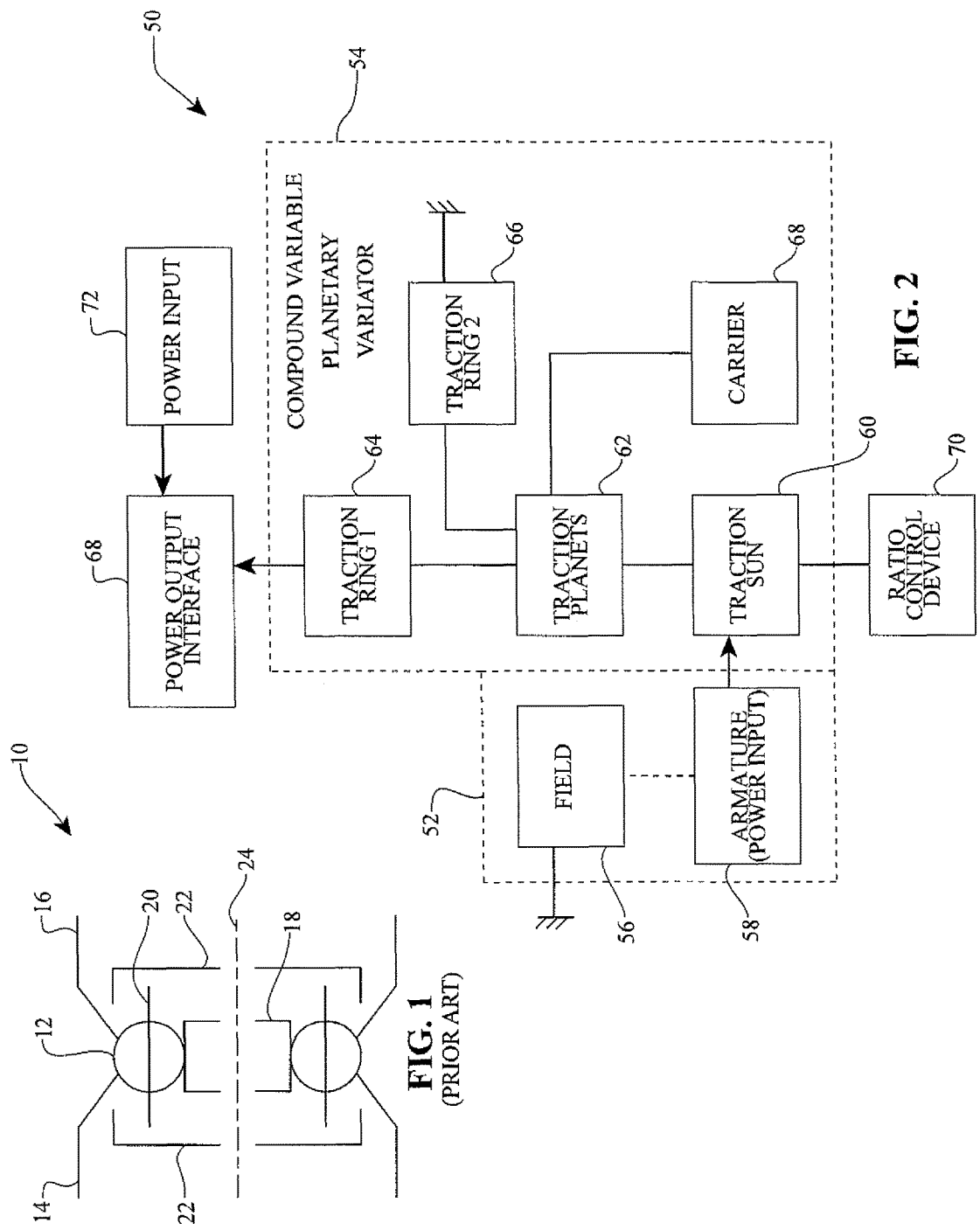
FIG. 1 is a schematic representation of a known compound variable planetary variator of the ball-planetary type.
FIG. 2 is a schematic diagram of an electric traction drive (ETD) in accordance with inventive embodiments disclosed here.

Referring to FIG. 1 now, a compound variable planetary variator 10 includes an array of traction planets 12 in contact with a first traction ring 14, a second traction ring 16, and a traction sun 18. The traction planets 12 typically are supported on planet axles 20 that are tiltable in order to change the axis of rotation of the traction planets 12. A carrier 22, typically consisting of one or more plates, operationally provides radial and/or axial support, reaction, positioning, and/or guiding of the planet axles 20. Depending on the embodiment, one or several of the array of traction planets 12, first traction ring 14, second traction ring 16, and carrier 22, can be configured to be rotationally free or fixed about a longitudinal axis 24. The configuration shown in FIG. 1 of a ball planetary variator 10 is well known, and details of such variators can be found in the patents and patent applications referenced above.

Passing to FIG. 2, one embodiment of an electric traction drive 50 will be described now. The electric traction drive 50 integrates an electromotive device 52 with a compound variable planetary variator 54. In one embodiment, the electromotive device 52 includes a field 56 that is rotationally fixed; the field 56 can be the stator of an electric motor, for example. The field 56 is operationally coupled to an armature 58 that is configured to provide rotational mechanical power; the armature 58 can be the rotor of an electric motor, for example. In some embodiments, the armature 58 is operationally coupled to a traction sun 60, which is configured to rotate about an axis. Traction planets 62 contact the traction sun 60, a first traction ring 64, and a second traction ring 66. In the embodiment illustrated in FIG. 2, the traction planets 62 transfer power from the traction sun 60 to the traction ring 64, while the traction ring 66 is rotationally fixed and, therefore, does not transfer power but serves to react the traction planets 62. Power flows from the variator 54 to a power output interface 68, through an operational linkage or coupling between the first traction ring 64 and the power output interface 68. The variator 54 can include a carrier 68 to provide radial and/or axial support, reaction, guiding, etc., for the traction planets 62 through their respective planet axles (not shown in FIG. 2). In some embodiments, a ratio control device 70 can be operationally coupled to the traction sun 60 to cause a change in the axis of rotation of the traction planets 62 as the traction sun 60 changes axial position. In one embodiment, the electric traction drive 50 can be configured so that a power input 72 can couple to the power output interface.

It should be noted that while in FIG. 2 the electromotive device 52 and the variator 54 have been outlined by dashed lines, these dashed lines represent merely conceptual boundaries. In other words, in some embodiments of the electric traction drive 50, there is no hardware, or electronic logic, etc., boundary between the electromotive device 52 and the variator 54. For example, in some embodiments, the field 56 can be integral with the second traction ring 66, or the armature can be coupled to or made integral with a housing (not shown) of the variator 54. Elucidating further, in some embodiments, the ratio control device 70 and/or the power output interface 68 can be integral with, or tightly or directly coupled with, the other components of the variator 54. For example, in one embodiment, the ratio control device can consist of electronic, electro-mechanical, or hydraulic components that are predominantly external to the variator 54 but which, however, interact with or couple to mechanisms that are internal to the variator 54. By way of another example, in one embodiment, the power output interface 68 is integral with a housing of the variator 54.

Figure 3:
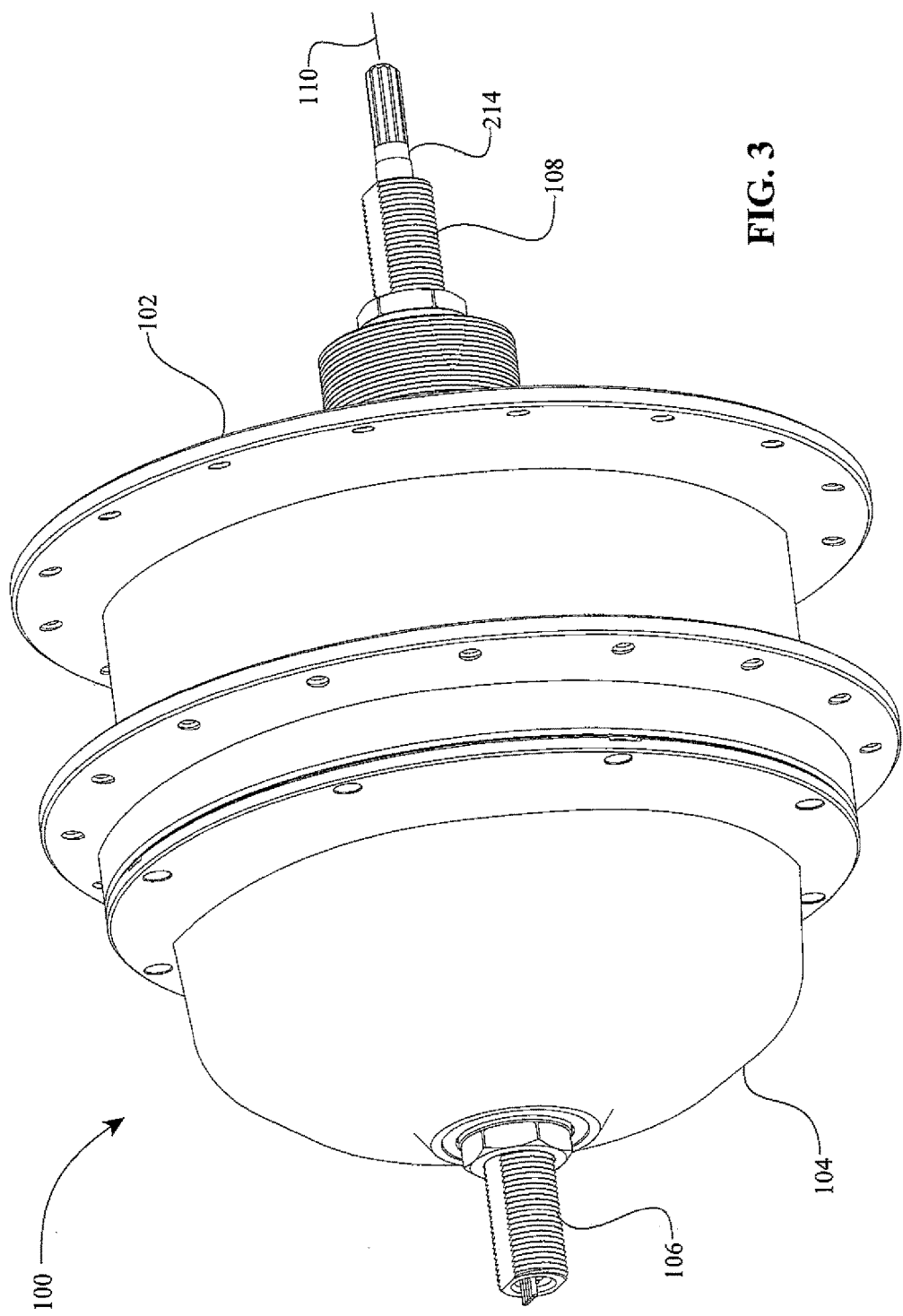
FIG. 3 is a perspective view of one embodiment of an ETD; primarily, the housing therefor is shown.

One embodiment of an electric traction drive 100 will now be described with reference to FIGS. 3-79. As illustrated in FIG. 3, an electric traction drive 100 can include a housing having a main shell 102 coupled to a housing cap 104. In one embodiment, the main shell 102 and the housing cap 104 are operationally supported on an auxiliary axle 106 and a main axle 108, which defines a longitudinal axis 110 of the electric traction drive 100. Further description of the housing cap 104 and the main shell 102 is provided below with reference to FIGS. 70-72 and FIGS. 73-75, respectively.

Figure 4:
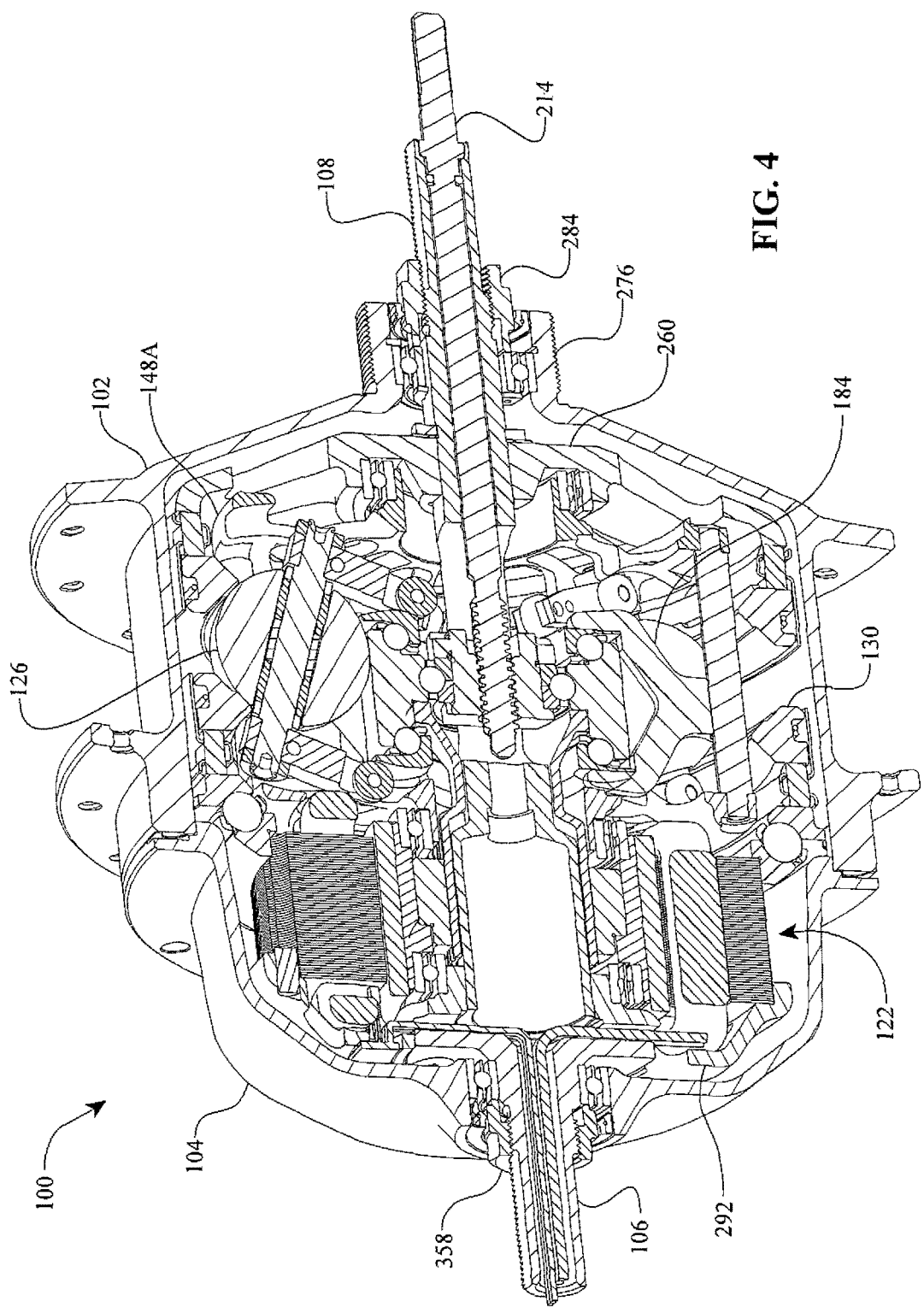
FIG. 4 is a cross-sectional, perspective view of a certain components of the ETD of FIG. 3.
Figure 5:
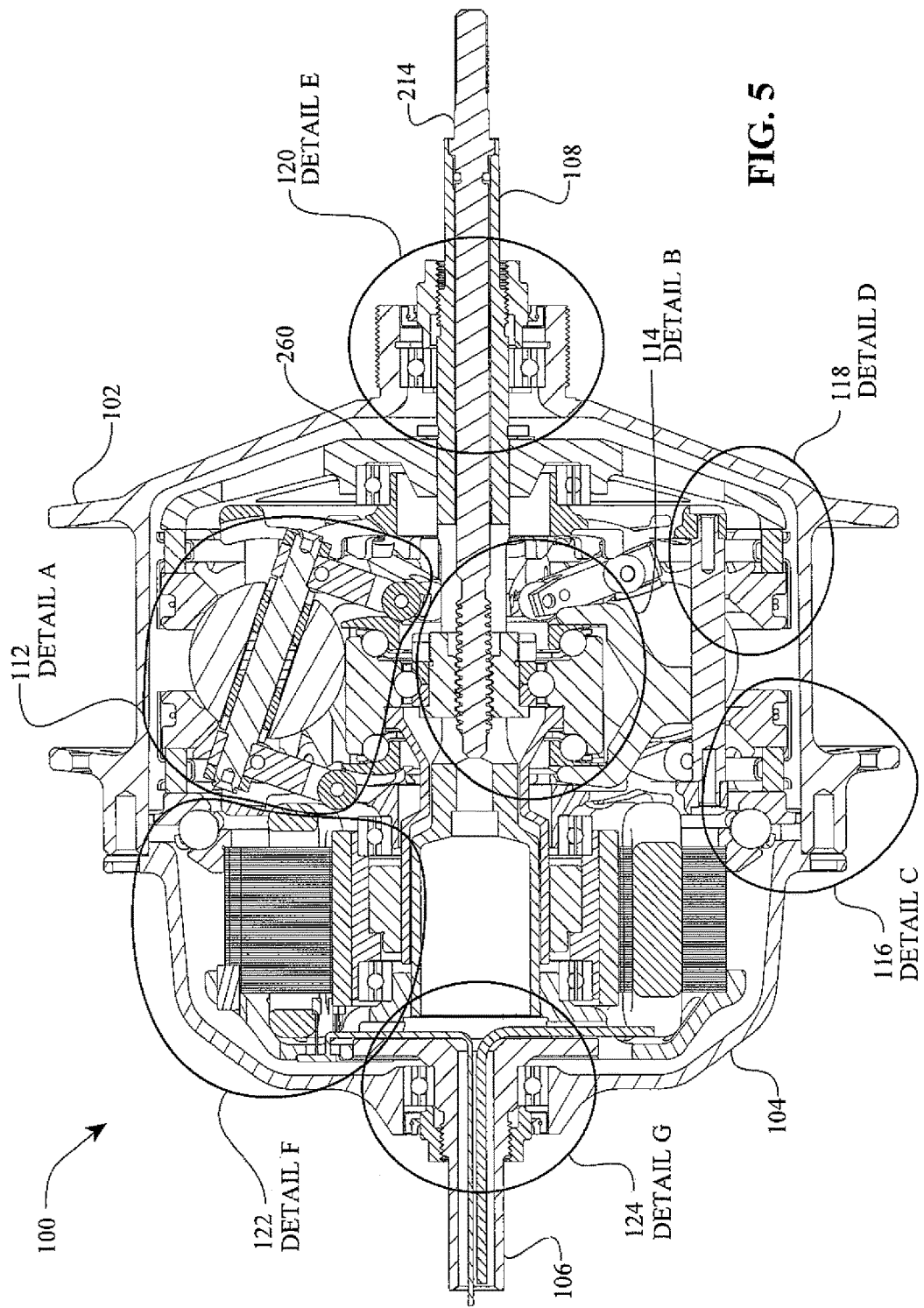
FIG. 5 is an elevational, cross-sectional view of the ETD of FIG. 4.
Figure 6:
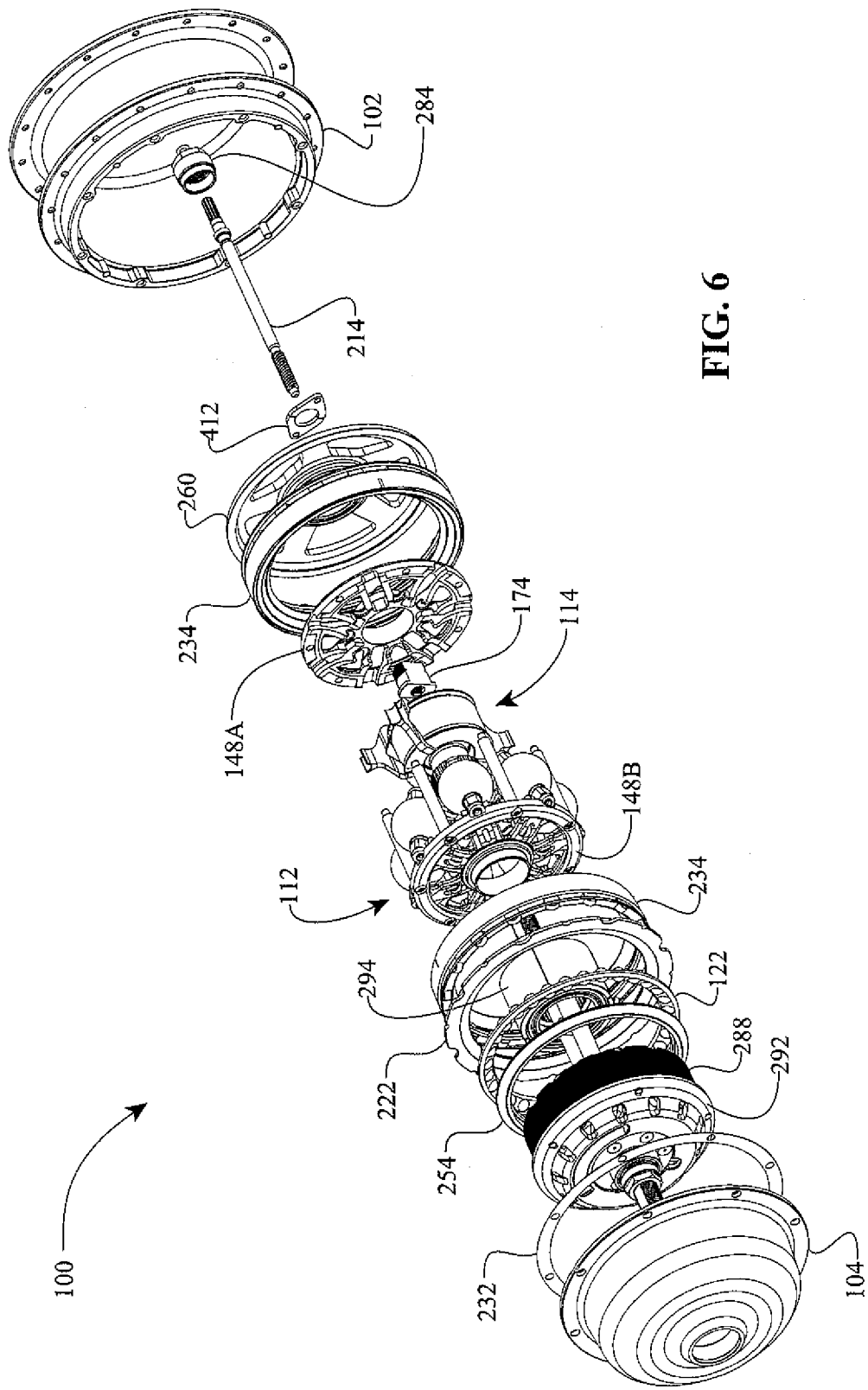
FIG. 6 is an exploded, perspective view of certain components of the ETD of FIG. 5.
Figure 7:
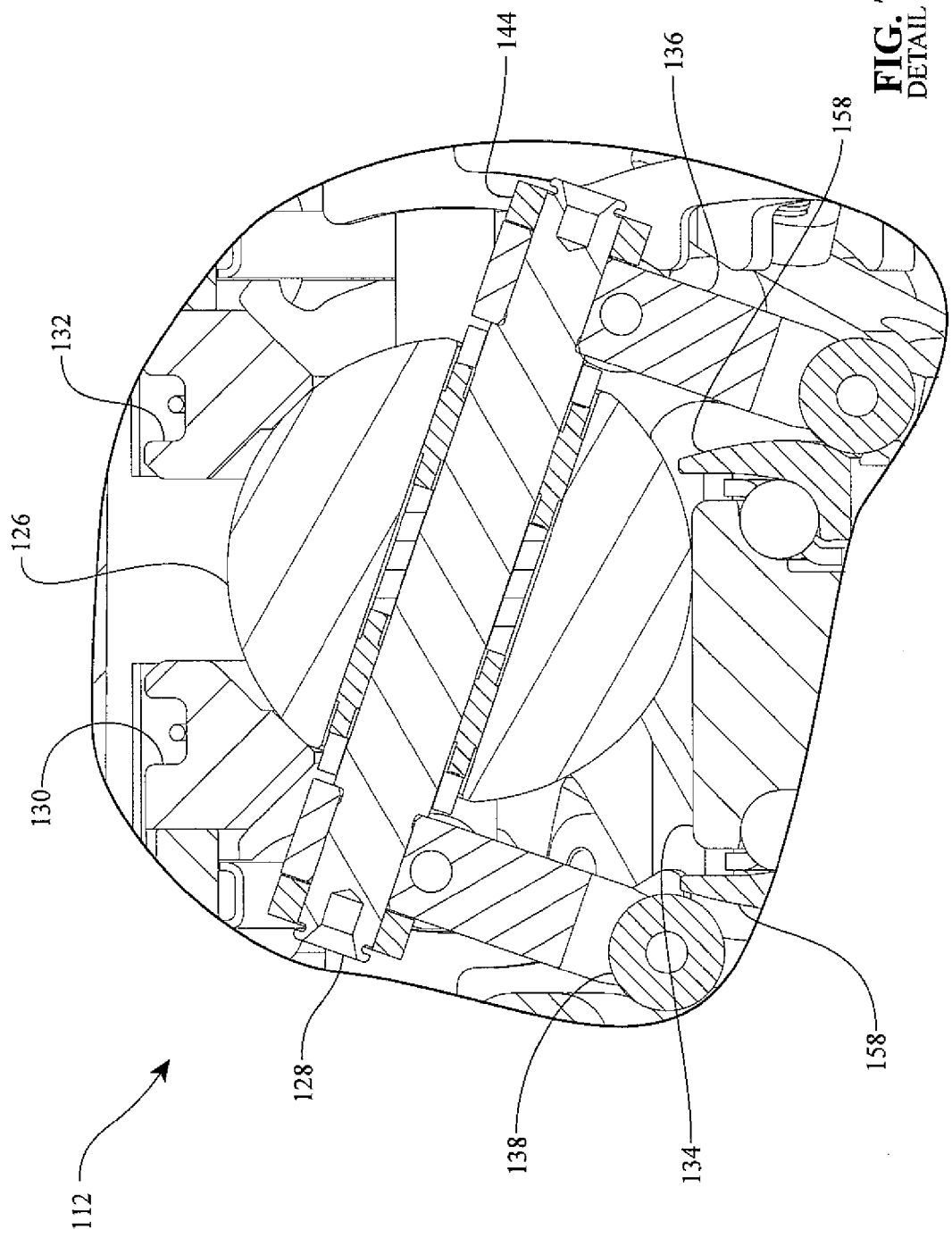
FIG. 7 is a Detail A view of the ETD of FIG. 5.

Referring specifically to FIGS. 4-6 now, the electric traction drive 100 can be described as generally having a number of subassemblies. It should be noted that the description of the electric traction drive 100 in terms of subassemblies is done for convenience only and it is not intended to establish any necessary configuration or collection of subassemblies (or components) to define various embodiments of the electric traction drive 100. In one embodiment, the electric traction drive 100 can include a traction-planet-and-shift-lever subassembly 112, which is shown as Detail A and is further described below with reference to FIGS. 7-11; a traction-sun-and-shift-rod subassembly 114, which shown as Detail B and is further described below with reference to FIGS. 12-31; a power-output-and-clamp-force-generation subassembly 116, which is shown as Detail C and is further described below with reference to FIGS. 32-48; a planet-reaction-and-clamp-force-generation subassembly 118, which is shown as Detail D and is further described below with reference to FIGS. 49-53; an input interface subassembly 120, which is shown as Detail E and is further described below with reference to FIG. 54; an electromotive device subassembly 122, which is shown as Detail F and is further described below with reference to FIGS. 55-66; and a housing-cap-end-interface subassembly 124, which is shown as Detail G and is further described below with reference to FIGS. 67-72. These subassemblies will be described further below.

By way of a brief and generalized description, referencing FIGS. 5, 7, 12, 32, 49, and 55, when the electromotive device subassembly 122 is energized, mechanical power flows from the electromotive device subassembly 122 to the traction-sun-and-shift-rod subassembly 114. The traction-planet-and-shift-lever subassembly 112 then transfers power from the traction-sun-and-shift-rod subassembly 114 to the power-output-and-clamp-force-generation subassembly 116, which then delivers the power out of the electric traction drive 100 to drive a load. The planet-reaction-and-clamp-force-generation subassembly 118 is configured to provide a reaction or rolling surface for the traction planets 126. The planet-reaction-and-clamp-force-generation subassembly 118 and the power-output-and-clamp-force-generation subassembly 116 cooperate to facilitate the generation of a clamping force to ensure appropriate tractional contact between a traction sun 134, traction planets 126, and traction rings 130, 132. In the embodiment illustrated, the traction-sun-and-shift-rod subassembly 114 is configured to facilitate an adjustment in the axis of rotation of the traction planets 126 about their respective planet axles 128.

Referring now specifically to FIGS. 7-11, in one embodiment the traction-planet-and-shift-lever subassembly 112 includes a number of traction planets 126 placed in contact with a first traction ring 130, a second traction ring 132, and a traction sun 134. As shown in FIGS. 8 and 9, the traction planet 126 is supported on a planet axle 128, which provides an axis of rotation for the traction planet 126. The planet axle 128 couples to tilt levers 136 configured to facilitate the rotation of the traction planet 126 about an axis that extends perpendicular to the plane of FIG. 9 and which passes through the center of the traction planet 126. The tilt levers 136 couple to shift cam rollers 138 that are configured to facilitate the actuation of the tilt levers 136, as will be further described below with reference to FIGS. 12-31. In some embodiments, bearings 140 (such as needle bearings, for example) provide a rolling interface between the planet axle 128 and a bore of the traction planet 126. Spacers 142 can be used to separate the bearings 140 from themselves and from the tilt levers 136. In one embodiment, skew reaction rollers 144 couple to the ends of the planet axle 128 to facilitate reaction of forces that tend to misalign the planet axle 128 about an axis perpendicular to the longitudinal axis of the planet axle 128.

Figure 11:
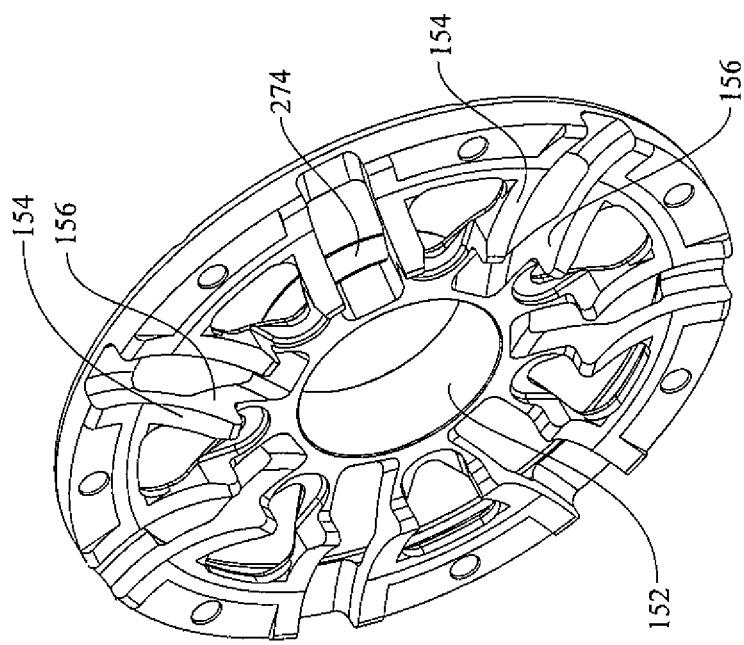
FIG. 11 is a perspective view of a stator plate that can be used with the carrier of FIG. 10.
Figure 10:
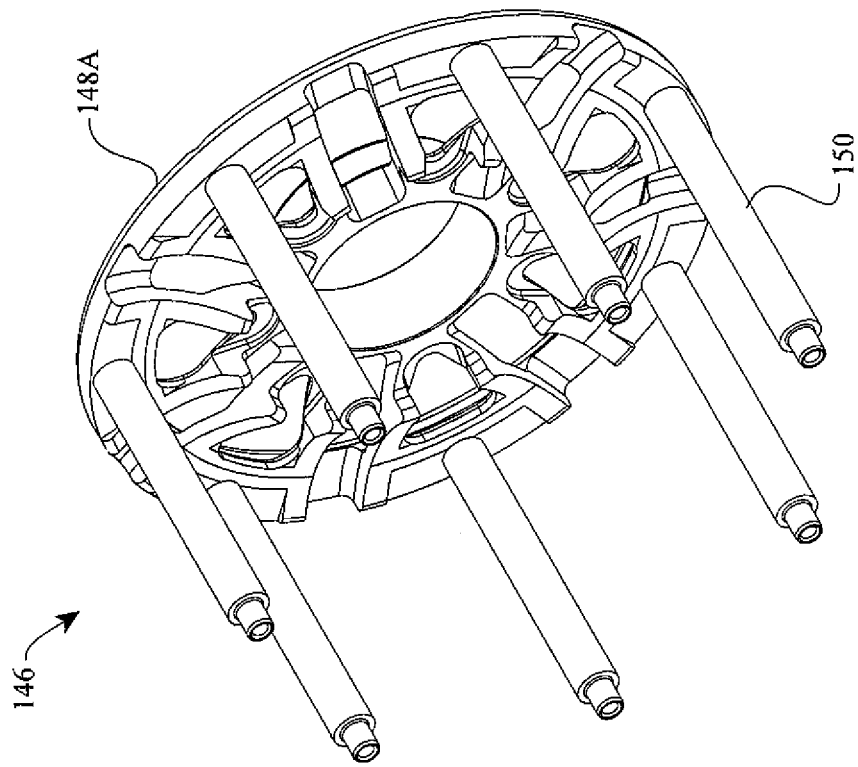
FIG. 10 is partial, perspective view of a carrier that can be used with the ETD of FIG. 5.

Turning to FIGS. 10 and 11 now, a carrier 146 for the electric traction drive 100 can include a group of stator spacers 150 coupling two stator plates 148A, 148B. The stator plate 148B is not shown in FIG. 10; however, the stator plates 148 as configured in the electric traction drive 100 are shown in FIG. 6. The stator spacers 150 are generally structural members that locate, and which prevent rotation of, one stator plate relative to the other. The stator spacers 150 can be fastened to the stator plates 148 via any suitable fastening method, including screws, welds, interference fits, etc. A stator plate 148 has a central bore 152, a group of shift reaction surfaces 154, and a group of skew reaction surfaces 156. The central bore 152 allows mounting of the stator plate 148 over the main axle 108. The shift reaction surfaces 154 provide reaction support for the shift cam rollers 138, which roll on the shift reaction surfaces 154 during an adjustment of the tilt position of the planet axle 128 (that is, during an adjustment in the speed ratio). The skew reaction surfaces 156 provide reaction support for the skew reaction rollers 144. Embodiments of the stator plates 148 and carrier 146 which are suitable for use with the electric traction drive 100 have been well described in the patents and patent applications referenced above.

Figure 20:
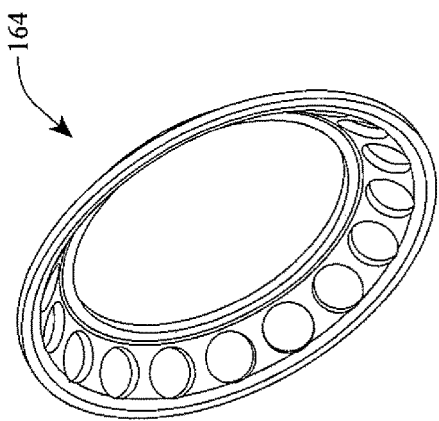
FIG. 20 is a perspective view of a bearing cage that can be used with the bearing assembly of FIG. 18.
Figure 19:
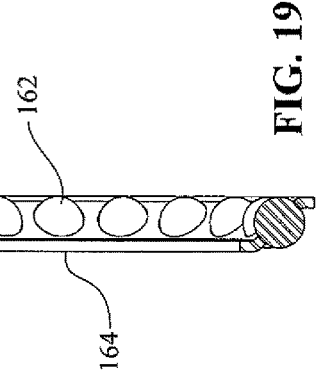
FIG. 19 is a cross-sectional view of the bearing assembly of FIG. 18.
Figure 18:
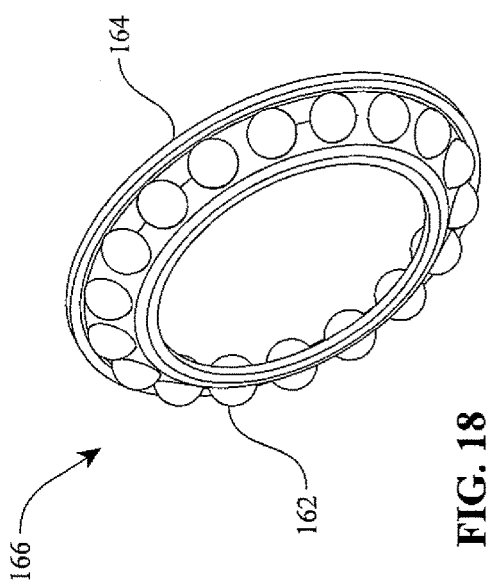
FIG. 18 is a perspective view of bearing assembly that can be used with the traction-sun-and-shift-rod subassembly of FIG. 13.

Passing now to FIGS. 12-31, a traction-sun-and-shift-rod subassembly 114 will be described. A traction sun 134 is placed between shift cams 158 (best shown in FIGS. 7, 13, and 15). In the embodiment shown, angle thrust bearings 160 provide a rolling interface between the traction sun 134 and the shift cams 158. In some embodiments, the angle thrust bearings 160 can include ball bearings 162 supported on bearing cages 164. FIGS. 18-20 illustrate a bearing assembly 166 specifically configured for use with the electric traction drive 100. As best seen in FIGS. 17 and 22, the bearing races 168 and the bearing races 170 for the angle thrust bearings 160 can be integral with the traction sun 134 and the shift cams 158, respectively. In one embodiment, the traction sun 134 is adapted to receive and ride on a caged ball bearing 172, which provides a rolling interface between the traction sun 134 and a shift rod nut 174. In the embodiment shown, bearing races 176 and 178 are press fit on the shift rod nut and cooperate with the caged ball bearing 172. In one embodiment, the traction sun 134 has formed integral therewith a bearing race 180 that cooperates with the caged ball bearing 172. The bearing race 180 can be a three- or four-point bearing race, for example. When assembled together, the bearing races 176 and 178 can provide a three- or four-point bearing race, for example. The bearing race 180 can include one or more radii to facilitate the provision of a three- or four-point bearing assembly. When assembled together, the bearing races 176, 178, and 180 preferably provide a three- or four-point contact for the ball bearings 172. In some embodiments, a bearing retainer nut 182 can be provided to secure in place the bearing races 176 and 178. The bearing retainer nut 182 can additionally facilitate adjustment of the bearing assemblies' clearance and/or preload. Preferably, the dimensions of the caged ball bearing 172, shift rod nut 174, and bearing races 176, 178, and 180 are selected such that the retainer nut 182 can be tightened without over clamping the bearing race to ball bearings contacts. In one embodiment, one or more shift cam clips 184 are provided to cooperate with the shift cams 158 to prevent relative rotation between the shift cams 158. Additionally, the shift cam clips 184 and the shift cams 158 can be configured to prevent relative rotation between the shift cams 158 and the stator plates 148. The shift cam clips 184 can be configured to generate a prescribed preload on the angular contact bearings 160.

Referring to FIGS. 16 and 17 specifically, a traction sun 134 can have a generally cylindrical outer surface 186 preferably adapted to interface with the traction planets 126. In one embodiment, the traction sun 134 includes integral therewith bearing races 168 and 170 that cooperate with the ball bearings 162 and the bearing races 170 of the shift cams 158 to provide an angular thrust bearing 160 interface between the traction sun 134 and the shift cams 158. The traction sun 134 can have a central passage 188 that allows, among other things, mounting of the traction sun 134 about the main axle 108. The traction sun 134 can also have a recess 190 adapted to receive and couple to a drive shaft 192 of the electric traction drive 100. In some embodiments, the traction sun 134 couples to the drive shaft 192 with a press fit, an interference fit, etc. In other embodiments, the traction sun 134 can couple to the drive shaft 192 via a key, spline, or clip, for example.

FIGS. 21 and 22 illustrate one embodiment of the shift cams 158. A shift cam 158 can include a central passage 194 that allows, among other things, mounting of the shift cam 158 coaxially with the main axle 108. One side of the shift cam 158 includes a bearing race 170 to provide angular thrust bearing functionality as already explained above. In one embodiment, a side of the shift cam 158 opposite to the side having the bearing race 170 is provided with a number of shift cam clip grooves 196 adapted to receive the shift cam clips 184. In the embodiment shown in FIG. 21, the shift cam 158 has three shift cam clip grooves 196; however, in other embodiments, a shift cam 158 can have one or more shift cam clip grooves 196. In one embodiment, the shift cam 158 has as many shift cam clip grooves as there are stator plate spacers 150 in the electric traction drive 100. The shift cam 158 is provided with a shift cam profile 198 adapted to interface with the shift cam rollers 138 to facilitate a shift in the tilt angle of the planet axles 128. Suitable shift cam profiles 198, and other general aspects related to the configuration and construction of the shift cams 158, are detailed in the patents and patent applications referenced above.

Passing now to FIG. 23, a suitable shift cam clip 184 will be described. The shift cam clip 184 includes fingers 200 adapted to cooperate with the shift cam clip grooves 196 for preventing relative rotation between the shift cams 158. In some embodiments, the shift cam clip 184 can include a grip portion 202 that is operationally coupled to the fingers 200 and extends radially therefrom. The grip portion 202 is adapted to grip a stator plate spacer 150 whereby the shift cam clip 184 prevents the shift cams 158 from rotating relative to the stator plates 148. In one embodiment, the grip portion 202 is configured to slide along a surface of a stator plate spacer 150. In other embodiments, the fingers 200 can be operationally coupled to a stator plate spacer 150 via an extension that is keyed, screwed, press fit, sliding fit, etc., to the stator plate spacer. In other embodiments, the shift cam clip 184 does not include the grip portion 202; in yet other embodiments, the fingers 200 are not part of one integral piece, but rather are separate components that can be rigidly coupled through a suitable fastening method, such as by welding, screwing, press fit, etc.

Figure 26:
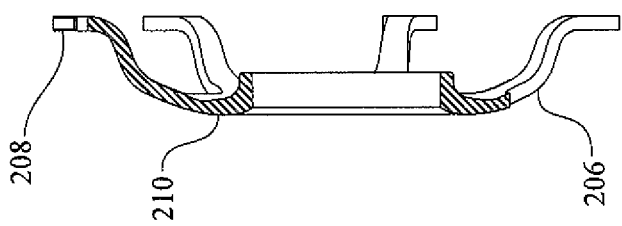
FIG. 26 is a cross-sectional view of the alternative shift cam of FIG. 24.
Figure 25:
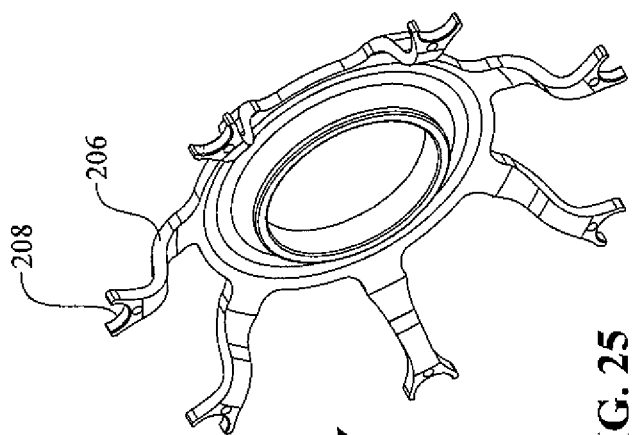
FIG. 25 is a second perspective view of the alternative shift cam of FIG. 24.
Figure 24:
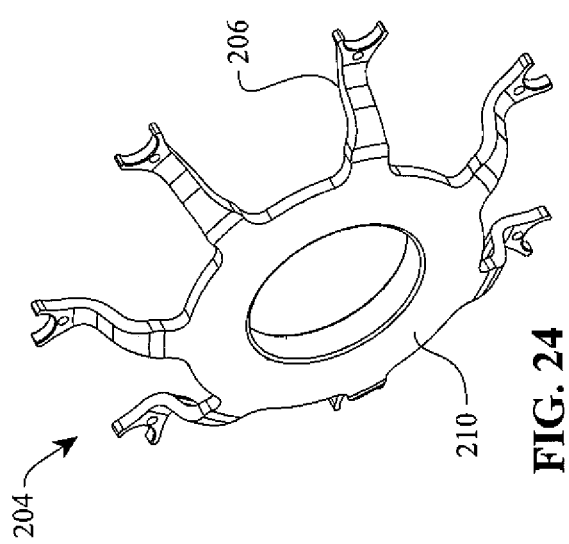
FIG. 24 is a perspective view of an alternative shift cam that can be used with the subassembly of FIG. 12.

Turning now to FIGS. 24-26, an alternative shift cam 204 can have integral anti-rotation extensions 206. In the embodiment illustrated, the shift cam 204 includes a number of anti-rotation extensions 206 equal to the number of stator plate spacers in the electric traction drive 100 of one embodiment. As shown, the anti-rotation extensions 206 have grip portions 208 adapted to engage the stator plate spacers 150 to thereby prevent rotation of the shift cam 204 relative to the stator plates 148. As assembled, the anti-rotation extensions 206 of one shift cam 204 are configured to extend axially toward the anti-rotation extensions of the other shift cam 204, said anti-rotation extensions 206 can be fastened to each other via screws, welds, clips, etc. The shift cam 204 can have any suitable shift cam profile 210 known in the relevant technology.

Figure 28:
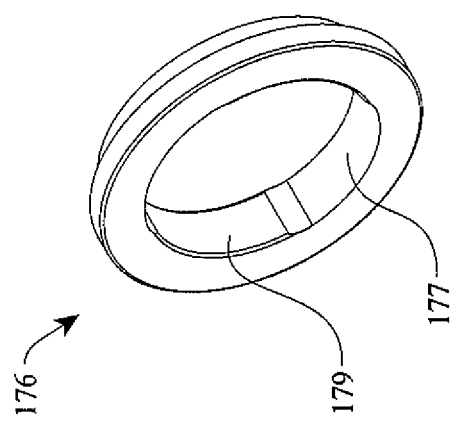
FIG. 28 is a second perspective view of the custom bearing race of FIG. 27.
Figure 29:
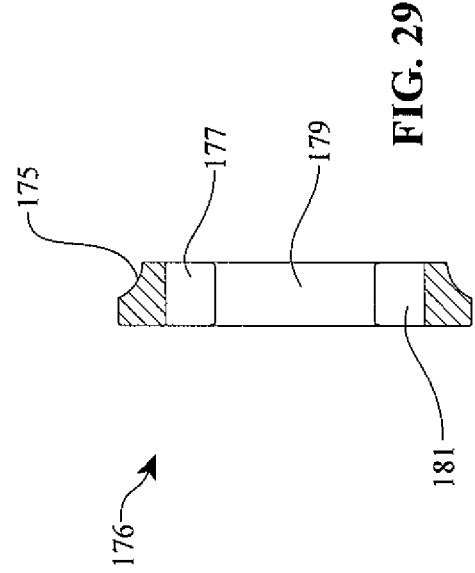
FIG. 29 is a cross-sectional view of the custom bearing race of FIG. 27.
Figure 27:
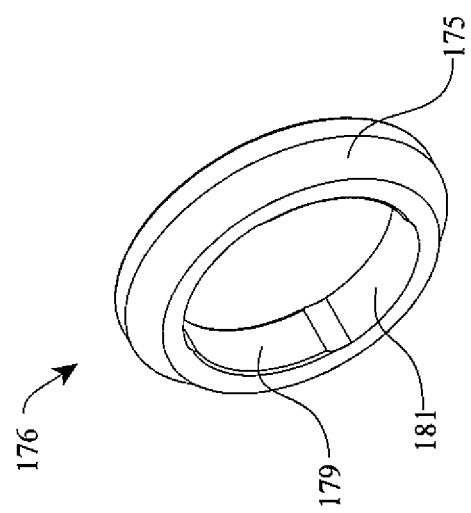
FIG. 27 is a perspective view of custom bearing race that can be used with the subassembly of FIG. 12.
Figure 32:
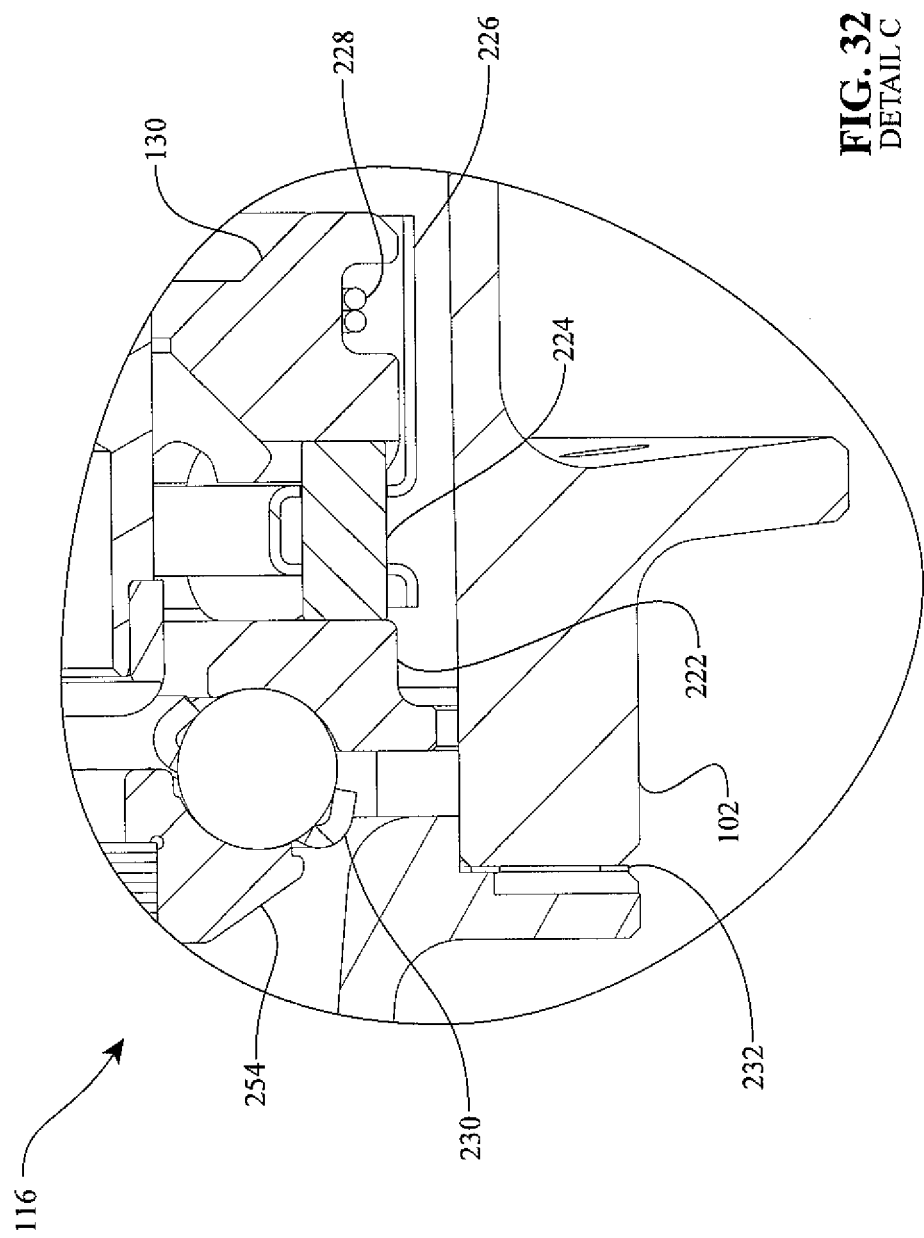
FIG. 32 is a Detail C view of the ETD of FIG. 5 generally showing a power-output-and-clamp-force-generation subassembly.
Figure 33:
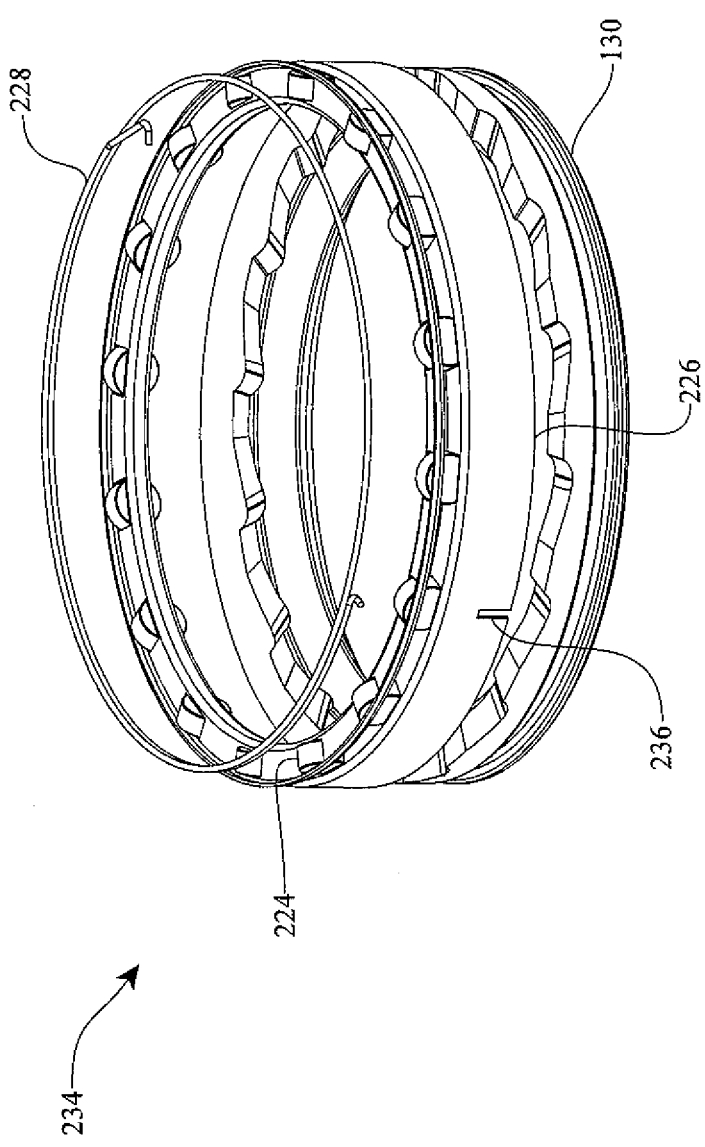
FIG. 33 is a perspective view of certain components of a load cam assembly.
Figure 34:
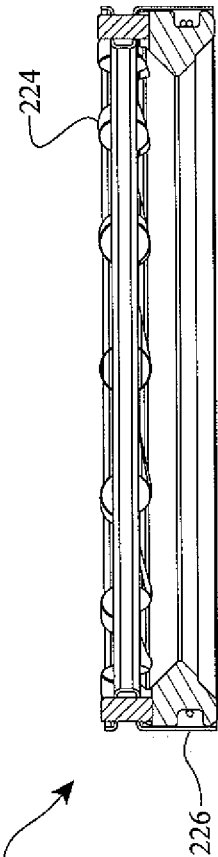
FIG. 34 is a cross-sectional view of the components of FIG. 33.

FIGS. 27-29 illustrate one embodiment of a bearing race 176, 178 that can be used with the traction-sun-and-shift-rod subassembly 114. In one embodiment, the bearing race 176 includes a bearing surface 175 on an outer diameter and a central bore 177. The central bore 177 can be configured with a first surface 179 adapted to couple to a shift rod nut 174. A second surface 181 of the central bore 177 can be configured to clear a threaded portion 220 of the shift rod nut 174.

Figure 12:
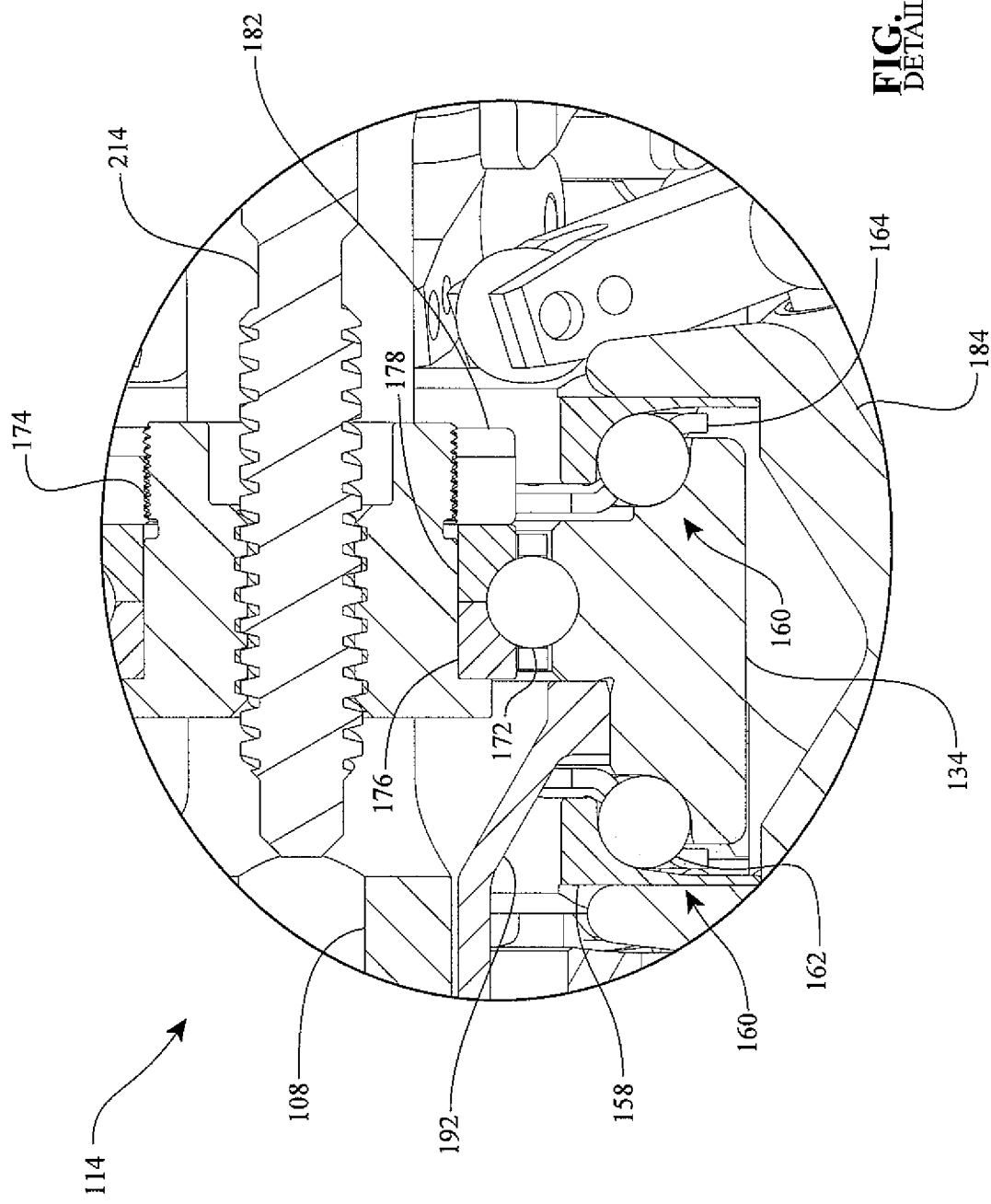
FIG. 12 is a Detail B view of the ETD of FIG. 5 generally showing a traction-sun-and-shift-rod subassembly.
Figure 13:
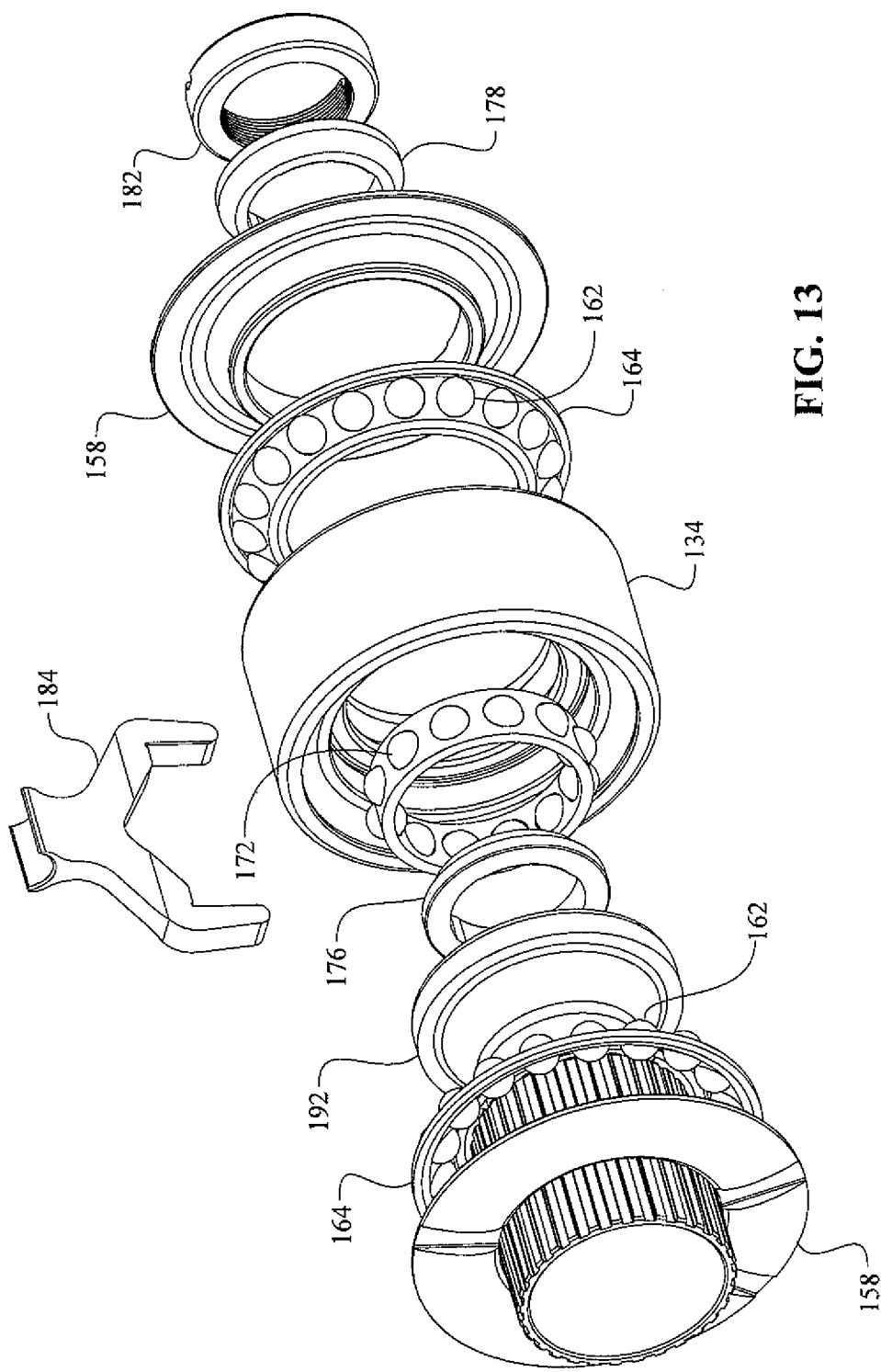
FIG. 13 is an exploded view of certain components of a traction-sun-and-shift-rod subassembly that can be used with the ETD of FIG. 5.

Referencing FIGS. 12, 30 and 31, one embodiment of the shift rod nut 174 that can be used in the traction-sun-and-shift-rod subassembly 114 includes a threaded central bore 212 adapted to engage a mating threaded shift rod 214. The shift rod nut 174 can be provided with a shift nut flange 216 that axially engages the bearing race 176; as the shift rod nut 174 translates axially toward the right (in the orientation of FIG. 12), the shift rod nut 174 causes the angle thrust bearing 172 to simultaneously, axially translate the traction sun 134. An exterior surface 218 of the shift rod nut 174 is adapted to receive the bearing races 176 and 178, which can be mounted on the shift rod nut 174 via a press fit, interference fit, or any other suitable coupling. In one embodiment, the shift rod nut 174 can have a threaded portion 220 adapted to engage the mating threads of the bearing retainer nut 182. In some embodiments, the shift rod nut 174 includes two flat sides 221 adapted to react against sides of a slot of the main axle 108 to keep the shift rod nut 174 from rotating. Embodiments of a suitable shift rod 214 for use with the traction-sun-and-shift-rod subassembly 114 are described in the patents and patent applications previously referenced.

Turning to FIGS. 32-48, a power-output-and-clamp-force-generation subassembly 116 includes the first traction ring 130 coupled to a drive ring 222 via a set of load cam rollers 224, which are supported in a load cam roller cage 226. In one embodiment, a torsion spring 228 couples the load cam roller cage 226 to the first traction ring 130 in order to provide a preload clamping force (that is, a certain amount of clamping force is generated by, in part, the torsion spring 228 to keep the traction ring 130 in contact with the traction planets 126 when the torque in the system is significantly low). In the embodiment illustrated, a caged ball bearing 230 provides axial thrust reaction between the drive ring 222 and the electromotive device subassembly 122. The drive ring 222 is adapted to couple to the main shell 102 and thereby transfer torque to the main shell 102. In one embodiment, a gasket 232 is placed between the main shell 102 and the housing cap 104.

As shown in FIGS. 33-38, a load cam assembly 234 can include the traction ring 130, load cam roller cage 226, load cam rollers 224, and torsion spring 228. A first end of the torsion spring couples to a notch 236 of the load cam roller cage 226, and a second end of the torsion spring couples to the traction ring 130. Details of the operation of the load cam assembly 234 have been disclosed in the patent applications referenced above.

In one embodiment, with reference to FIGS. 35-38, a traction ring 130 can include a number of load cam ramps 238 to facilitate the generation of clamping force. The traction ring 130, in some embodiments, can include an annular recess 240 that receives the torsion spring 228. As best seen in FIG. 38, the traction ring 130 includes a contact surface 242 adapted to interface with the traction planets 126 via a frictional and/or tractional modality. The traction ring contact surface 242 in some embodiments does not extend uniformly to the lateral edge face 244 of the traction ring 130; rather, the traction ring contact surface 242 transitions into an annular recessed face 246 which does not contact the traction planets 126 and extends to the lateral edge face 244.

In one embodiment, as shown in FIGS. 39-41, a drive ring 222 includes a number of drive ring splines 248 adapted to engage mating splines of the main shell 102. The drive ring 222 can include a drive surface 250 configured to engage the load cam rollers 224, and thereby facilitate transfer of torque from the load cam rollers 224 to the main shell 102. In some embodiments, the drive surface 250 is flat; however, in other embodiments, the drive surface 250 can have a number of ramps that cooperate with the load cam rollers 224 and the load cam ramps 238 to facilitate the generation of clamping force and the transmission of torque. In one embodiment, the drive ring 222 can include integral thereto a bearing race 252 to provide angular thrust bearing functionality in conjunction with the caged ball bearing 230 and a bearing race 254 of the electromotive device subassembly 122.

Figure 43:
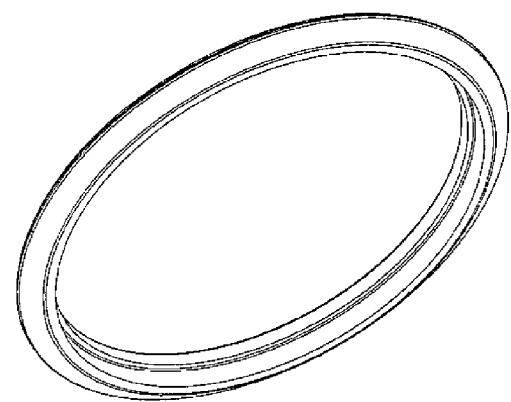
FIG. 43 is a second perspective view of the bearing race of FIG. 42.
Figure 44:
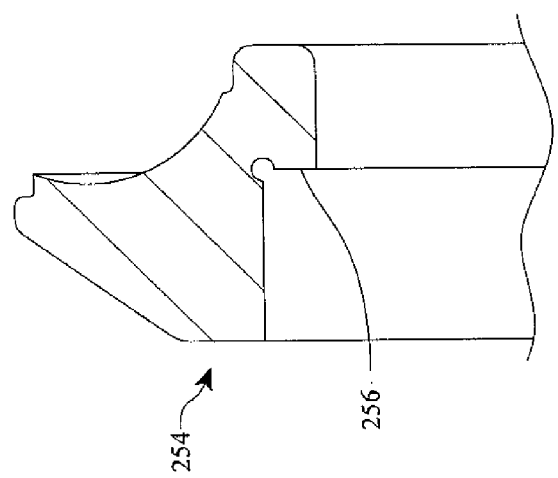
FIG. 44 is a partial, cross-sectional view of the bearing race of FIG. 43.
Figure 42:
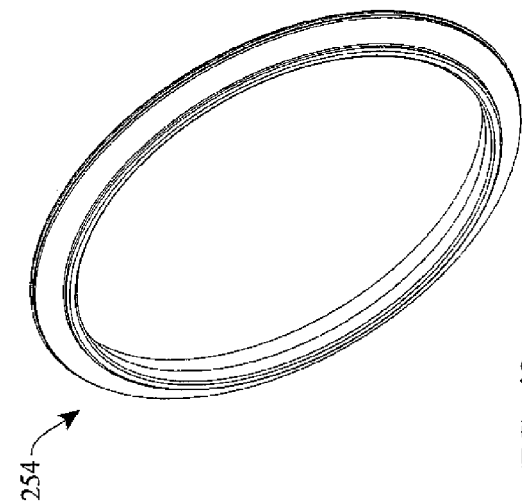
FIG. 42 is a perspective view of a bearing race that can be used with the subassembly of FIG. 32.
Figure 48:
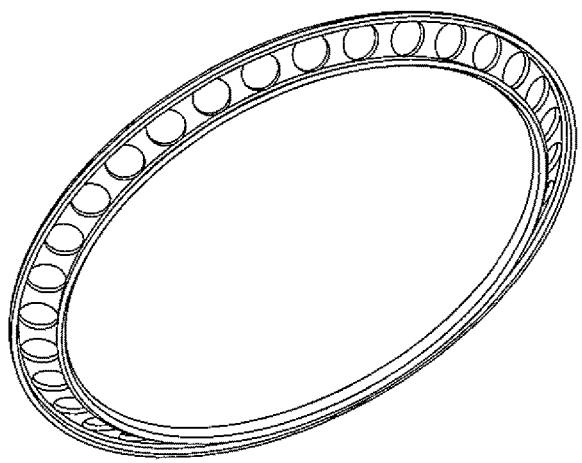
FIG. 48 is a perspective view of a bearing retaining cage that can be used with the bearing assembly of FIG. 45.
Figure 46:
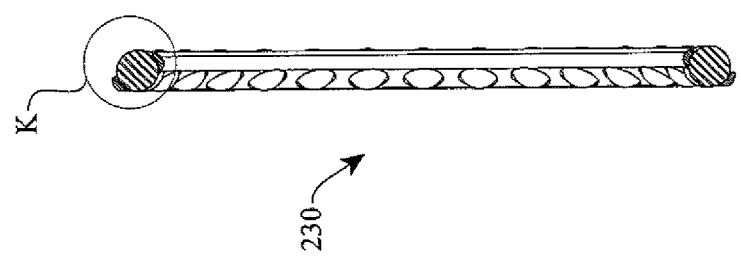
FIG. 46 is a cross-sectional view of the bearing assembly of FIG. 45.
Figure 45:
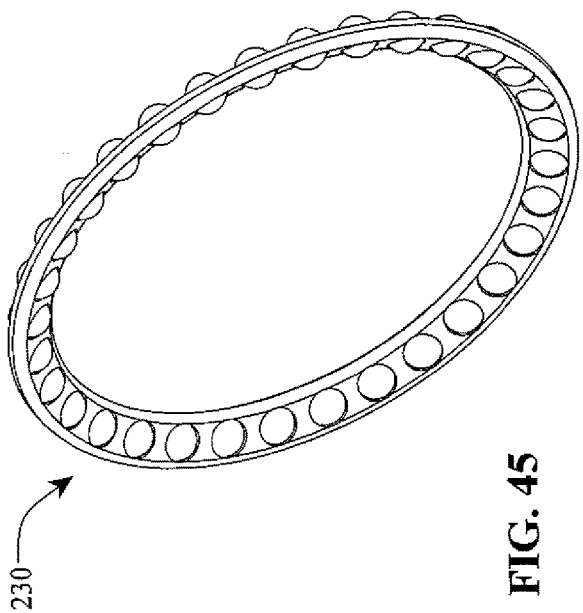
FIG. 45 is a perspective view of a caged ball bearing assembly that can be used with the subassembly of FIG. 32.
Figure 47:
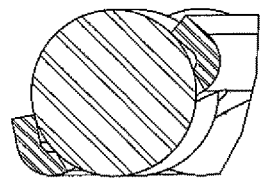
FIG. 47 is a Detail K view of the bearing assembly of FIG. 46.
Figure 49:
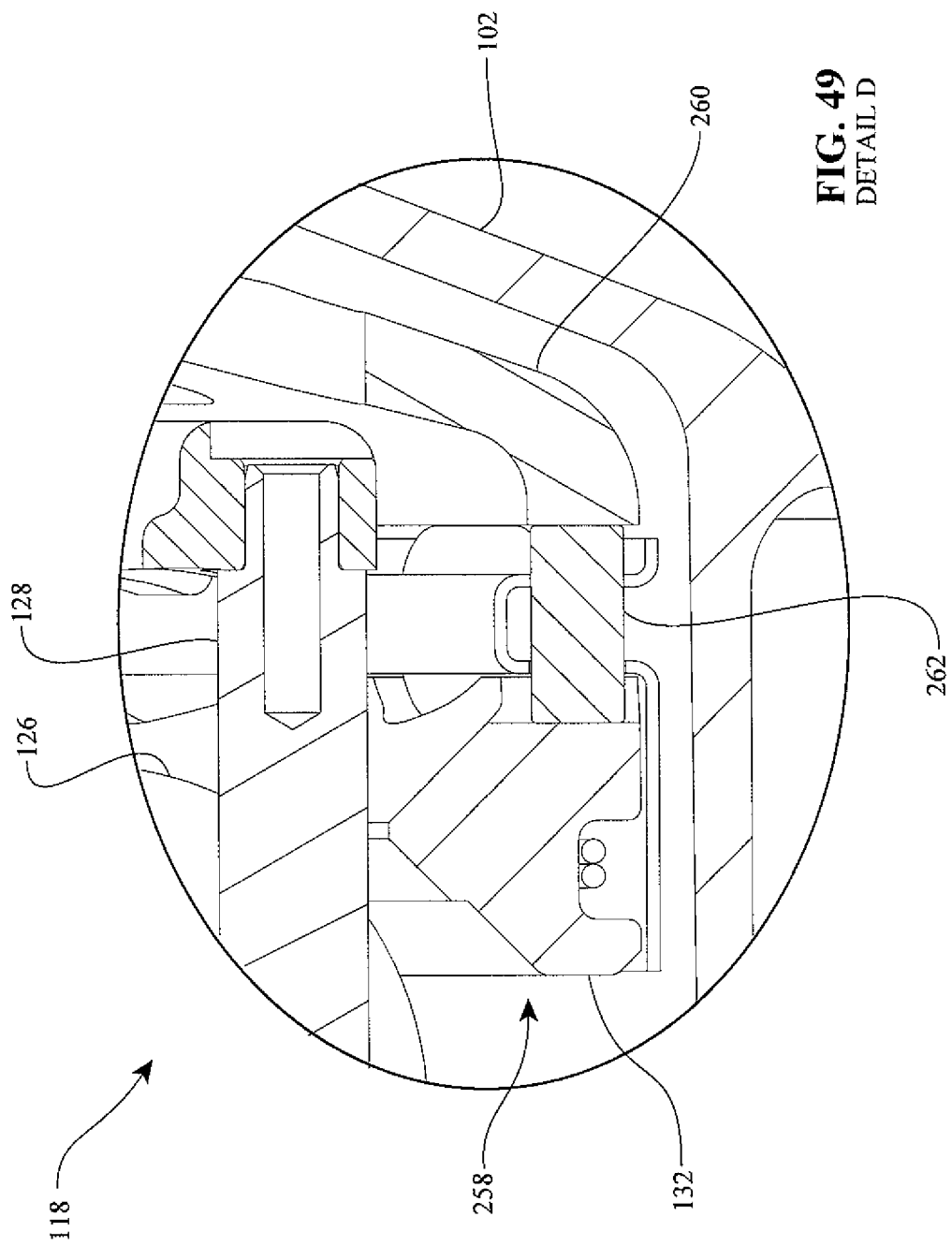
FIG. 49 is a Detail D view of a planet-reaction-and-clamp-force-generation subassembly that can be used with the ETD of FIG. 5.

FIGS. 42-44 show one embodiment of a suitable bearing race 254 that can be used to cooperate with the bearing race 252. The bearing race 254 includes an annular shoulder 256 adapted to thrust axially against certain components of the electromotive device subassembly 122, as will be described further below with reference to FIGS. 55-66. FIGS. 45-48 depict one embodiment of a suitable caged ball bearing 230 for use with the power-output-and-clamp-force-generation subassembly 116.

Referencing FIGS. 49-53, the planet-reaction-and-clamp-force-generation subassembly 118 includes a load cam assembly 258 substantially similar to the load cam assembly 234 described above with reference to FIGS. 33 and 34. The traction ring 132 couples to a reaction flange 260 via the load cam rollers 262. In one embodiment, the reaction flange 260 is prevented from rotation about the longitudinal axis 110 through a rigid coupling to the main axle 108. Hence, the traction ring 132 is prevented from significant rotation. That is, the traction ring 132 rotates only that amount sufficient for the load ramps of the traction ring 132 to energize the load cam rollers 262 against the reaction flange 260.

Figure 51:
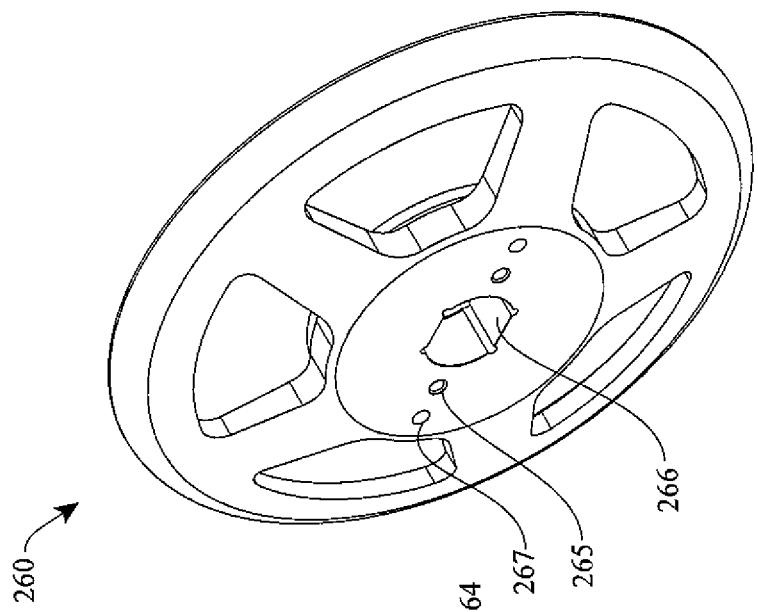
FIG. 51 is a perspective view of the reaction flange of FIG. 50.
Figure 52:
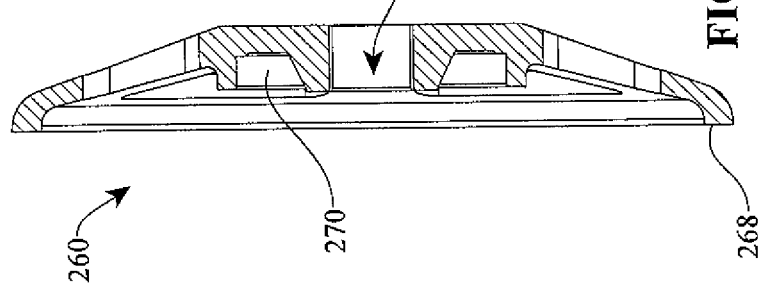
FIG. 52 is a cross-sectional view of the reaction flange of FIG. 50.
Figure 50:
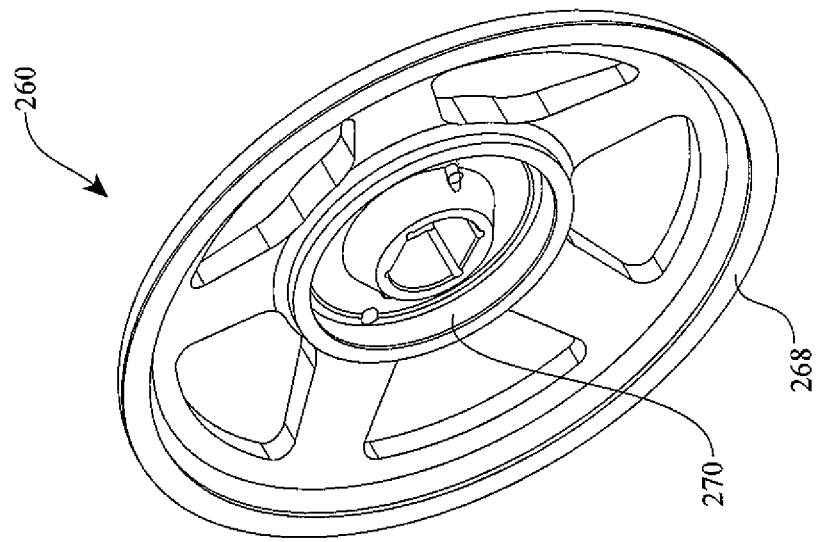
FIG. 50 is a perspective view of a reaction flange that can be used with the subassembly of FIG. 49.
Figure 53:
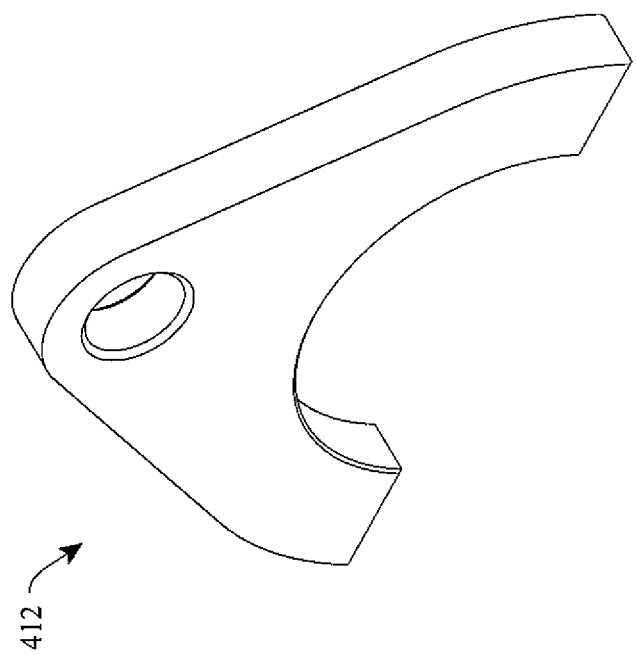
FIG. 53 is a perspective view of a retaining clip that can be used with the subassembly of FIG. 49.

In one embodiment, as shown in FIGS. 50-52, the reaction flange 260 includes a central passage 264, which has flat flange bore sides 266 that engage mating features on the main axle 108 to prevent rotation of the reaction flange 260 relative to the main axle 108. The reaction flange 260 can include a flange reaction surface 268 adapted to engage the load cam rollers 238. In some embodiments, the reaction flange 260 includes a recess 270 configured to receive a bearing 272 that provides an interface between the stator plate 148A and the reaction flange 260 (see FIG. 5). The stator plate 148A can include a shoulder 274 for receiving the bearing 272 (see FIG. 11). It should be noted that in some embodiments of the electric traction drive 100 the stator plates 148 are rotatable about the longitudinal axis 110. A radially extending portion of the body of the reaction flange 260 can include one or more cutouts to, among other things, lighten the reaction flange 260. A retaining clip 412, as shown in FIG. 53, can be used to facilitate axial constraint of the reaction flange 260. Holes 265 on the reaction flange 260 can be used to fasten the retaining clip 412 to the reaction flange 260. In embodiment, bearing removal holes 267 can be provided on the reaction flange 260 to facilitate the removal of the bearing interposed between the reaction flange 260 and the stator plate 148A.

Figure 54:
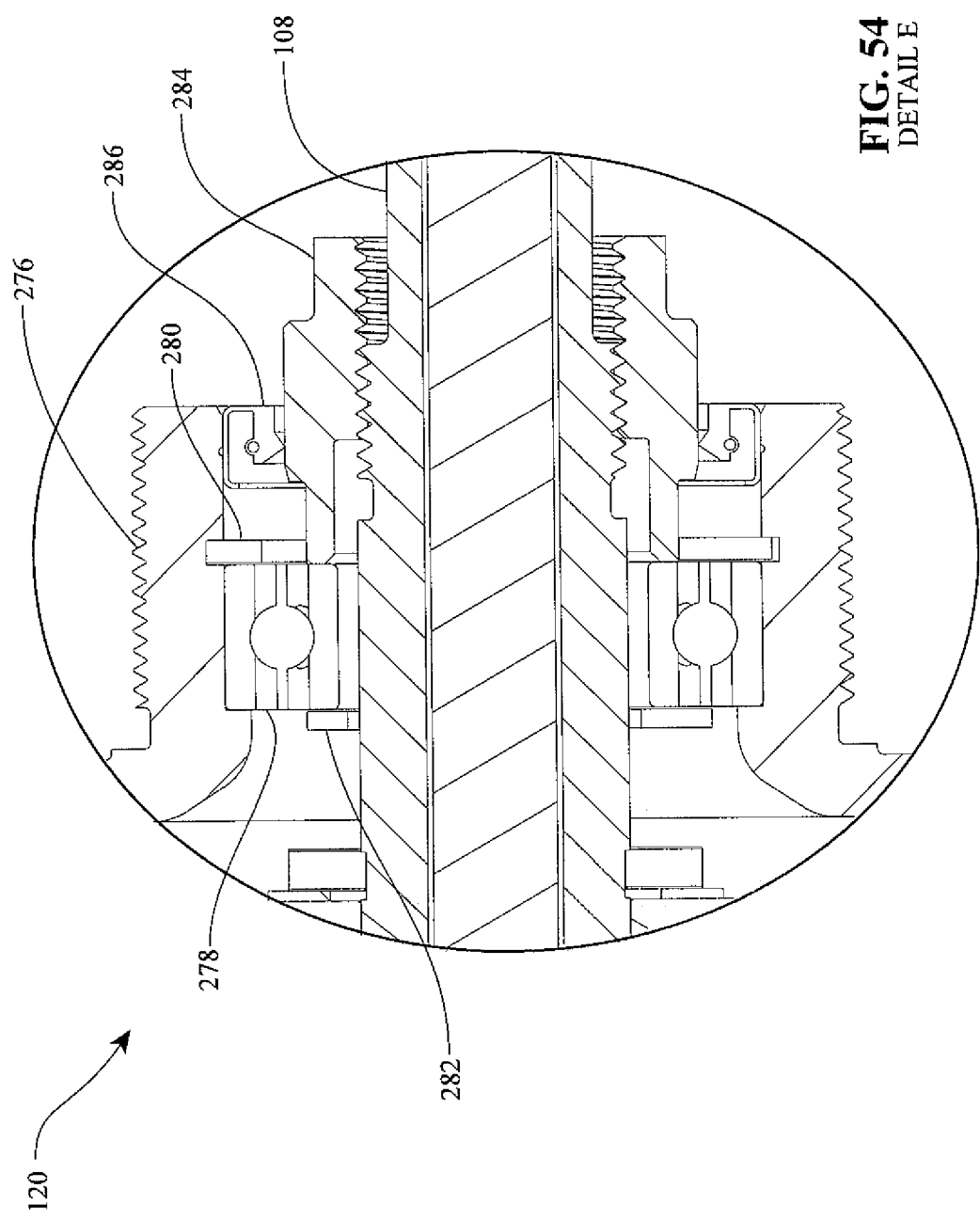
FIG. 54 is a Detail E view of the ETD of FIG. 5, generally showing an input interface subassembly.
Figure 55:
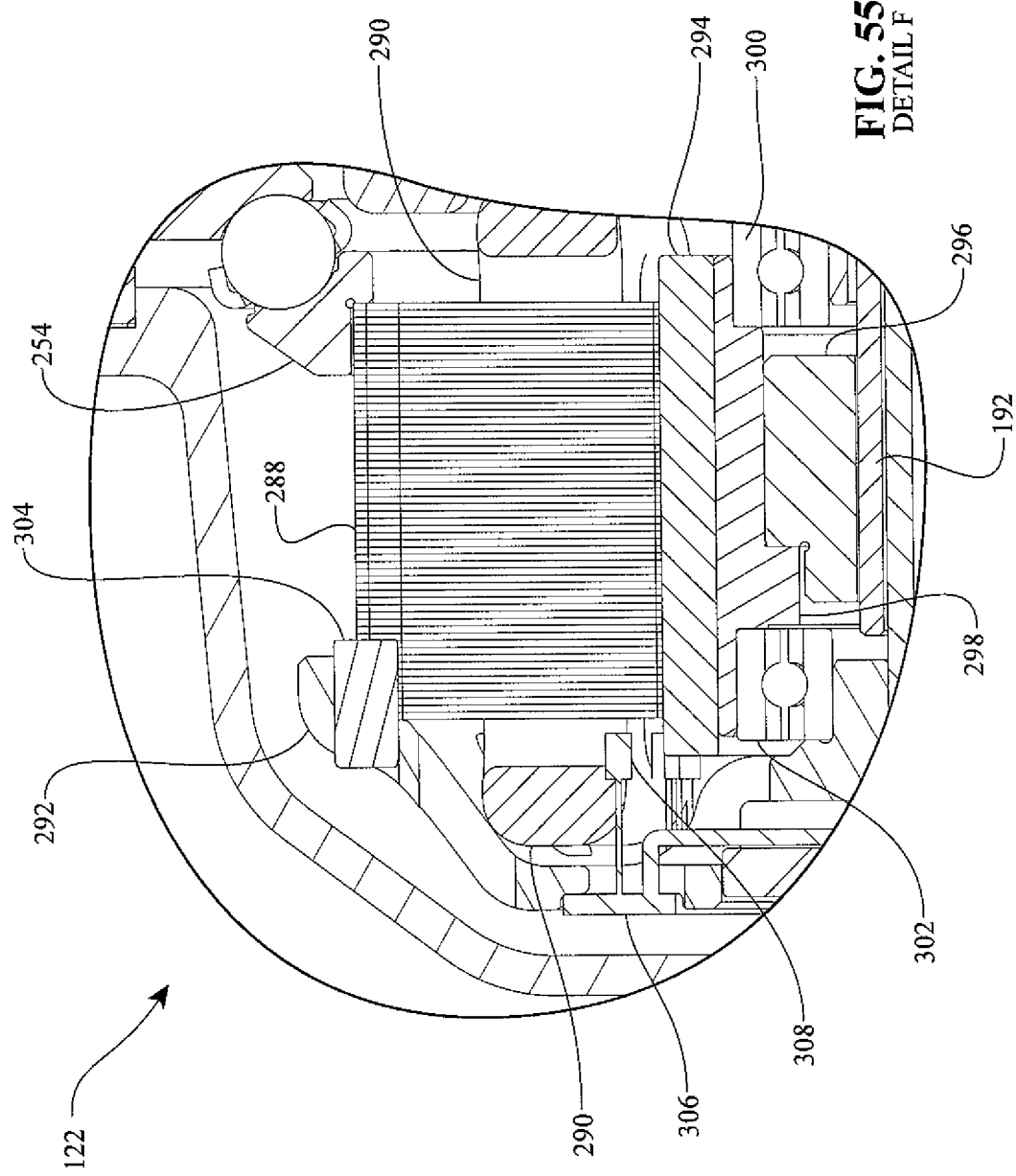
FIG. 55 is a Detail F view of the ETD of FIG. 5, generally showing an electromotive device subassembly.
Figure 56:
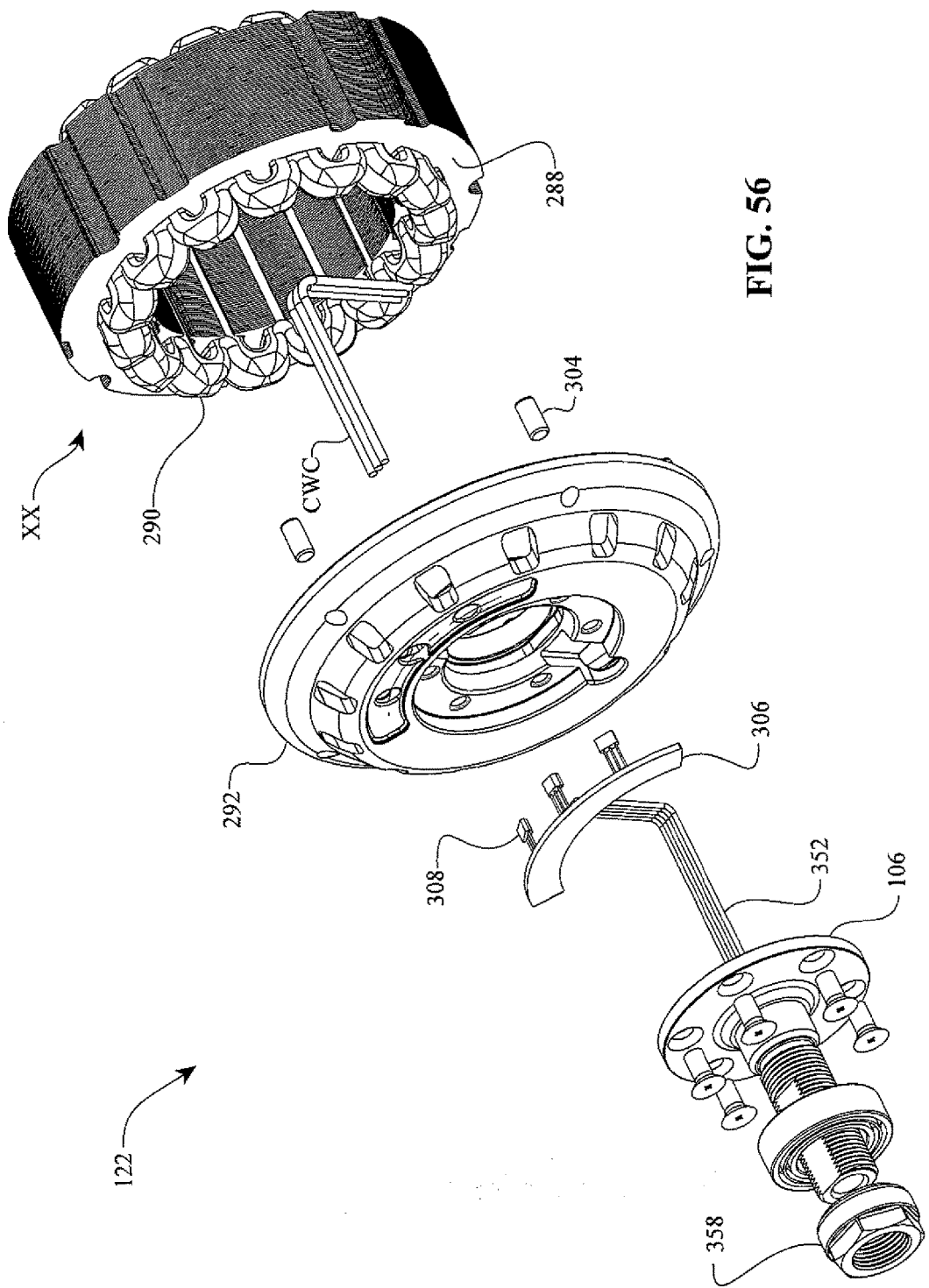
FIG. 56 is a partial, exploded view of certain components of the electromotive device subassembly of FIG. 55.

Turning now to FIG. 54, an input interface subassembly 120 can include a threaded input interface 276, which in the embodiment illustrated is integral with the main shell 102. The threaded input interface 276 can be adapted to, for example, receive a threaded freewheel adapter (not shown) to couple to a freewheel or a cog (not shown) for transmitting torque to the main shell 102. In other embodiments, the main shell 102 can be provided instead with a key, spline, etc., coupling to receive torque from an external power source or prime mover. A bearing 278 provides a rolling interface between the main shell 102 and the main axle 108.

In one embodiment, the outer race of the bearing 278 is held in place axially by a shoulder of the input interface 276 and a clip 280. The inner race of the bearing 278 can be held in place axially by a clip 282 and an axle retainer nut 284, which axle retainer nut 284 includes a threaded inner diameter for engaging a mating threaded portion of the main axle 108. A seal 286 can be provided between the threaded input interface 276 and the axle retainer nut 284.

Referencing FIGS. 55-66, an electromotive device subassembly 122 can include a number of stator laminations 288 adapted to cooperate with a number of electrical conductor windings 290 as is known in the relevant technology of electrical motors and similar devices. In one embodiment, the stator laminations 288 are located or piloted radially by a surface of a support frame 292, which is described below with reference to FIGS. 64-66. A permanent magnet rotor assembly 294 is placed coaxially about the main axle 108 and radially inward of the stator laminations 288. The permanent magnet rotor assembly 294 is located radially within the electromotive device subassembly 122 such that a suitable air gap exists between the permanent magnet rotor assembly 294 and the stator laminations 288. A drive shaft adapter 296 couples the drive shaft 192 to a rotor backiron 298 of the permanent magnet rotor assembly 294. A bearing 300 provides a rolling interface and axial thrust reaction between the rotor backiron 298 and a shoulder of the stator plate 148B. A bearing 302 provides a rolling interface and axial thrust reaction between the rotor backiron 298 and a shoulder of the support frame 292. In one embodiment, the stator laminations 288 are held fixed rotationally by anti-rotation dowel pins 304 that couple the support frame 292 to the stator laminations 288. In some embodiments, the electromotive device subassembly 122 includes a Hall effect sensor circuit board 306 connected to one or more Hall effect sensors 308. The Hall effect sensor circuit board 306 can be supported by the support frame 292. A bearing race 254 can be provided to facilitate axial and radial reaction and/or location of the electromotive device subassembly 122 relative to the power-output-and-clamp-force-generation subassembly 116. That is, the bearing race 254 cooperates with the caged ball bearing 230 and the bearing race 252 to, among other things, facilitate the generation of a clamping force by providing an axial force reaction.

Figure 60:
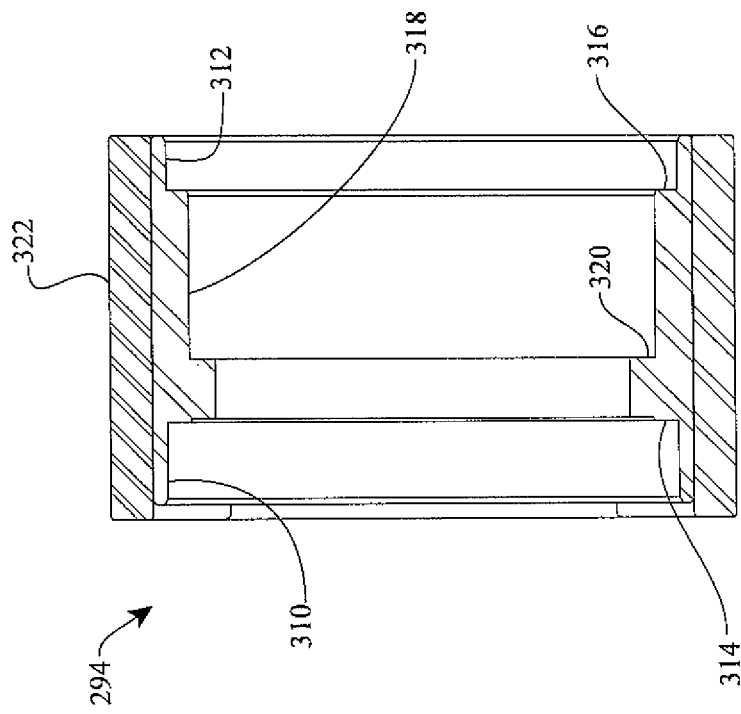
FIG. 60 is a cross-sectional view of the magnet rotor subassembly of FIG. 59.
Figure 59:
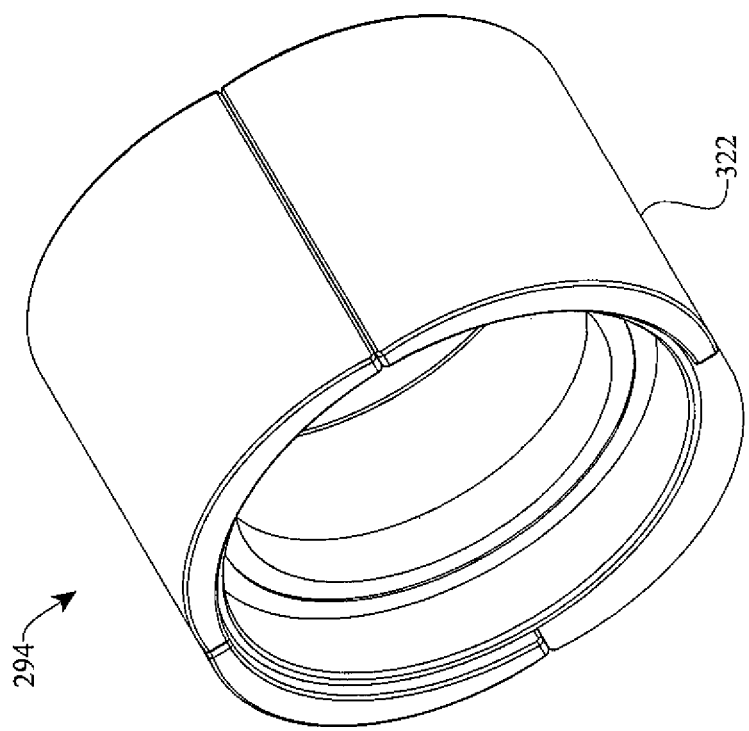
FIG. 59 is a perspective view of a magnet rotor assembly that can be used with the electromotive subassembly of FIG. 55.

Passing to FIGS. 59 and 60 now, the rotor backiron 298 can be provided with a recess 310 for receiving the bearing 302 and a recess 312 for receiving the bearing 300. Shoulders 314 and 316 can be formed in the rotor backiron 298 to provide axial reaction support for the bearings 302 and 300, respectively. In one embodiment, the rotor backiron 298 includes an inner diameter coupling 318 adapted to couple to the drive shaft adapter 296. The rotor backiron 298 can couple to the drive shaft adapter 296 through a press fit, interference fit, key, weld, set screw, etc. In some embodiments, the rotor backiron includes a shoulder 320 to provide axial thrust reaction to the drive shaft adapter 296. An exterior surface (not labeled) of the rotor backiron 298 is configured to receive and support a group of permanent magnets 322. The general construction of the permanent magnet rotor assembly 294 is known in the relevant technology of electrical devices and machines, such as electric motors.

As illustrated in FIGS. 61-62, a drive shaft adapter 296 can include a splined central bore 324 that couples to a corresponding splined portion of the drive shaft 192. An outer diameter 326 of the drive shaft adapter 296 can be configured to couple to the rotor backiron 298, as described above. A shoulder 328 can be formed on the drive shaft adapter 296 to mate with the shoulder 320 to provide axial thrust reaction support. The splined coupling between the drive shaft adapter 296 and the drive shaft 192 allows for axial translation of the drive shaft 192 and torque transfer from the rotor backiron 298 to the drive shaft 192 through the drive shaft adapter 296.

Figure 66:
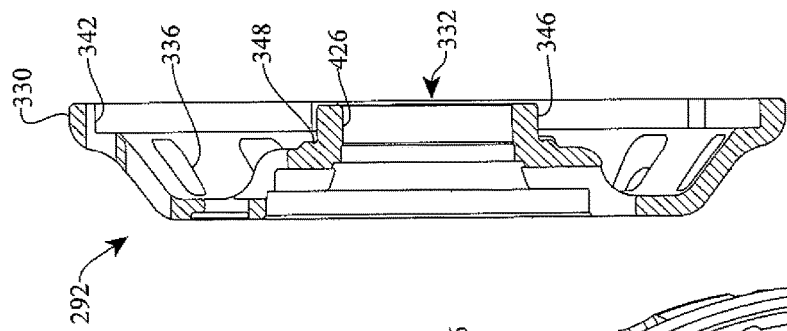
FIG. 66 is a cross-sectional view of the support frame of FIG. 65.
Figure 65:
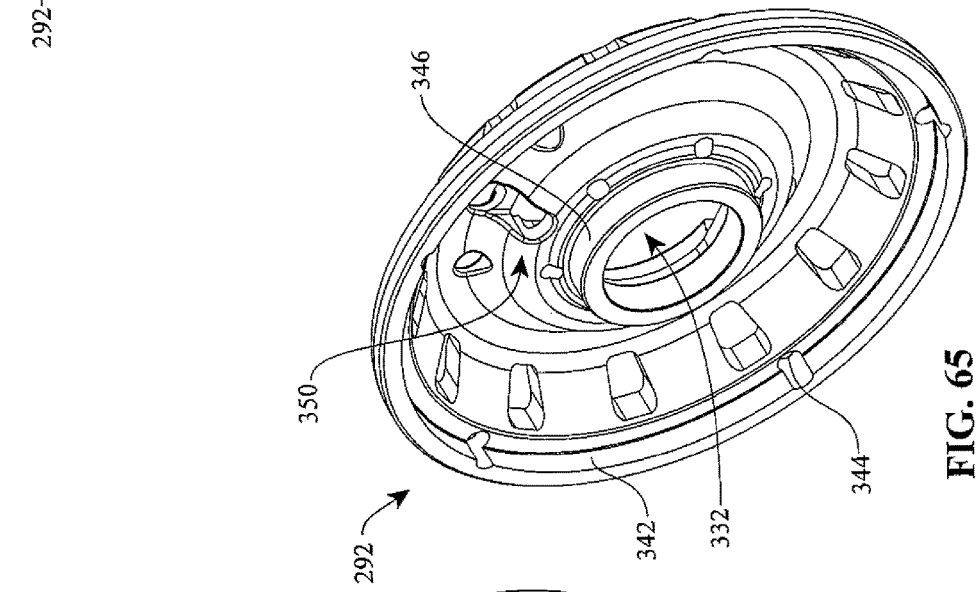
FIG. 65 is a second perspective view of the support frame of FIG. 64.
Figure 64:
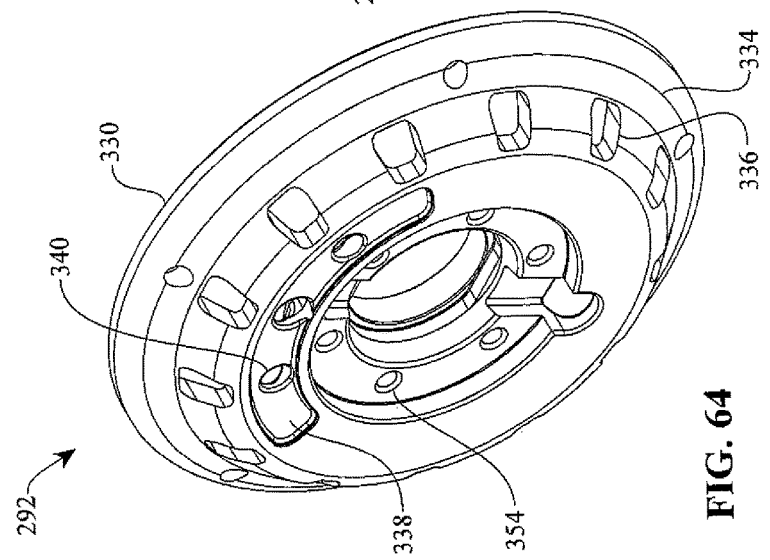
FIG. 64 is a perspective view of a support frame that can be used with the subassembly of FIG. 55.
Figure 67:
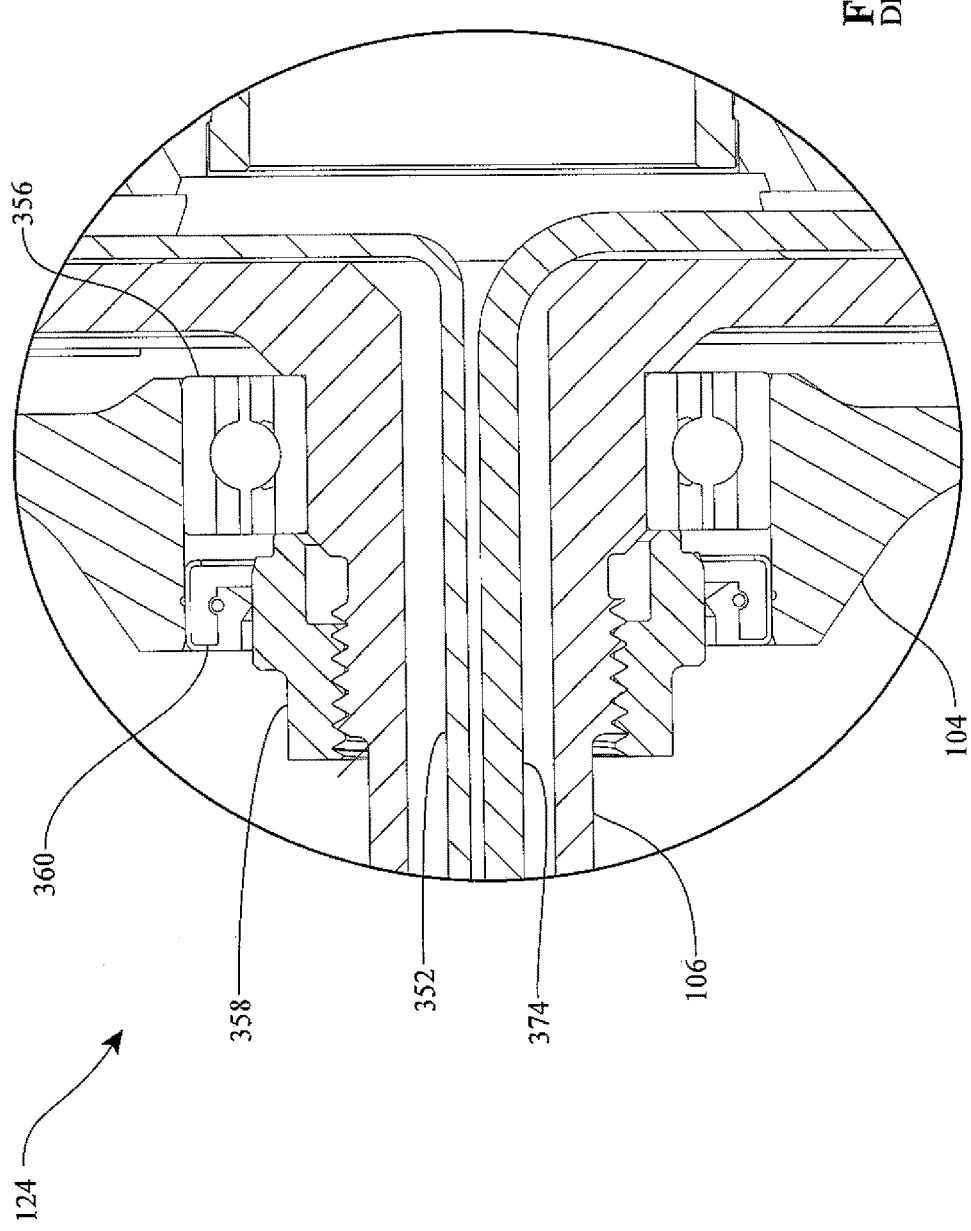
FIG. 67 is a Detail G view of the ETD of FIG. 5, generally showing a housing-cap-end-interface subassembly.

Turning to FIGS. 64-66, a support frame 292 is generally circular having an outer perimeter 330 and a central passage 332. A frame body portion 334 of the support frame 292 extends generally conically and radially from the central passage 332 to the outer perimeter 330. The frame body portion 334 can, in some embodiments, include a number of cutouts 336 to lighten the support frame 292. In one embodiments, the support frame 292 includes a sensor board recess 338 adapted to receive and support the Hall effect sensor board 306. Passages 340 allow the routing of electrical conductors to connect the Hall effect sensor board 306 to Hall effect sensors 308. An inner diameter 342 of the support frame 292 can be configured to provide a locational fit for the stator laminations 288. The support frame 292 can include a number of dowel pin holes 344 for receiving the dowel pins 304. In some embodiments, the support frame 292 has a support neck 346 to receive and support the bearing 302. A support shoulder 348 of the support frame 292 is adapted to provide axial thrust reaction to the bearing 302. The support frame 292 can have a first conductor passage 350 that allows passage of electrical conductors 352 for the Hall effect sensor circuit board 306. In some embodiments, the support fame 292 can be provided with a number of bolt holes 354 to facilitate the fastening of the support frame 292 to an auxiliary axle 106, which is adapted to hold the support frame 292 rotationally fixed about the longitudinal axis 110.

Figure 69:
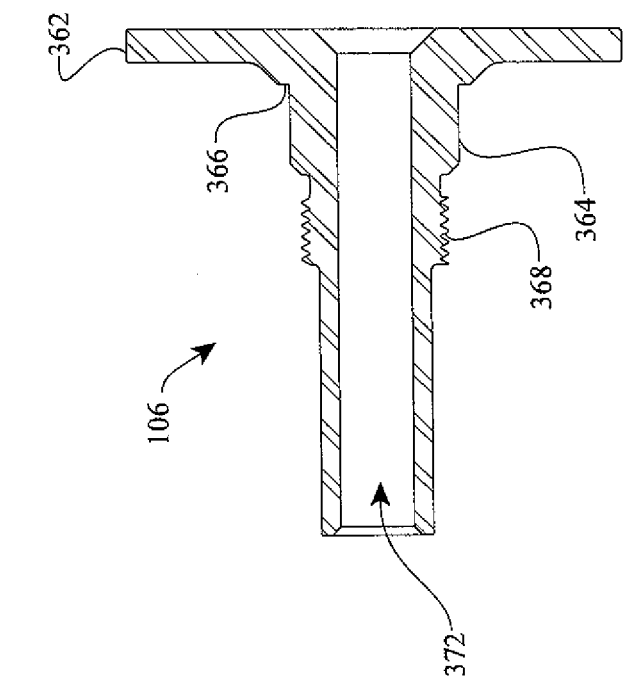
FIG. 69 is a cross-sectional view of the auxiliary axle of FIG. 68.
Figure 68:
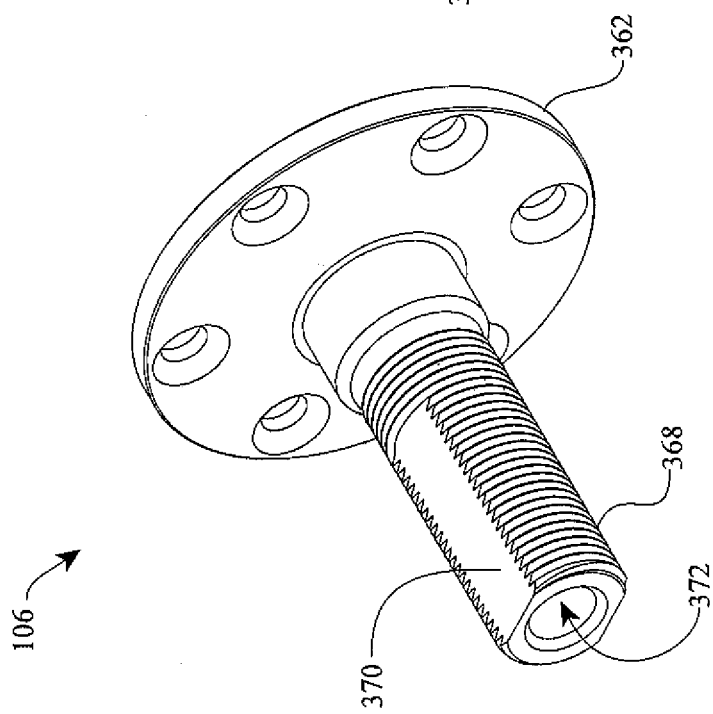
FIG. 68 is a perspective view of an auxiliary axle that can be used with the subassembly of FIG. 67.

A housing-cap-end-interface subassembly 124 will now be described with reference to FIGS. 67-72. In one embodiment, the housing cap 104 is adapted to receive a bearing 356 that allows the housing cap 104 to be supported on the auxiliary axle 106 and to rotate about the longitudinal axis 110. The bearing 356 is restrained axially by a retaining nut 358 and the auxiliary axle 106. A seal 360 is placed between the retaining nut 358 and the housing cap 104. As shown in FIGS. 68 and 69, in one embodiment, the auxiliary axle 106 can include a flange 362 configured for coupling the auxiliary axle 106 to the support frame 292. A seat 364 of the auxiliary axle 106 is adapted to receive the bearing 356, and a shoulder 366 of the auxiliary axle 106 can be configured to, among other things, axially constrain the bearing 356. The auxiliary axle 106 can include a threaded portion 368 for mating to threads of retaining nut 358. In some embodiments, the auxiliary axle 106 can have flat sides 370 to facilitate the mounting of the auxiliary axle 106, and thereby the electric traction drive 100, to a frame of a vehicle or equipment. The auxiliary axle 106 can have a central passage 372 that allows routing of electrical conductors 374 for the electrical conductor windings 290 and of electrical conductors 352 for the Hall effect sensor circuit board 306.

Referencing FIGS. 70-72, a housing cap 104 has a generally bowl-shaped body 376 adapted to cooperate with the main shell 308 to provide a housing for the electric traction drive 100. Around a perimeter of the housing cap 104, a flange 378 is provided for fastening the housing cap 104 to the main shell 102. A central bore 380 of the housing cap can be configured to receive the bearing 356 and the seal 360. One embodiment of the main shell 102 is illustrated in FIGS. 73-75. The main shell 102 can be a generally cylindrical body 382 having a large open end 384 and a relatively smaller open second end 386, which can include the threaded input interface 276 described above with reference to FIG. 54. The end 386 can include a seat 388 for receiving the bearing 278 and a shoulder 390 for facilitating the axial constraint of the bearing 278. In one embodiment, the end 386 includes an annular groove 392 for receiving the retaining clip 280. In some embodiments, the end 386 can have a groove and seat 393 for receiving the seal 286. In certain embodiments, the main shell 102 includes one or more flanges 394 for facilitating the transfer of torque out of the electric traction drive 100 to a load. The main shell 102 of FIGS. 73-75 can be used, for example, to drive a wheel (not shown) by attaching the spokes of the wheel to the flanges 394. The open end 384 of the main shell 102 preferably includes a rim 396, for example, to facilitate the fastening of the housing cap 104 to the main shell 102.

As illustrated in FIGS. 76 and 77, one embodiment of the drive shaft 192 includes a generally cylindrical and hollow body 398. An external diameter 400 can have a set of splines configured to mate with the splines of the drive shaft adapter 296. The drive shaft 192, in some embodiments, includes a drive shaft flange 402 adapted to engage the traction sun 134 to transfer torque thereto.

Referencing FIGS. 78 and 79, one embodiment of a main axle 108 includes a first end having a threaded portion 404 for engaging the axle retainer nut 284 (see FIG. 120). The main axle 108 can be provided with flat sides 406 for facilitating the mounting and/or fastening of the main axle 108 to equipment or a vehicle, for example. In one embodiment, the main axle 108 includes additional flat sides 408 for providing a rigid coupling for a reaction flange 260 (see FIG. 5, for example, showing the reaction flange 260 mounted on the main axle 108). In some embodiments, the main axle 108 exhibits a groove 410 adapted to receive a reaction flange retaining clip 412 (see FIG. 53). The reaction flange retaining clip 412 is configured to facilitate axial constrain of the reaction flange 260. In some embodiments, the reaction flange retaining clip 412 is fastened to the reaction flange 260 with screws, for example. The main axle 108 can have an annular groove 414 for receiving the clip 282, which facilitates axial constraint of the bearing 278 (see FIG. 120).

In one embodiment, the main axle 108 includes a through slot 416 configured to receive the shift rod nut 174 (see FIGS. 6 and 12, for example). The through slot 416 is adapted to allow the shift rod nut 174 to translate axially, but the through slot 416 can also prevent the shift rod nut 174 from rotating about the longitudinal axis 110. In some embodiments, the main axle 108 can have a bore 418 for receiving, as well as facilitating the axial constrain of, the shift rod 214 (see FIG. 5, for example). A second end of the main axle 108 can be provided with a generally tubular portion 420 having a cavity 421 that, among other things, can be configured to receive an actuator for a shift rod; one embodiment of an electric traction drive having such an actuator and shift rod configuration is described below with reference to FIGS. 103-105. In one embodiment, the tubular portion 420 includes a flange 422 having one or more flats 424 adapted to mate with corresponding flats 426 in the central passage of the support frame 292 (see FIGS. 5 and 66).

The electric traction drive 100 and equivalent variants thereof described herein can be used in many applications including, but not limited to, bicycles, other human powered vehicles, light electrical vehicles, hybrid human-, electric-, or internal combustion powered vehicles, industrial equipment, tools (such as a drill press), wind turbines, electricity generators, etc. Any technical application that requires modulation of mechanical power transfer between an input source and an output load can implement embodiments of an electric traction drive 100 in its power train.

Figure 80:
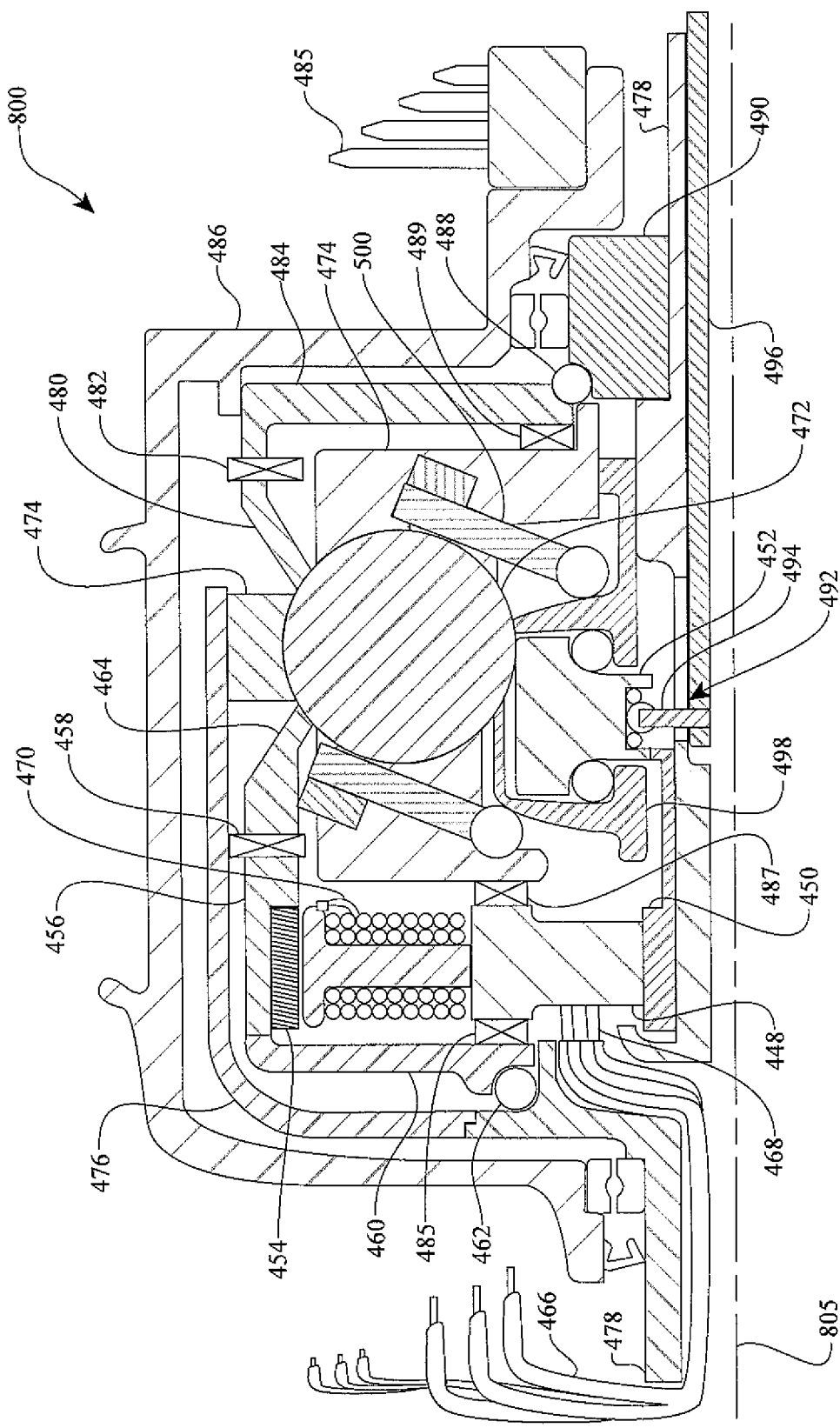
FIG. 80 is a cross-sectional view of another embodiment of an electrical traction drive.
Figure 81:
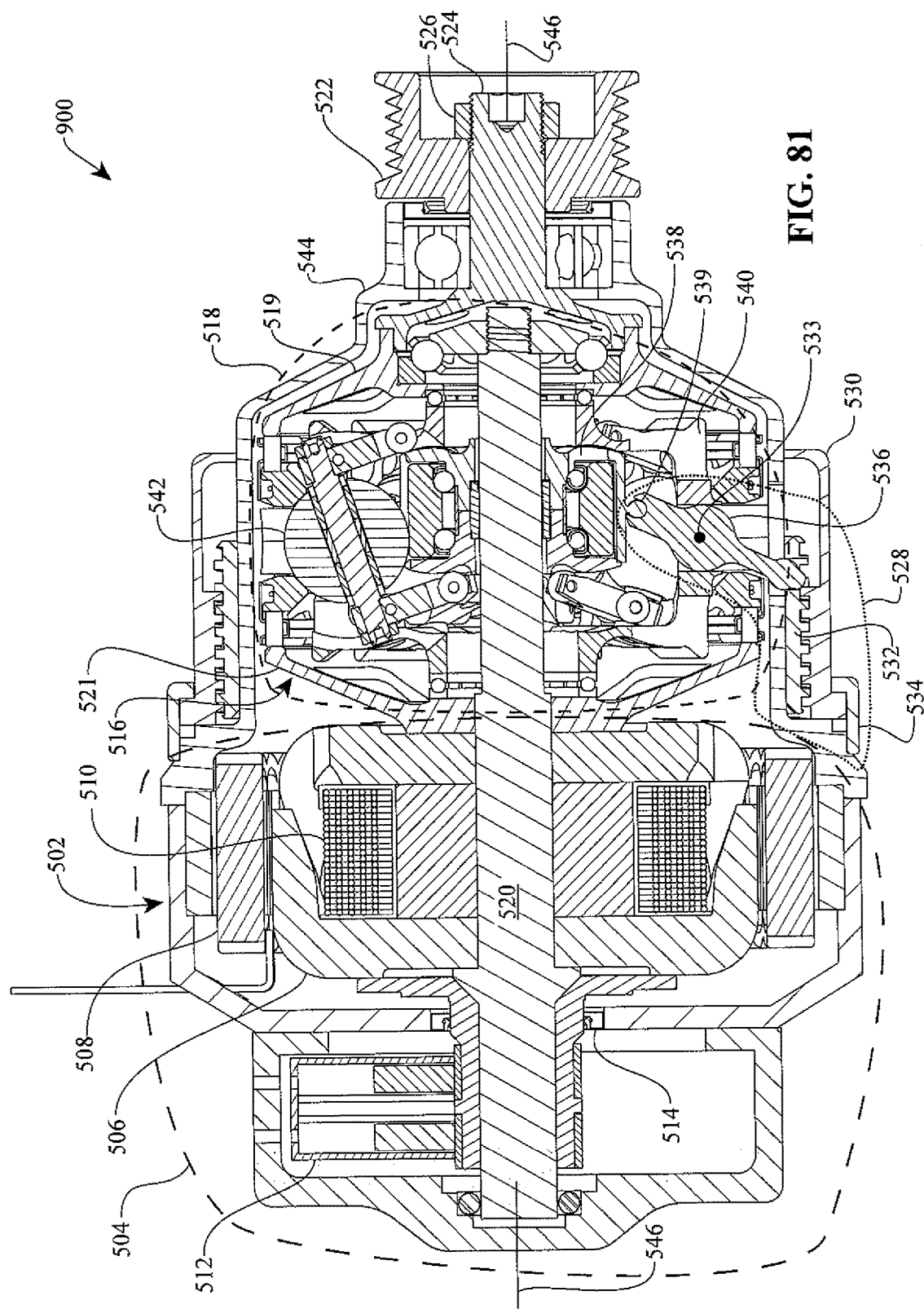
FIG. 81 is a cross-sectional view of yet another embodiment of an electric traction drive.
Figure 82:
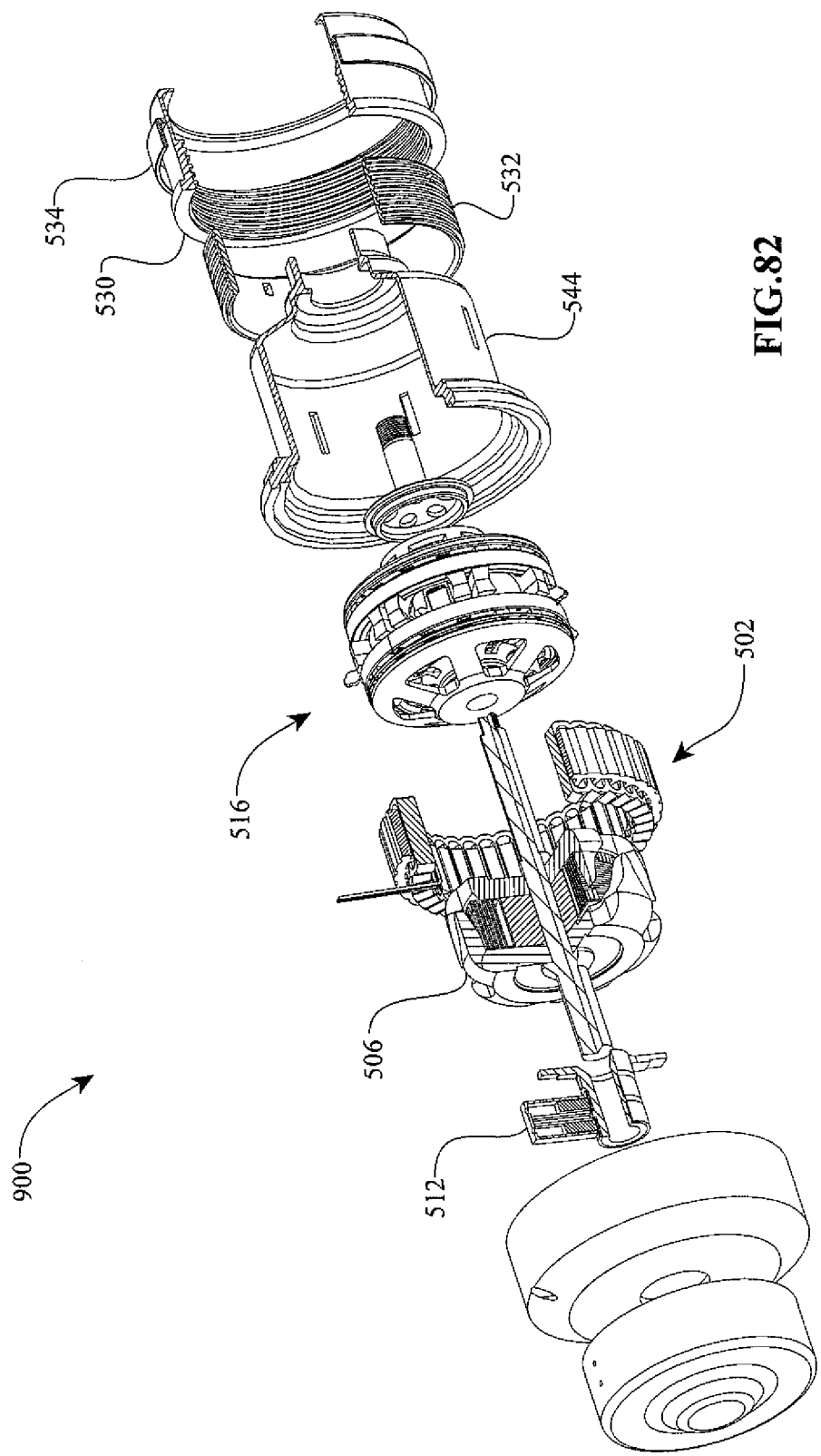
FIG. 82 is a partially exploded view of certain components of the electric traction drive of FIG. 81.
Figure 83:
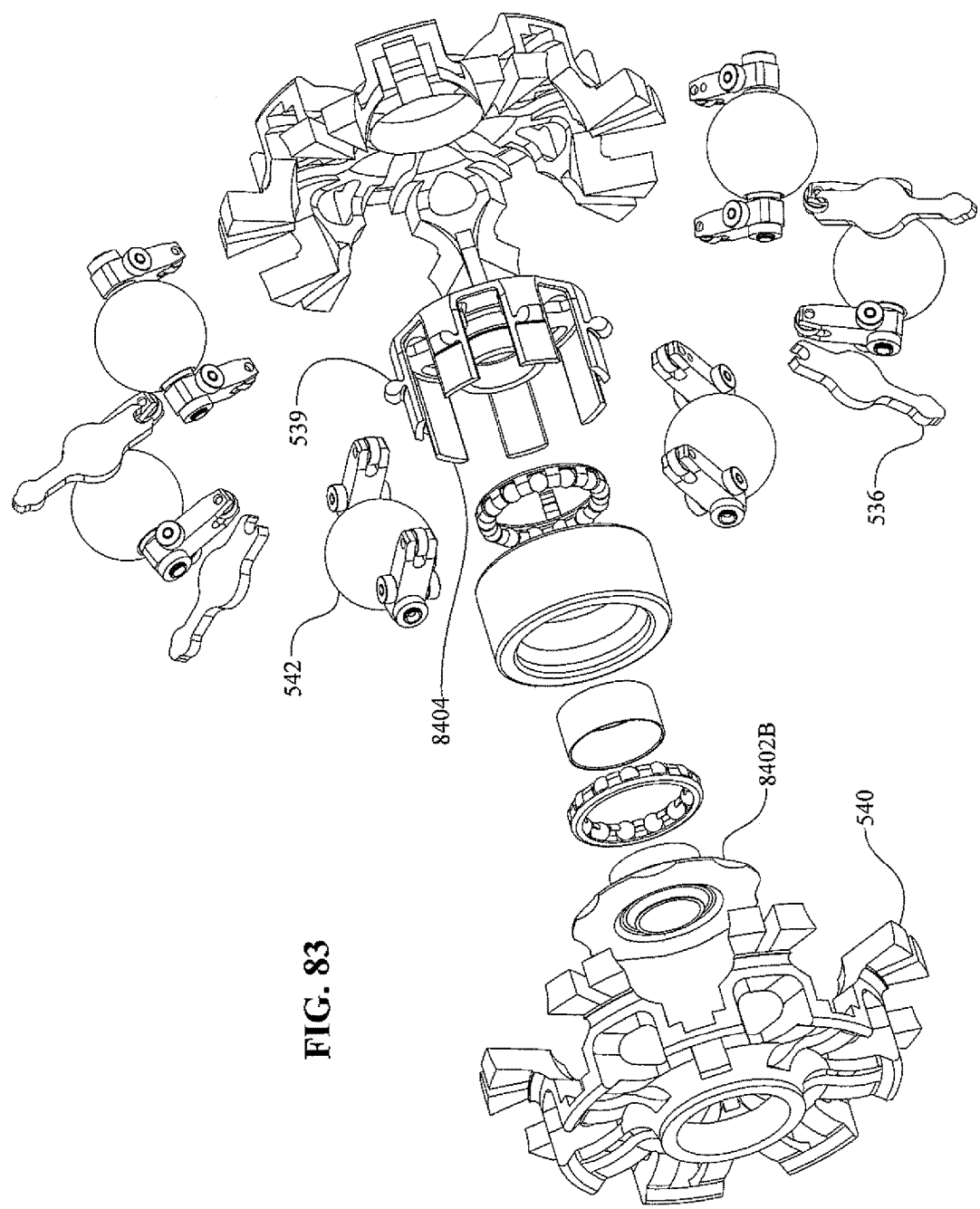
FIG. 83 is a partially exploded view of certain components that can be used with the electric traction drive of FIG. 82.
Figure 84:
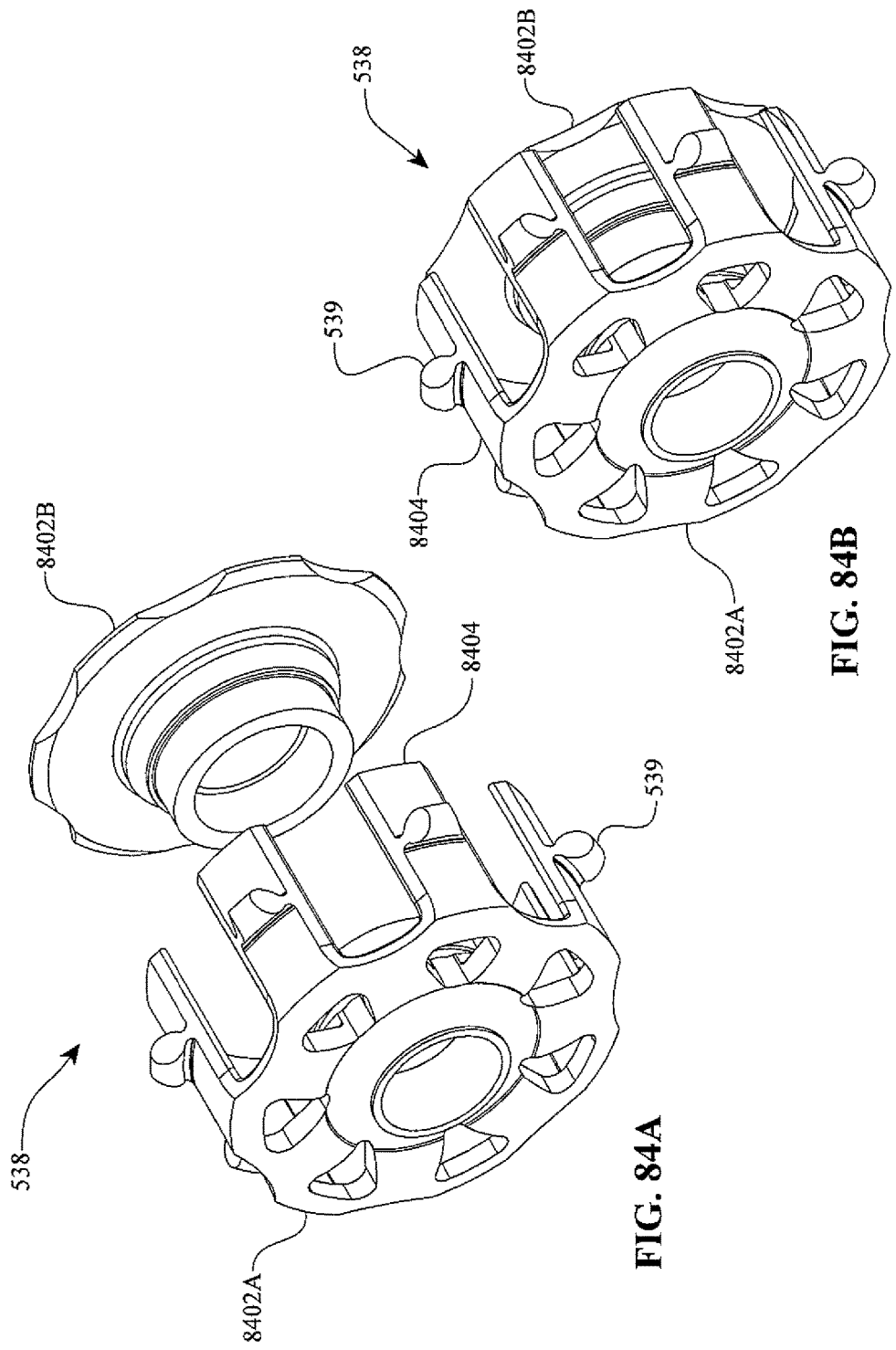
FIG. 84A is an exploded, perspective view of a shift cam cage assembly that can be used with various embodiments of an electric traction drive.
FIG. 84B is a perspective view of the assembled shift cam cage assembly of FIG. 84A.
Figure 85:
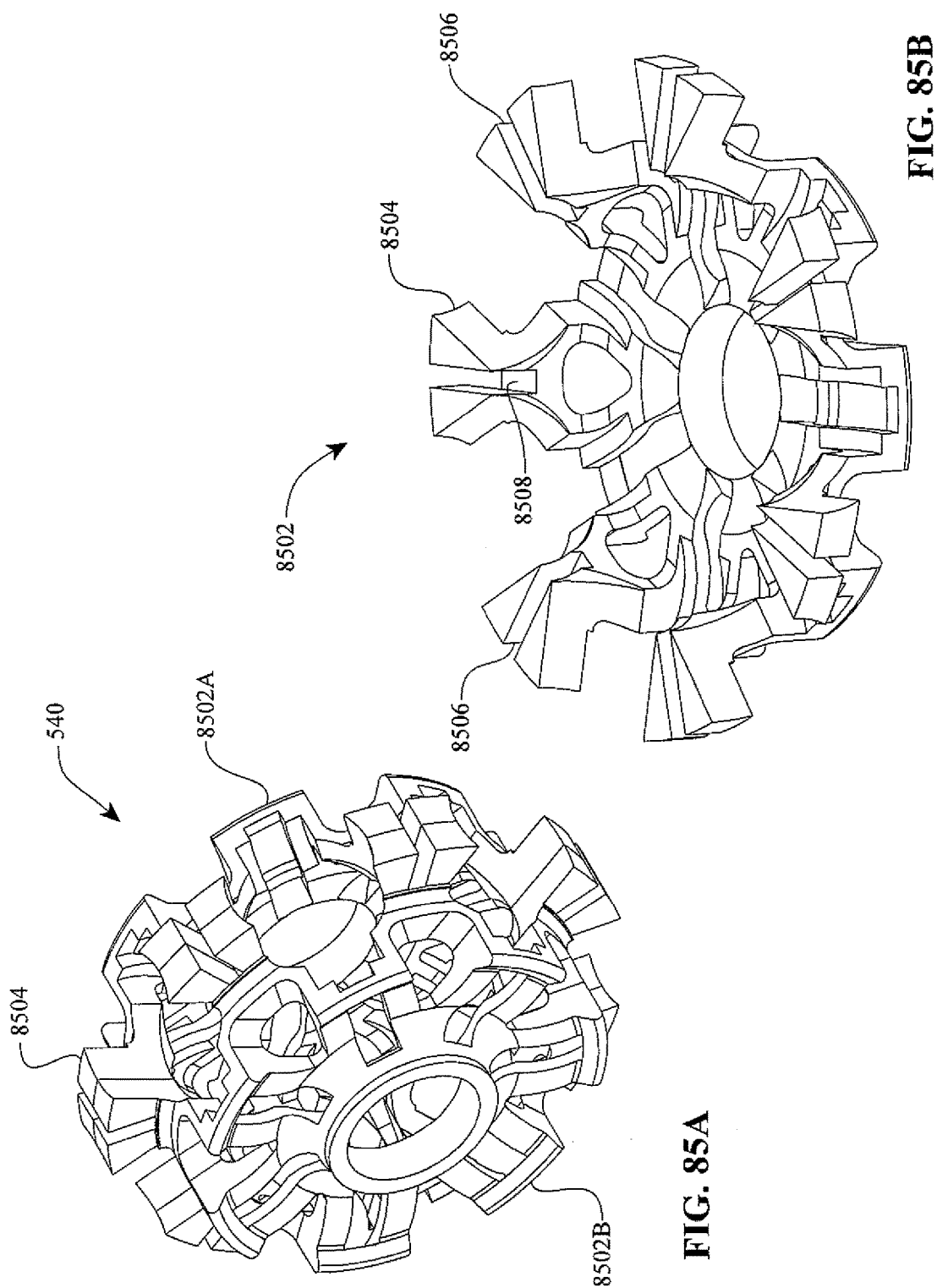
FIG. 85A is a perspective view of a carrier assembly that can be used with various embodiments of an electric traction drive.
FIG. 85B is a perspective view of a stator plate that can be used with the carrier assembly of FIG. 85A.

Referring now to FIG. 80, an electric traction drive 800 will be described. An electric motor winding assembly 448 has a rotational degree of freedom about an axis 805 of the electric traction drive 800. The windings assembly 448 couples to a traction sun shaft 450 with, for example, a sliding spline. The windings assembly 448 transmits torque to the traction sun shaft 450 but allow the traction sun shaft 450 to translate axially. The traction sun shaft 450 couples to a traction sun 452 and allows mechanical power transfer between the windings 448 and the traction sun 452. The electric traction drive 800 can include an array of permanent magnets 454. The magnets 454 have a rotational degree of freedom about the axis 805. The magnets 454 couple to a frame 456 that operationally couples to a load cam assembly 458. The frame 456 operationally couples to a thrust support structure 460 configured to provide thrust support for an axial force thrust bearing 462. The load cam assembly 458 drives a first traction ring 464. Thus, magnets 454 operationally couple to the first traction ring 464 via the frame 456 and the load cam assembly 458. Therefore, in this configuration, power is transferred between the magnets 454 and the first traction ring 464.

A wire harness 466 provides electrical power to the electric traction drive 800. The wire harness 466 can be a two wire or a multiphase harness with feedback sensor wires. In one embodiment, electrical power and sensor information can be communicated between the wire harness 466 and the motor windings 448 via a slip ring or a commutation bar assembly 468. For direct current operation, the commutation bar assembly 468 can function for power transfer as well as for mechanical commutation/switching as known in the relevant technology of radial or axial gap brushed motors. For brushless operation embodiments, a Hall effect sensor array 470 can be used. The Hall effect sensor array 470 is connected to the wire harness 466 with electrical wires that transmit through, for example, a slip ring assembly 468.

The first traction ring 464 and the traction sun 452 transmit power to and from an array of planets 472 via traction or friction. A carrier 474 is configured to support reaction loads, as well as facilitate alignment and guiding of, the planets 472. The carrier 474 is rigidly coupled to a carrier frame 476, which is rigidly coupled to a main axle 478. The main axle 478 is rotationally fixed and thus rotationally constrains the carrier 474. A second traction ring 480 transmits power to or from the planets 472 via traction or friction. The second traction ring 480 is operationally coupled to a load cam assembly 482, which is coupled to a drive plate 484. The drive plate 484 engages an outer hub 486 to transfer torque between the drive plate and the outer hub 486. The drive plate 484 bears against thrust bearing 488. In one embodiment, the electric traction drive 800 can have an external power transfer source, such as a sprocket cassette 485. Bearings 485 can be used to provide a rolling interface between the thrust support structure 460. A rolling interface between the carrier 474 and the windings 448 can be provided by a bearing 487. In one embodiment, a bearing 489 provides a rolling interface between the carrier 474 and the drive plate 484. The bearings 485 and 487 provide, among other things, guidance of the motor windings assembly 448 between the thrust support structure 460 and the carrier 474, respectively. The bearing 489 preferably provides a rolling interface and/or guidance between the carrier 474 and the drive plate 484.

The load cam assemblies 458, 482 are sensitive to applied torque and tend to spread apart certain components as torque is applied. A closed structural loop resists the spreading effect. In one embodiment, the closed structural loop starts with the planets 472, passes through the second traction ring 480, load cam assembly 482, drive plate 484, thrust bearing 488, retaining nut 490, main axle 478, thrust bearing 462, thrust support structure 460, frame 456, load cam assembly 458, first traction ring 464, and closes at the planets 472. As the structural loop resists the spreading effect generated by the load cam assemblies 458, 482, contact or clamp forces develop between the first traction ring 464, planets 472, second traction ring 480, and traction sun 452. These contact forces facilitate efficient power transfer at the contact points via traction or friction.

In one embodiment, a shift rod assembly 492 can be used to adjust the speed ratio of the electric traction drive 800. The shift rod assembly 492 can be operationally coupled to the traction sun 452 to allow axial and rotary motion of the traction sun 452. The embodiment illustrated in FIG. 80 includes angular contact rolling element bearings configured to facilitate push or pull between a shift rod pin 494 and the traction sun 452 while the traction sun 452 rotates but a shift rod 496 does not. A shift cam assembly 498 is configured to convert axial motion imparted to the traction sun 452 from the shift rod assembly 492 to axial and radial motion of shift levers 500. In one embodiment, the shift cam assembly 498 couples to the carrier 474 via a sliding spline.

Passing now to FIGS. 81-85B, an electric traction drive 900 can be configured for use as, for example, an automotive alternator. An alternator/generator 502 (generally enclosed by the dashed line 504) can be a three phase synchronous alternator/generator with claw-pole rotors 506. The alternator/generator 502 can include a three phase winding stator lamination assembly 508 and a DC excitation winding 510. In one embodiment, the excitation windings 510 are powered by a brush assembly 512. Other parts commonly found in an alternator (like a voltage regulator and a rectifier bridge) are not illustrated in FIG. 81 for clarity. The general configuration and construction of alternator/generators 502 is well known in the relevant technology of electrical machines. In one embodiment, a rotating lip seal 514 can be used to maintain certain areas of the alternator assembly free from oil and other areas immersed in oil.

In some embodiments, a compound variable planetary variator 516 (generally enclosed by the dashed line 518) is operably connected to the alternator/generator 502. In one embodiment, the variator 516 and the alternator/generator 502 share a common main axle 520. The main axle 520, among other things, radially supports the claw-pole assembly 506 to maintain a proper air gap at the stator 508. The main axle 520 supports the variator 516, and provides a link in the axial force loop that produces traction/friction clamp loads. The main axle 520 can be configured to provide support for belt loads applied to a pulley 522.

In operation, the pulley 522 receives power from a belt (not shown). The pulley 522 transfers torque to a drive shaft 524 via a nut 526. The drive shaft 524 transmits torque into the variator 516 through coupling to a first cam driver 519 of the variator 516. The alternator/generator 502 receives torque from the variator 516 through coupling to a second cam driver 521 at, for example, the claw-pole assembly 506.

In one embodiment, adjustment of the speed ratio of the electric traction drive 900 can be accomplished by a ratio shifter 528. The ratio shifter 528 can include a rotary cam 530, a translating cam 532, a retention sleeve 534, a shift cam actuator 536, and a shift cam cage 538. To adjust the speed ratio, rotary input is imparted to the rotary cam 530. The retention sleeve 534 allows the rotary cam 530 to rotate about an axis 546 but not to translate axially relative to the axis 546. Consequently, because the screw thread feature between the rotary cam 530 and the translating cam 532, rotation of the rotary cam 530 causes axial translation of the translating cam 532. As the translating cam 532 translates axially, the translating cam 532 imparts motion to the shift cam actuator 536. A carrier assembly 540 can be configured to prevent the shift cam actuator 536 from axial translation. Since the cam actuator 536 is axially restrained, the imparted motion from the translating cam 532 causes the shift cam actuator 536 to rotate generally about a center 533 located within a region of the shift cam actuator 536. This rotation of the shift cam actuator 536 imparts an axial translation to the shift cam cage 538 through a shift cam handle 539, which is configured to couple to the shift cam actuator 536. Axial motion of shift cam cage 538 causes planet assemblies 542 to tilt and thus change the speed ratio of the electric traction drive 900. It should be noted that while the ratio shifter 528 has been described with reference to the electric traction drive 900, the ratio shifter 528 can be used with a variety of embodiments of ball-planetary variators. The carrier assembly 540 can be configured to hold and guide an array of planet assemblies 542. In one embodiment, the carrier assembly 540 provides location support for the shift cam actuators 536. In some embodiments, the carrier assembly 540 is operably coupled to a housing 544, which can be fixed rotationally and axially with respect to a longitudinal axis 546 of the electric traction drive 900. Thus, torque reactions from the planet assemblies 542 are transferred to the housing 544 via the carrier assembly 540.

FIGS. 84A-84B illustrate one embodiment of a shift cam cage assembly 538 that includes shift cams 8402A, 8402B. In one embodiment, a synchronizing plate 8404 is adapted to couple the shift cams 8402 and, thereby, ensure that the shift cams 8402 do not rotate relative to one another. In some embodiments, the synchronizing plate 8404 is rigidly coupled to one of the shift cams 8402, such as the shift cam 8402A as shown in FIG. 84A. The synchronizing plate 8404 can be press fit, threaded, welded, etc., to the shift cam 8402B. To facilitate adjustment of the speed ratio of the electric traction drive 900, in one embodiment, the synchronizing plate 8404 can be provided with a shift cam handle 539 adapted to cooperate with the shift cam actuator 536.

Referring to FIGS. 85A and 85B, the carrier assembly 540 can include one or more stator plates 8502A, 8502B. A stator plate 8502 can be generally similar to the stator plate 148 described above with reference to FIGS. 10 and 11. However, in some embodiments, the stator plate 8502 can include stator extensions 8504 that generally extend radially outward toward the housing 544 and axially inward toward the stator extensions of a complimenting stator plate. In some applications, the stator extensions 8504 of the stator plate 8502A couple by bolts, for example, to the stator extensions of the stator plate 8502B. One of the functions of the stator extensions 8504 is to receive and guide the shift cam actuator 536. A stator extension 8504 can include actuator stabilizing surfaces 8506 configured to provide lateral support for the shift cam actuator 536; that is, the actuator stabilizing surfaces 8506 generally maintain the shift cam actuator 536 parallel to the plane of FIG. 81. In one embodiment, the stator extension 8504 is provided with stator pivot surfaces 8508 adapted to facilitate the pivoting of the shift cam actuator 536 about the center 533 (see FIG. 81). The stator pivot surfaces 8505 generally react the shift cam actuator 536 as the translating cam 532 pushes or pulls axially the radially outward end of the shift cam actuator 536. In one embodiment, the stator extensions 8504 can additionally be adapted with splines, for example, for engaging mating splines (not shown) of the housing 544; such an engagement facilitates the axial, radial, and/or rotational constraint of the carrier 540.

Figure 86:
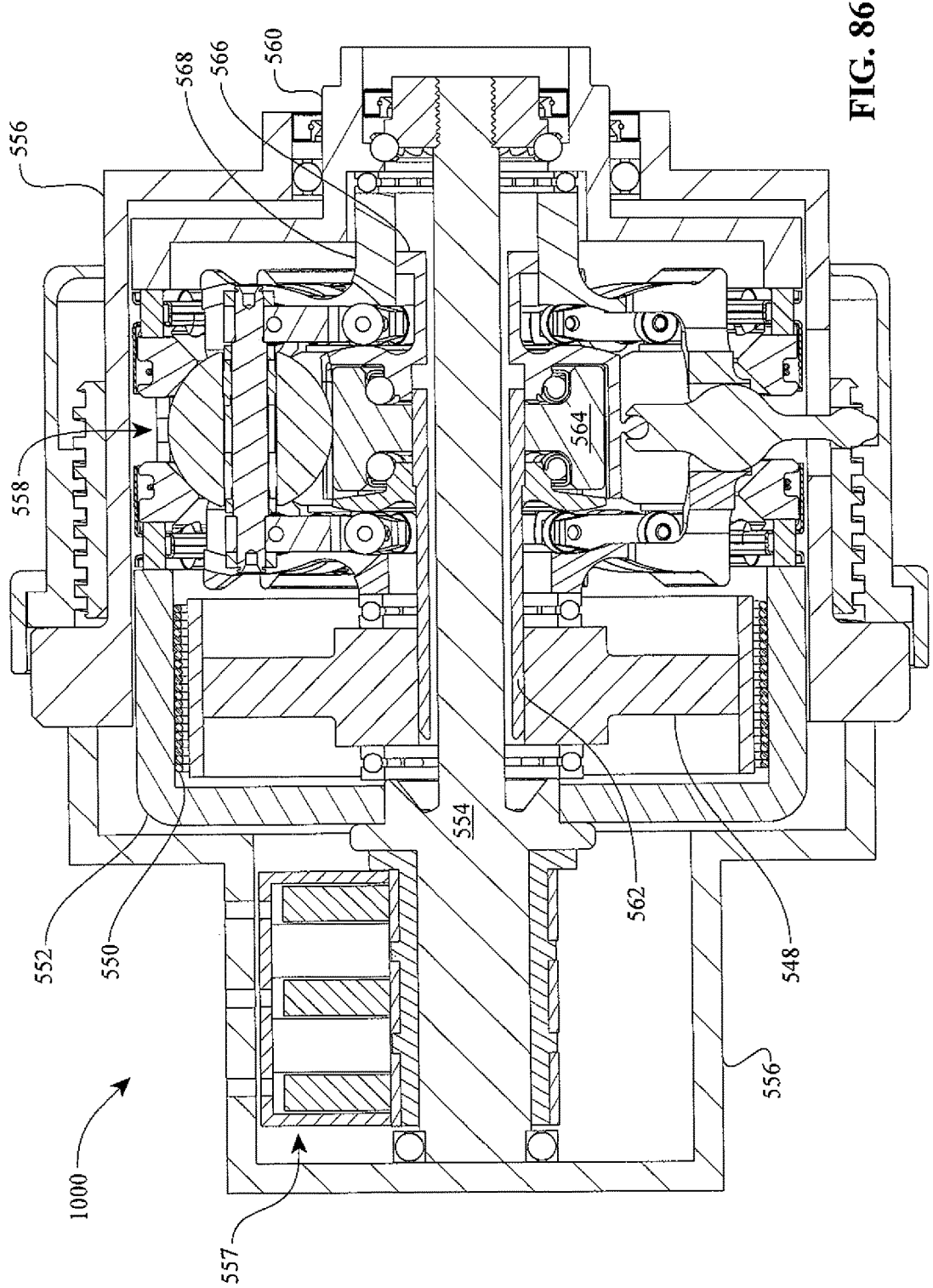
FIG. 86 is a cross-sectional view of one more embodiment of an electric traction drive.
Figure 87:
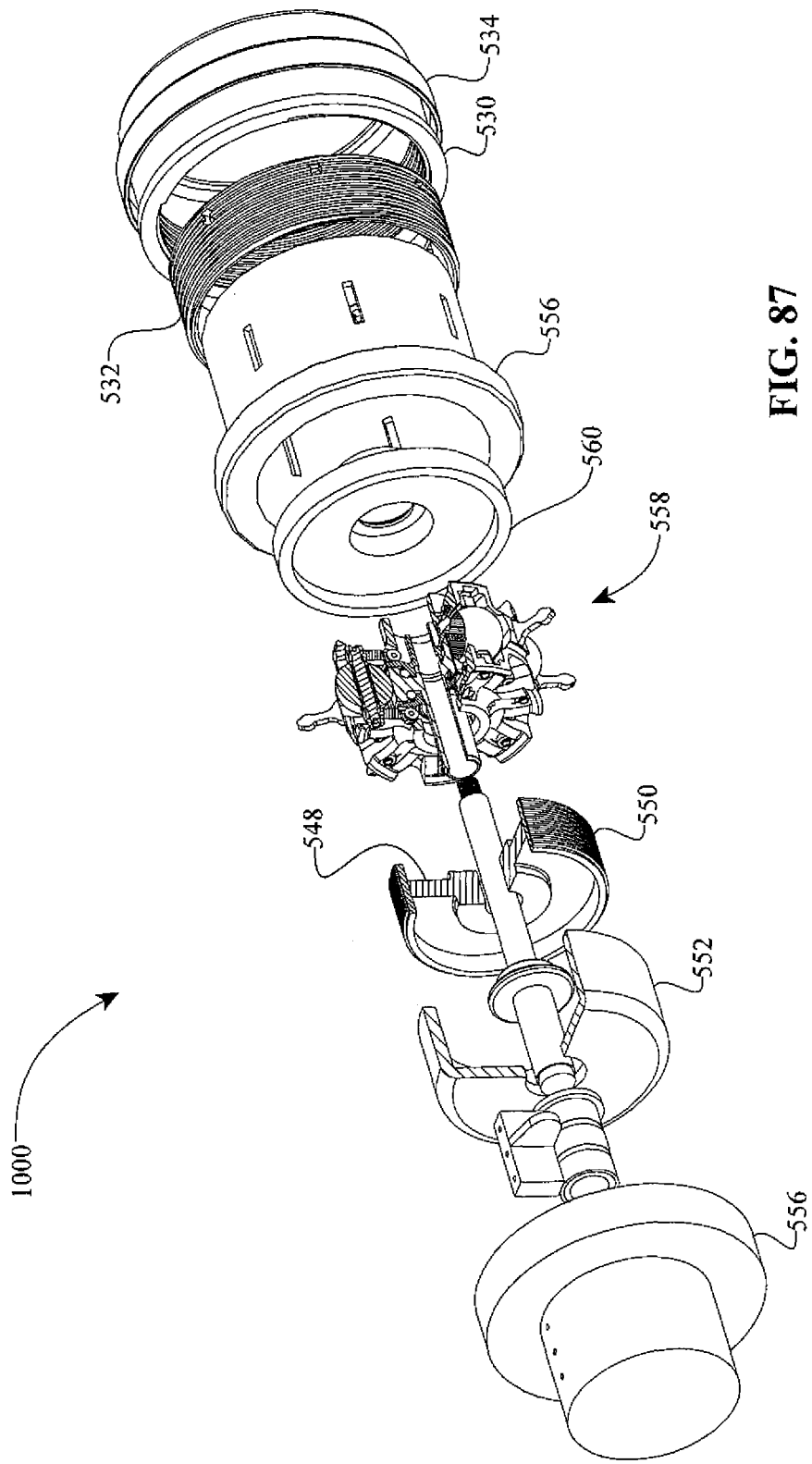
FIG. 87 is a partially, exploded view of certain components of the electric traction drive of FIG. 86.

Turning to FIGS. 86-87 now, an electric traction drive 1000 includes a permanent magnet rotor assembly 548 configured to interact with field windings 550, which are supported on a windings frame 552. In one embodiment, the permanent magnet rotor assembly 548 is placed radially inward of the field windings 550. The field windings 550 are operationally coupled to a main shaft 554. A housing 556 is rotationally and axially fixed. The windings frame 552 can be operationally coupled to a compound variable planetary variator 558, which can be coupled to a drive shaft 560 to deliver power to or from the variator 558. In one embodiment, the permanent magnet rotor assembly 548 is coupled by, for example, sliding splines to a traction sun drive shaft 562, which is configured to drive a traction sun 564 via a rigid coupling, for example. In one embodiment, an external source of electrical power (not shown) is used to provide power to the field windings assembly 550 via electrical conductors (not shown) that are routed through the windings frame 552 and the main shaft 554. Said conductors can be operably connected to a slip ring, brush, or commutator assembly 557, which allows transfer of electrical power to an external electrical source or to an electrical sink. In one embodiment, the commutator assembly 557 provides a three phase connection for an induction motor. In some embodiments, the commutator assembly 557 provides mechanical commutation switching for a brushed permanent magnet motor. In application, the commutator assembly 557 provides slips rings for a switched reluctance motor.

As illustrated in FIG. 86, a shift cam cage 566 can be coupled to a carrier 568 by a sliding spline coupling, for example. In some embodiments, the carrier 568 is rigidly coupled to the housing 556. To adjust the speed ratio of the electric traction drive 1000, a ratio shifter 570 similar to the ratio shifter 528 described above can be used. The electric traction drive 1000 can be used either as a motor or, by reversing the power flow from the drive shaft 560 into the variator 558, as an electricity generator.

Figure 88:
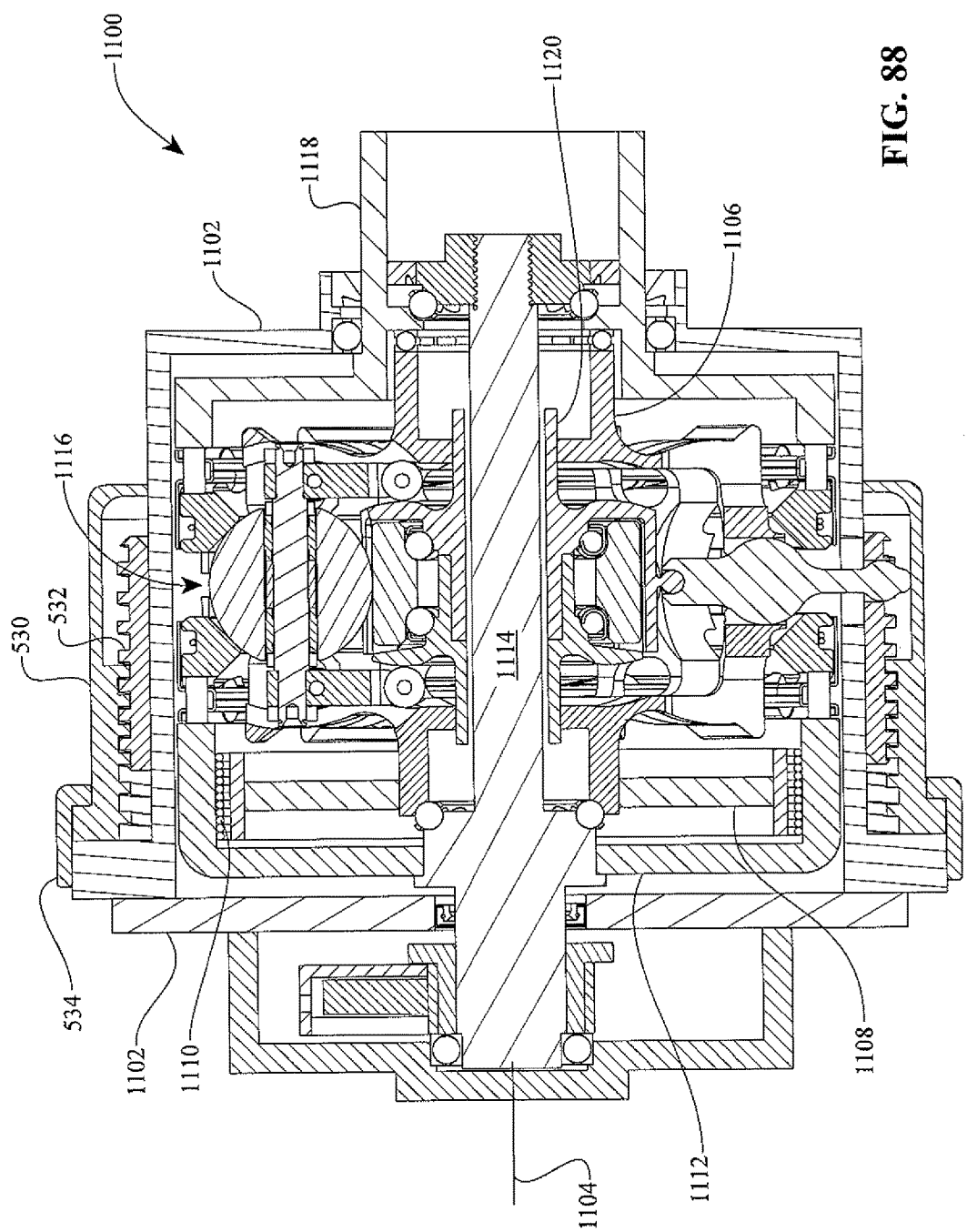
FIG. 88 is a cross-sectional view of yet another embodiment of an electric traction drive.
Figure 89:
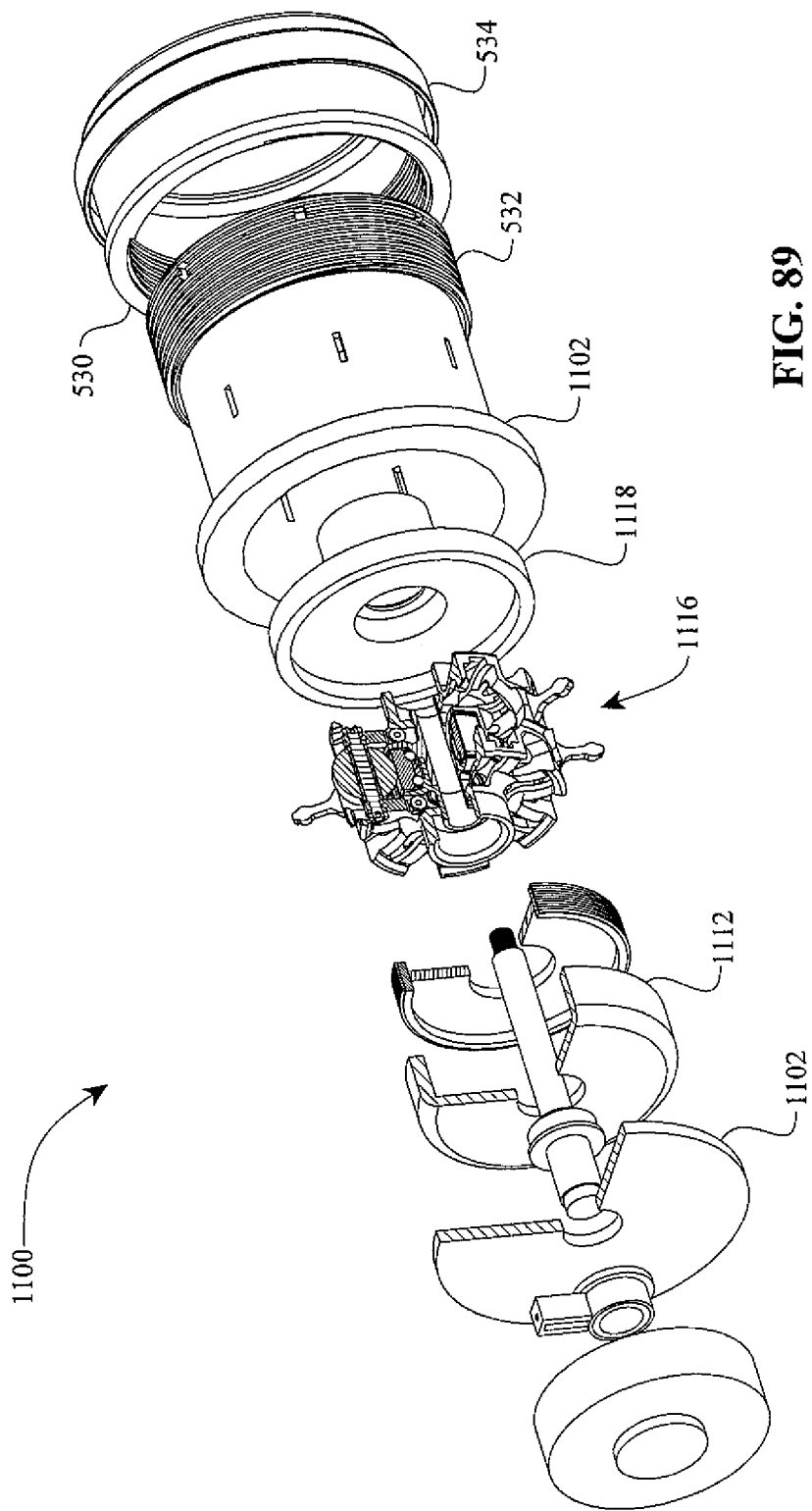
FIG. 89 is a partially exploded view of the electric traction drive of FIG. 88.

Referencing FIGS. 88-89, an electric traction drive 1100 includes a housing 1102, which is axially and rotationally fixed relative to a longitudinal axis 1104 of the electric traction drive 1100. A carrier 1106 is rigidly coupled to the housing 1102. In one embodiment, a permanent magnet rotor assembly 1108 is rigidly coupled to the carrier 1106. Field windings 1110, configured to interact with the rotor assembly 1108, are supported on a windings frame 1112. A main shaft 1114 can be rigidly coupled to the windings frame 1112. The windings frame 1112 is configured to transfer torque to a compound variable planetary variator 1116. A drive shaft 1118 can be coupled to the variator 1116 to deliver torque to or from the electric traction drive 1100. In one embodiment, a shift cam cage 1120 can be coupled to the carrier 1106 by, for example, a sliding spline. To shift the speed ratio of the electric traction drive 1100, a ratio shifter similar to the ratio shifter 528 can be used. In some embodiments, power can be transferred through (to or from) the main shaft 1114.

Figure 90:
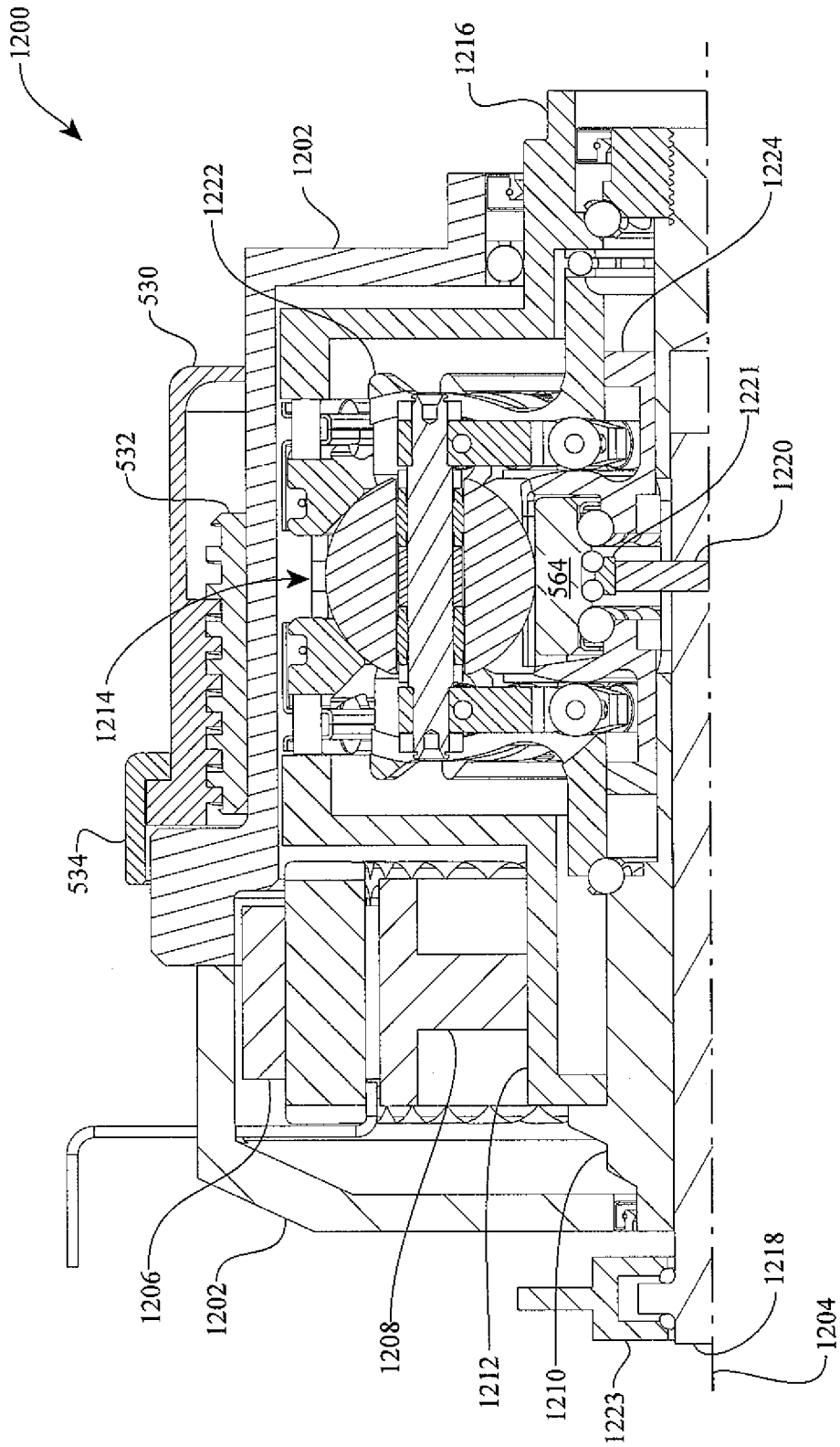
FIG. 90 is a cross-sectional view of yet a different embodiment of an electric traction drive.
Figure 91:
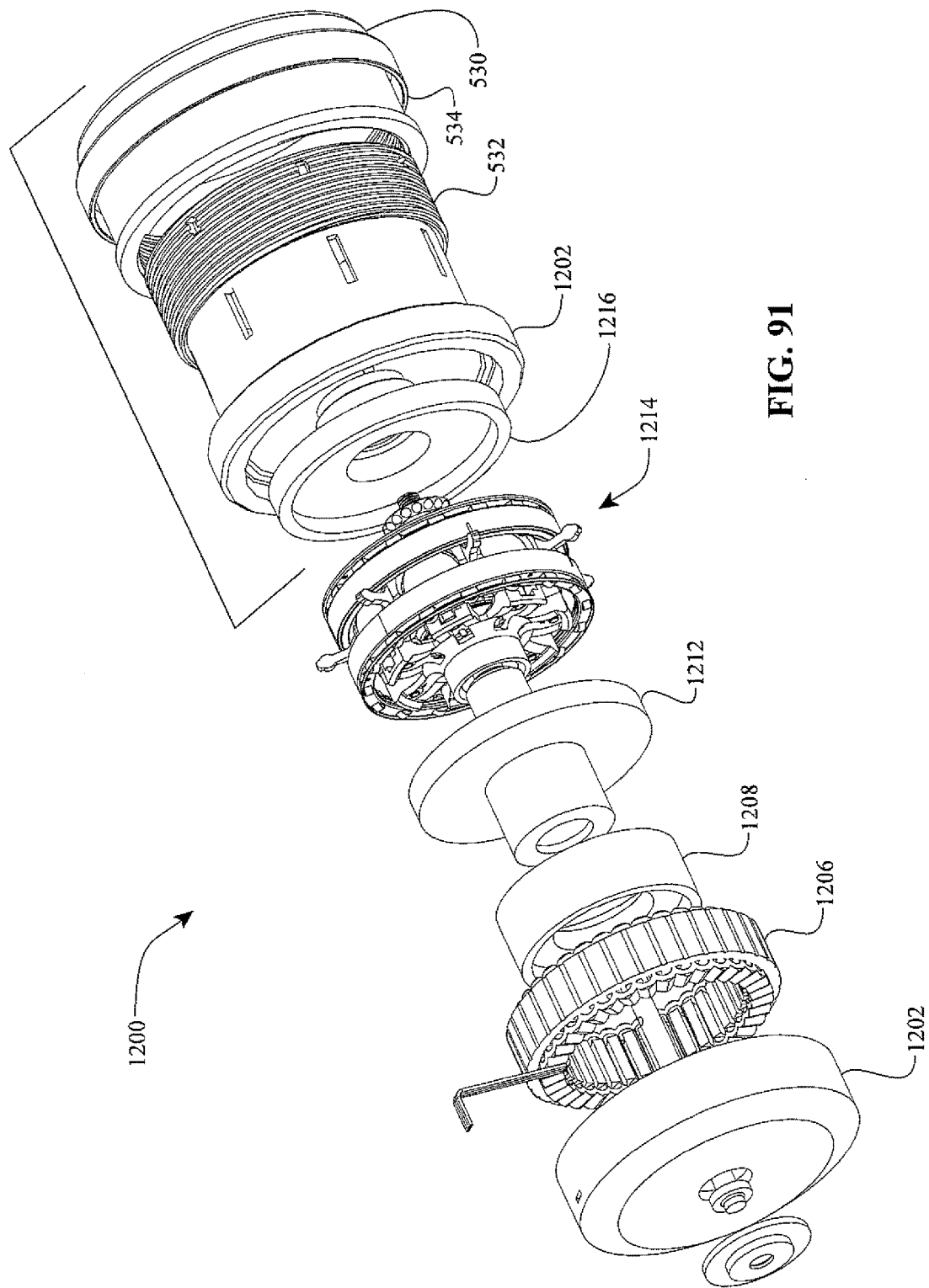
FIG. 91 is a partially exploded view of the electric traction drive of FIG. 90.
Figure 92:
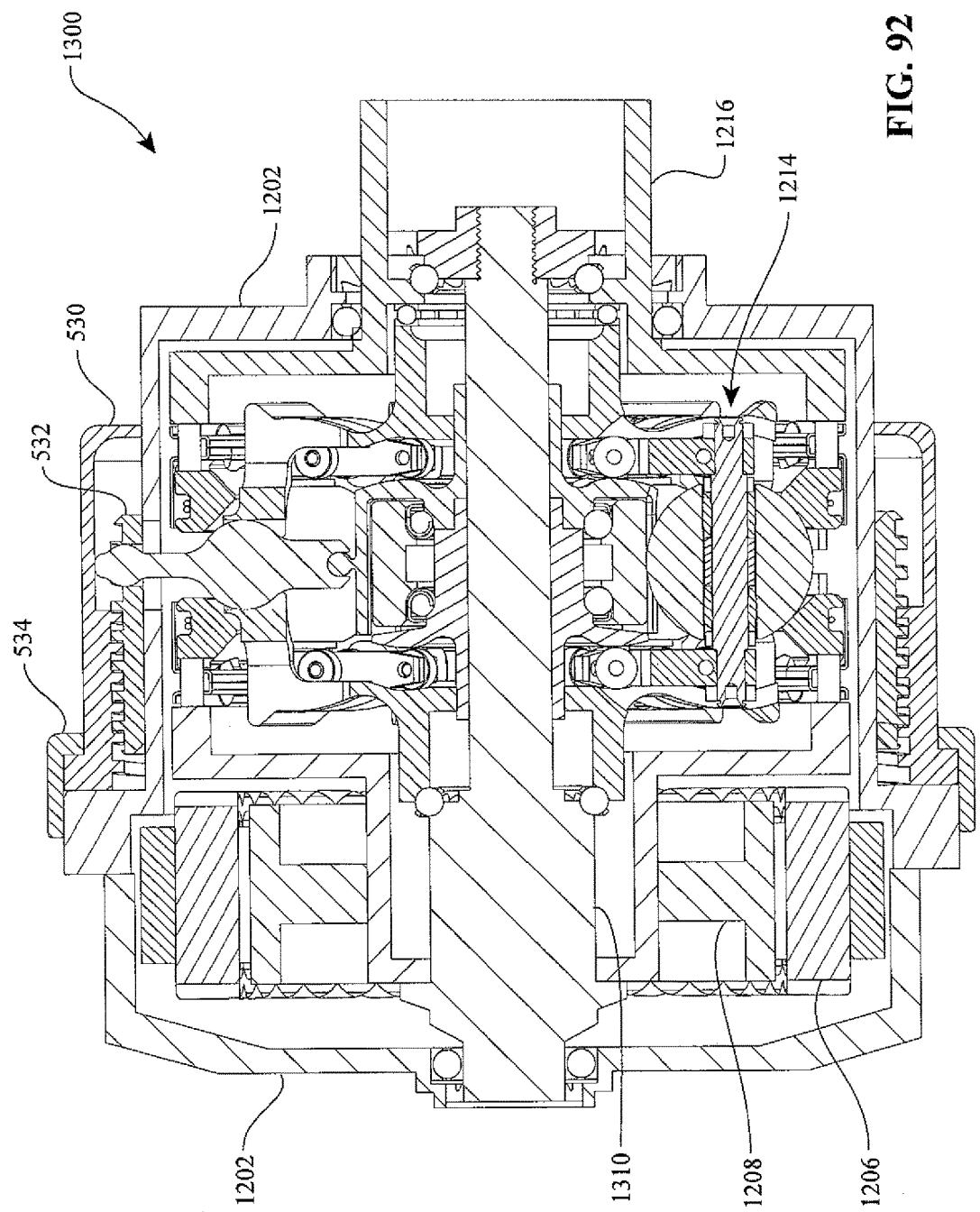
FIG. 92 is a cross-sectional view of another embodiment of an electric traction drive.
Figure 93:
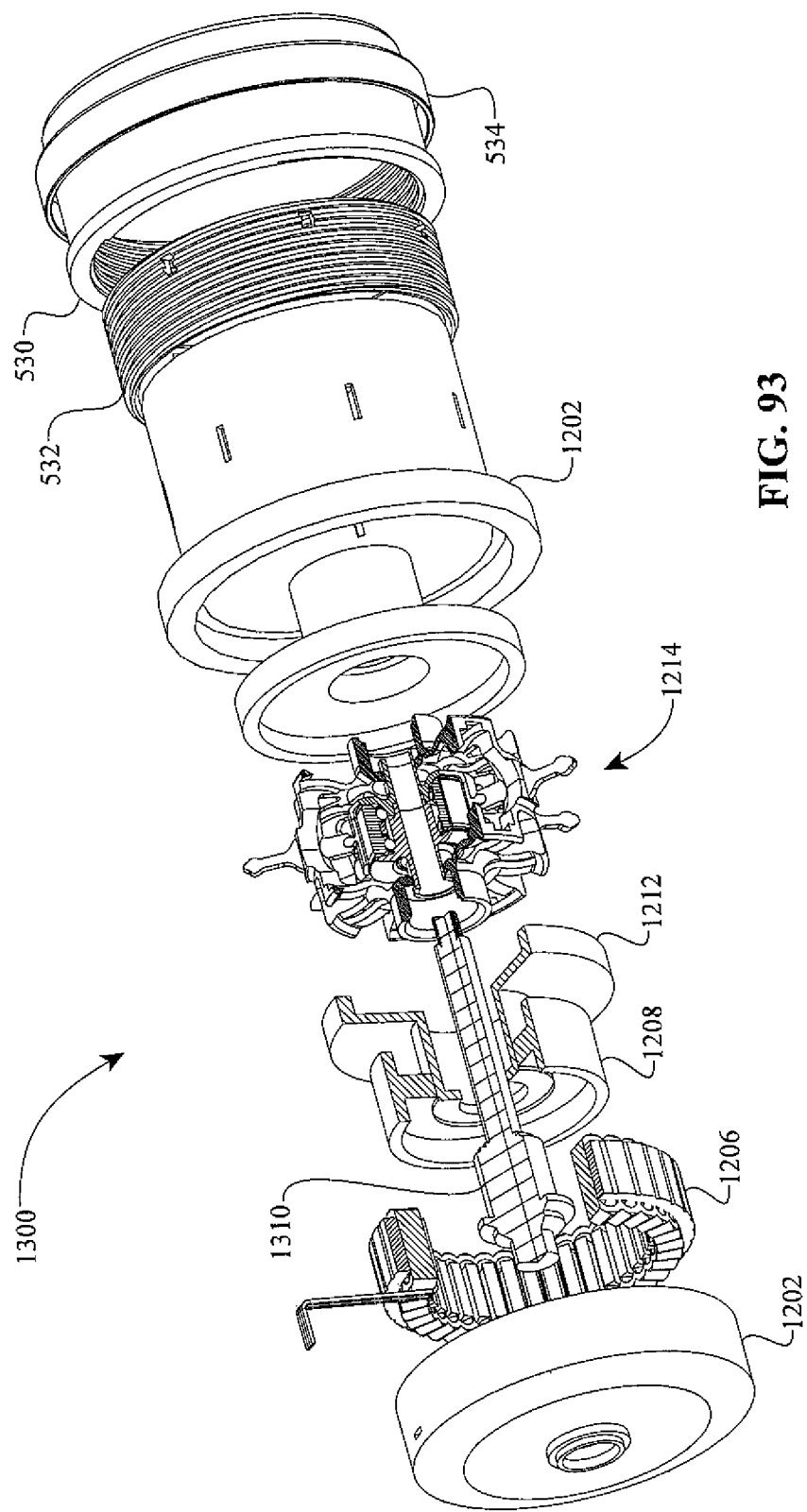
FIG. 93 is a partially exploded view of the electric traction drive of FIG. 92.
Figure 94:
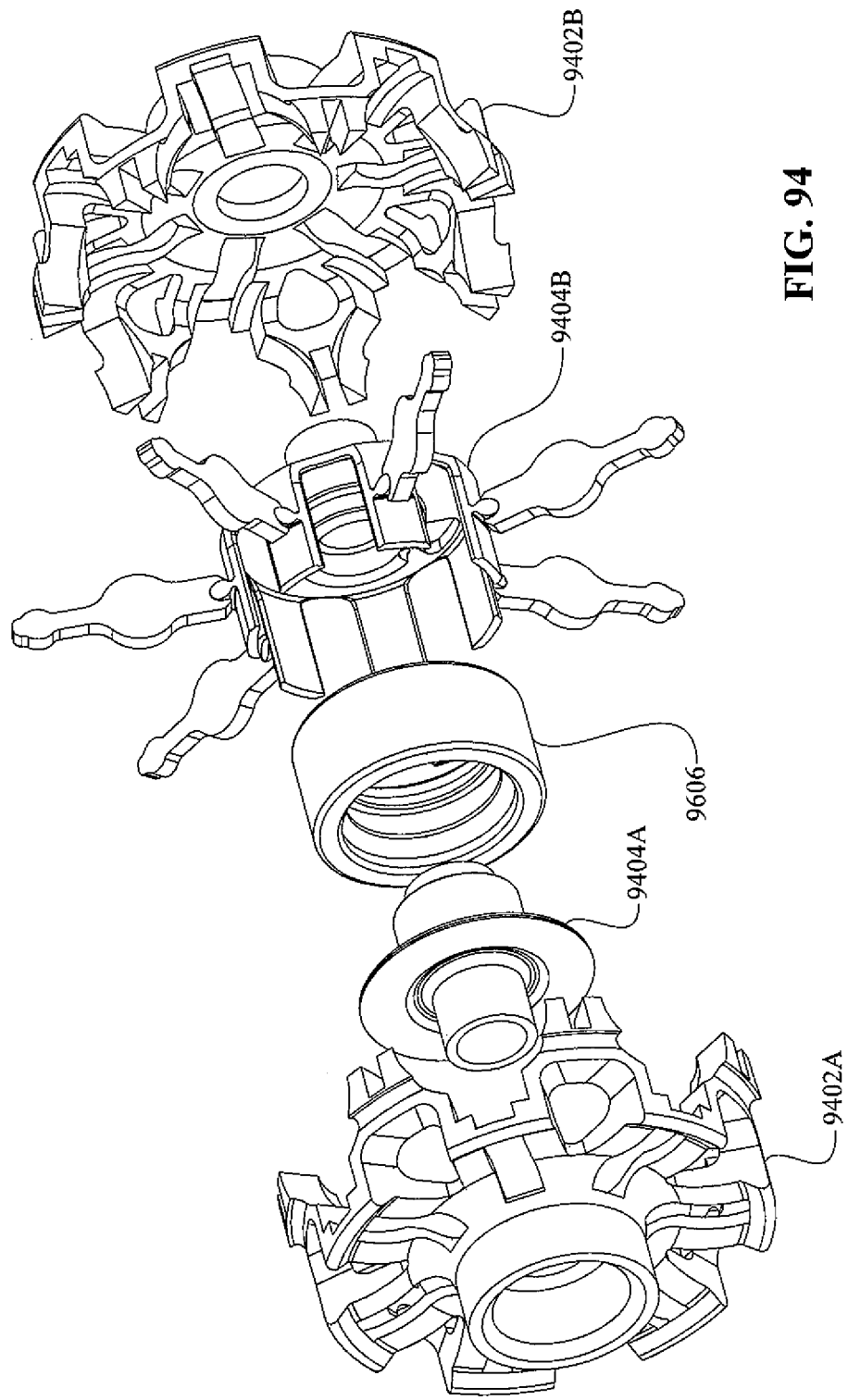
FIG. 94 is a partially exploded view of certain components of the electric traction drive of FIG. 92.

Passing now to FIGS. 90-91, an electric traction drive 1200 includes a housing 1202 that is rotationally and axially fixed relative to a longitudinal axis 1204 of the electric traction drive 1200. Field windings 1206, of an electric motor for example, are rigidly coupled to the housing 1202. A permanent magnet rotor assembly 1208 is placed radially inward of the field windings 1206, and is rigidly coupled to a main shaft 1210. The permanent magnet rotor assembly 1208 is coupled rigidly to a load cam driver 1212, which is configured to transfer torque into a compound continuously variable variator 1214. In one embodiment, the permanent magnet rotor assembly 1208 is operationally coupled to the main shaft 1210 through the load cam driver 1212. A drive shaft 1216 is coupled to the variator 1214 to facilitate transfer of torque to or from the variator 1214. In one embodiment, a ratio shifter for the electric traction drive 1200 includes a shift rod 1218 coupled to a shift rod pin 1220. The shift rod 1218 is configured for axial translation. In some embodiments, the main shaft 1210 includes a slot that receives the shift pin 1220, which couples to an angular contact bearing assembly 1221. Axial motion of the shift rod pin 1220 is imparted to the traction sun 564 through the angular contact bearing assembly 1221, while both the sun 564 and the shift rod pin 1220 rotate relative to one another. The shift rod pin 1220 is preferably rigidly fixed to the shift rod 1218. However, since the shift rod pin 1220 passes through the slot in the main shaft 1210, the shift rod 1218, shift rod pin 1220, and main shaft 1210 all rotate at the same speed about the longitudinal axis 1204. The angular contact bearing assembly 1223 allows, among other things, non-rotating linear motion to be imparted to the rotating shift rod 1218. In one embodiment, a carrier 1222 can be rigidly coupled to the housing 1202. In some embodiments, a shift cam cage 1224 can be coupled to the carrier 1222 by a sliding spline. FIGS. 92-94 illustrate one embodiment of an electric traction drive 1300 which is substantially similar to the electric traction drive 1200. However, the electric traction drive 1300 incorporates a ratio shifter similar to the ratio shifter 528 discussed above.

Figure 95:
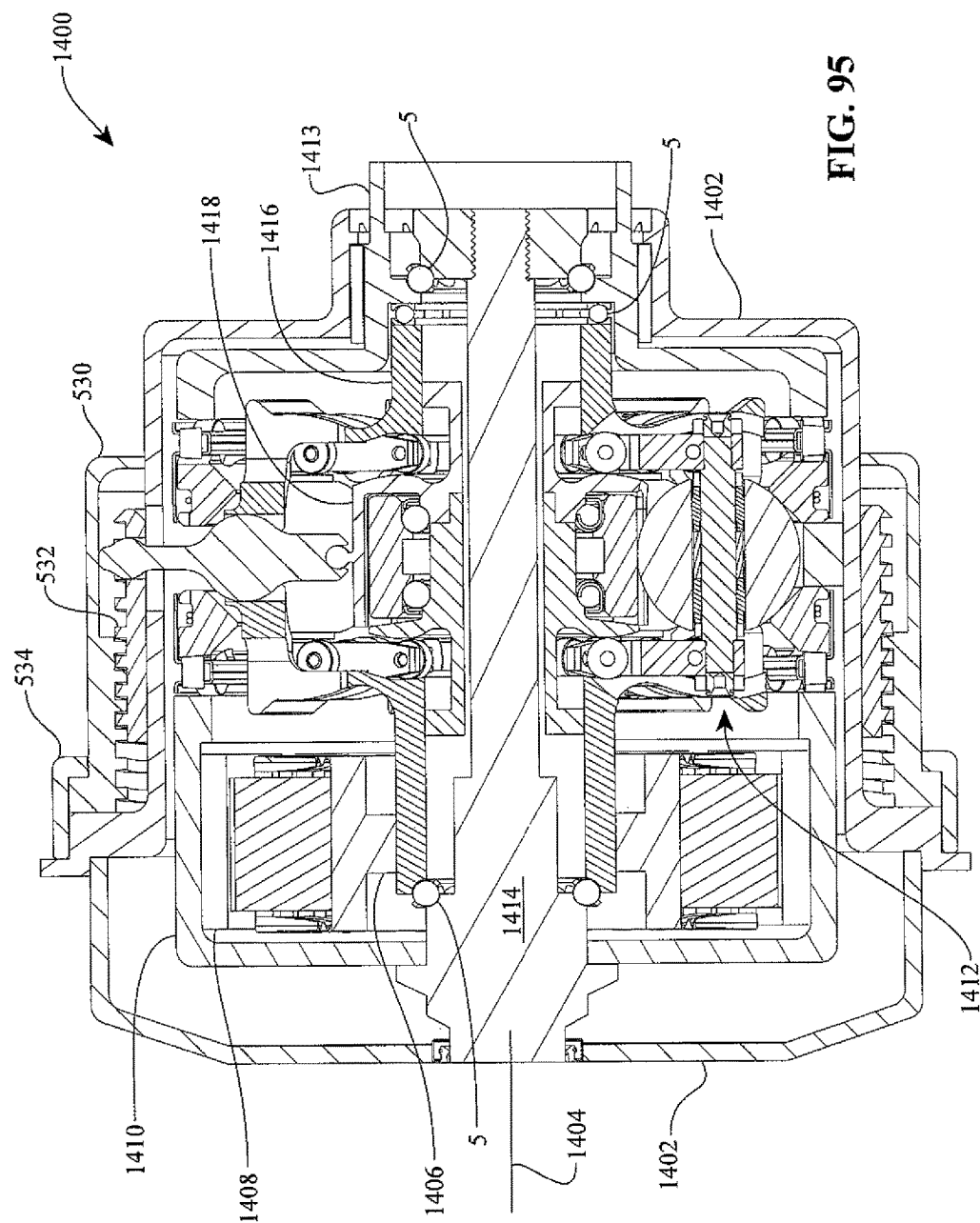
FIG. 95 is a cross-sectional view of one more embodiment of an electric traction drive.
Figure 96:
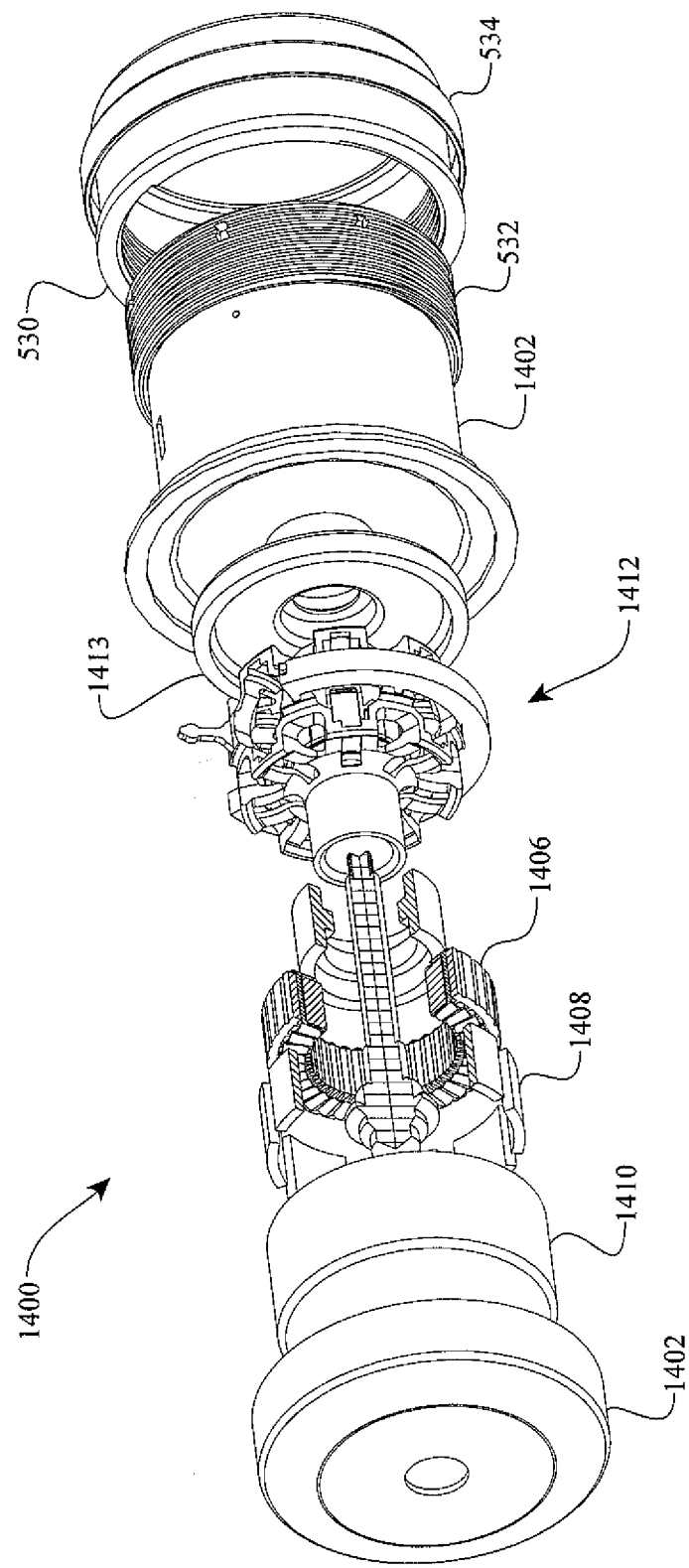
FIG. 96 is a partially exploded view of the electric traction drive of FIG. 95.

As illustrated in FIGS. 95-96, another embodiment of an electric traction drive 1400 includes a housing 1402 that is axially and radially fixed relative to a longitudinal axis 1404 of the electric traction drive 1400. In one embodiment, the electric traction drive 1400 includes field windings 1406 located radially inward of an array of permanent magnets 1408; the field windings 1406 are configured to interact electromagnetically with the permanent magnets 1408. As used here, a reference to field windings being operationally coupled to a magnet array (permanent magnet rotor assembly, for example) indicates a configuration whereby the field windings and the magnet array are placed in electromagnetic interaction to be capable of producing mechanical power from electrical power or vice versa. In some embodiments, the permanent magnets 1408 are rigidly coupled to a support frame 1410, which is coupled to a compound continuously variable variator 1412. A drive shaft 1413 can be coupled to the variator 1412 to facilitate the transfer of torque out of the variator 1412. The support frame 1410 can be coupled additionally to a main shaft 1414. In the embodiment illustrated in FIG. 95, the field windings 1406 are rigidly coupled to a carrier 1416, which can be rigidly coupled to the housing 1402. In one embodiment, the support frame 1410 is rigidly coupled to the main shaft 1414. A shift cam cage assembly 1418 can be coupled to the carrier 1416 by a sliding spline, for example. To adjust the speed ratio of the electric traction drive 1400, a ratio shifter 528 as previously discussed can be used.

Figure 97:
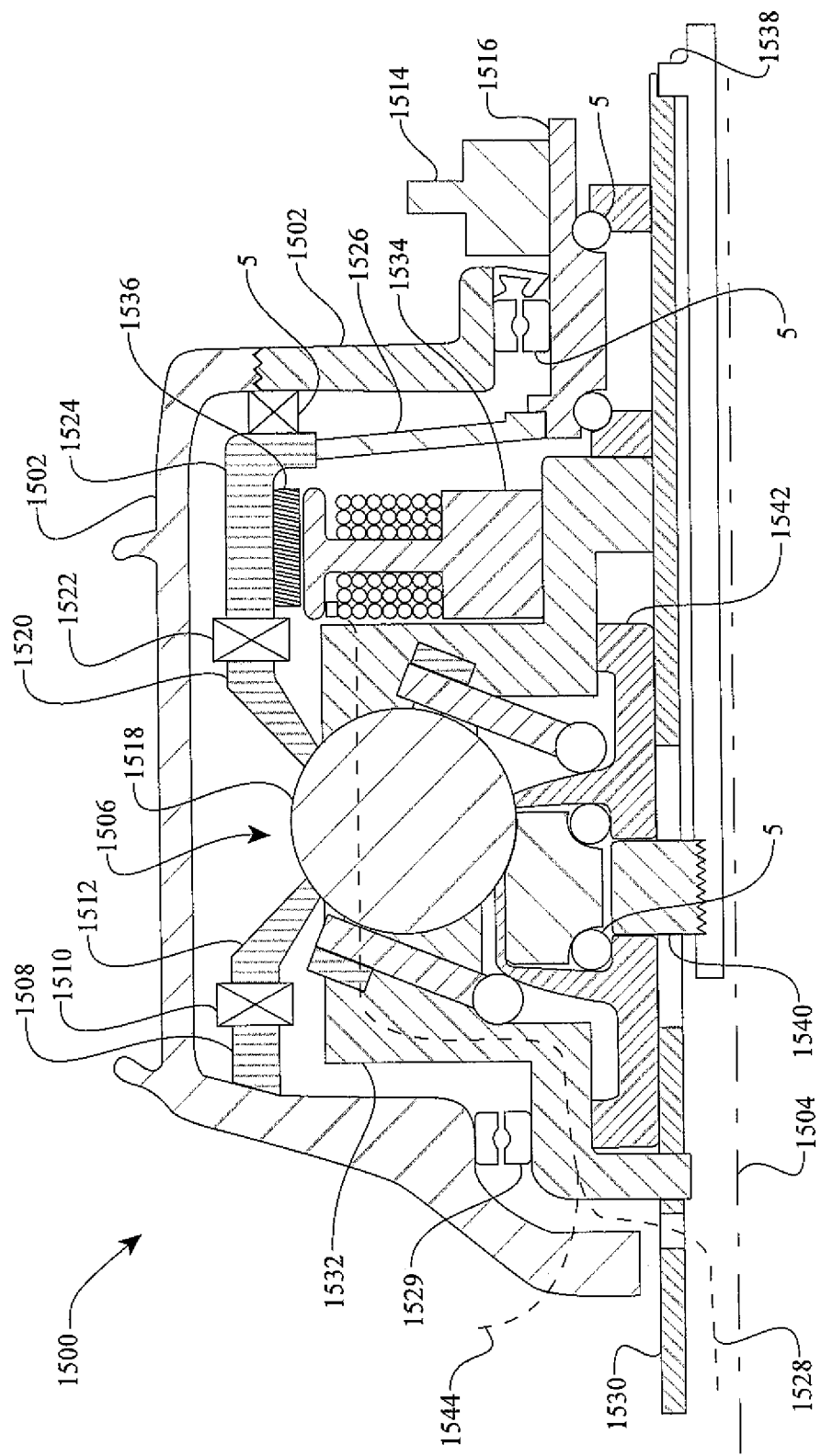
FIG. 97 is a cross-sectional view of yet another embodiment of an electric traction drive.

Yet another embodiment of an electric traction drive 1500 will be described now with reference to FIG. 97. The electric traction drive 1500 can include a housing 1502 that is rotatable about a longitudinal axis 1504 of the variator 1500. In one embodiment, the housing 1502 is operationally coupled to a compound continuously variable variator 1506 through, for example, a first load cam drive plate 1508, a load cam assembly 1510, and a first traction ring 1512. In some embodiments, a power input interface 1514 (such as a freewheel, cog, etc.) is operationally coupled to an input driver 1516. A planet array 1518 can be operationally coupled to the input driver 1516 through a second traction ring 1520, load cam assembly 1522, load cam driver 1524, and drive flange 1526. Hence, a power path through the electric traction drive 1500 can be from the power input interface 1514 through the input driver 1516, drive flange 1526, load cam driver 1524, load cam assembly 1522, second traction ring 1520, planet array 1518, first traction ring 1512, load cam assembly 1510, first load cam drive plate 1508, and out of the housing 1502. In some embodiments, a second power path through the electric traction drive 1500 involves routing electrical cables 1528 through a hollow section of a main axle 1530, which is fixed axially and rotationally relative to the longitudinal axis 1504. A carrier 1532 can be rigidly coupled to the main axle 1530. In some embodiments, the cables 1528 are routed through channels (not shown) of the carrier 1532. The electrical cables 1528 deliver electrical power to field windings 1534, which are located radially inward of an array of magnets 1536. In some embodiments, the array of magnets 1536 can be coupled to the load cam driver 1524; however, in other embodiments, the array of magnets can be coupled in a suitable manner (taking into consideration a reasonable air gap) to any rotatable component of the electric traction drive 1500 that is positioned radially outward of the field windings 1534. In one embodiment, the field windings 1534 are rigidly coupled to the carrier 1532, or to another structure that is rigidly coupled to the carrier 1532 or to the main axle 1530. In the embodiment of FIG. 97, the electric traction drive 1500 is configured such that adjustment of the speed ratio is accomplished through use of, in part, a shift rod 1538 that is coupled to shift rod nut 1540. A shift cam cage 1542 can be operationally coupled to the shift rod nut 1540 to facilitate the adjustment of the speed ratio. In some embodiments, the shift cam cage 1542 is coupled to the carrier 1532 by, for example, a sliding spline. In one embodiment, the housing 1502 is adapted to receive the cables 1528, rather than the cables 1528 being routed through the main axle 1530. In such a configuration, the cables are then routed under the bearing 1529 through a path 1544 which does not intersect a rotating component of the electric traction drive 1500 to the carrier 1532.

Figure 98:
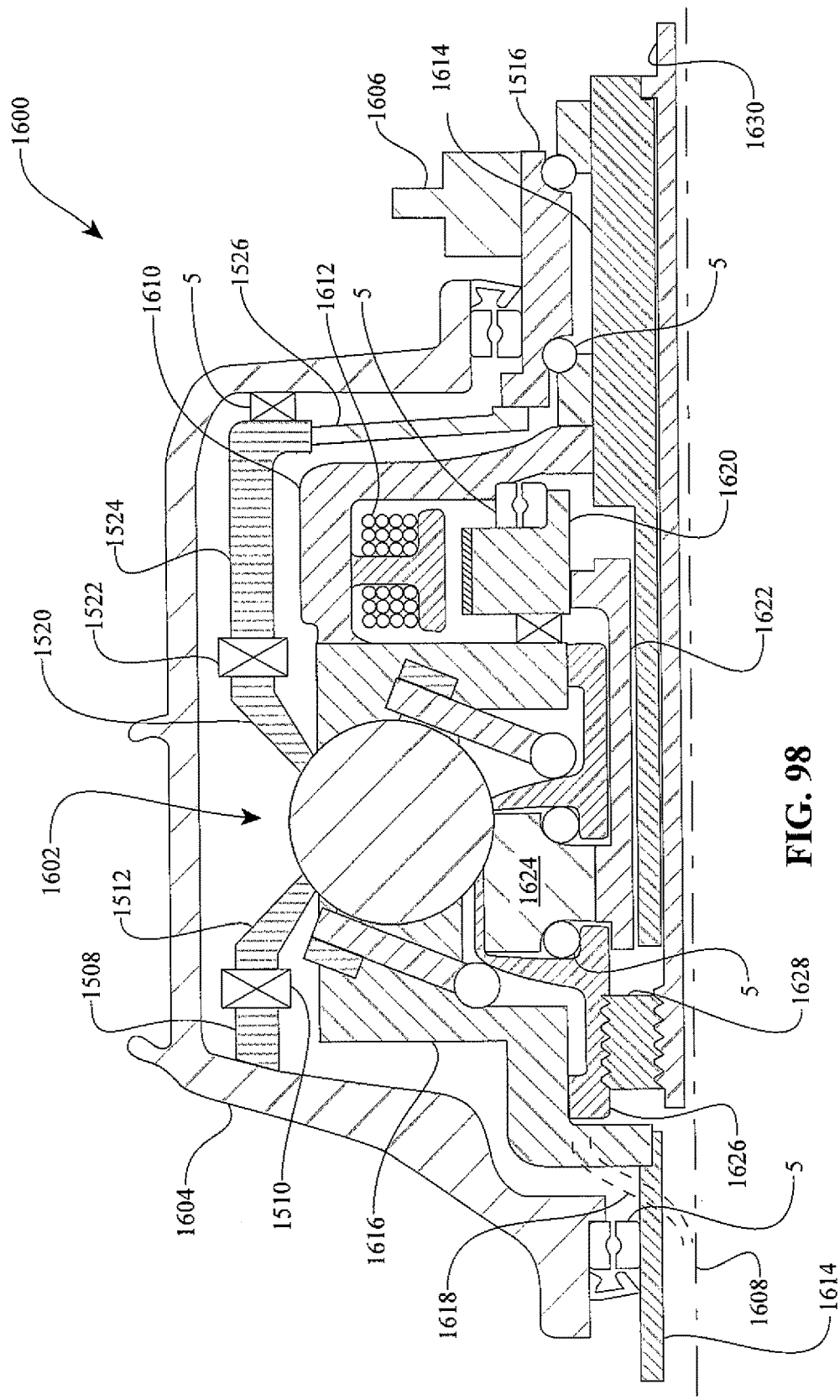
FIG. 98 is a cross-sectional view of one more embodiment of an electric traction drive.

Referencing FIG. 98 now, an electric traction drive 1600 includes a compound continuously variable planetary variator 1602 that is operationally coupled, in one embodiment, to a hub shell 1604 and to an input interface 1606. The hub shell 1604 is rotatable about a longitudinal axis 1608 of the electric traction drive 1600. A field windings frame 1610 is configured to support field windings 1612. The field windings frame 1610 can be rigidly coupled to a main axle 1614 and/or to a carrier 1616. In one embodiment, the carrier 1616 is rigidly coupled to the main axle 1614. In some embodiments, electrical cables 1618 are routed to the field windings 1612 through a bore of the main axle 1614 and through channels (not shown) of the carrier 1616. A permanent magnet rotor assembly 1620 can be adapted to cooperate with the field windings 1612 to provide generator/motor functionality. In one embodiment, the permanent magnet rotor assembly 1620 is located radially inward of the field windings 1612. The permanent magnet rotor assembly 1620 can be coupled by a sliding spline, for example, to a traction sun shaft 1622, which is coupled to a traction sun 1624 of the variator 1602. In some embodiments, a shift cam cage 1626 is adapted to couple to the carrier 1616 through, for example, sliding splines, which allow the shift cam cage 1626 to translate axially but not to rotate about the longitudinal axis 1608. To adjust the speed ratio of the electric traction drive 1600, a shift rod nut 1628 can be coupled to a shift rod 1630 and to the shift cam cage 1626. In one embodiment, the shift rod 1628 is adapted to rotate about its longitudinal axis to, thereby, cause the shift rod nut 1628 to translate axially, which causes an axial translation of the shift cam cage 1626.

Figure 99:
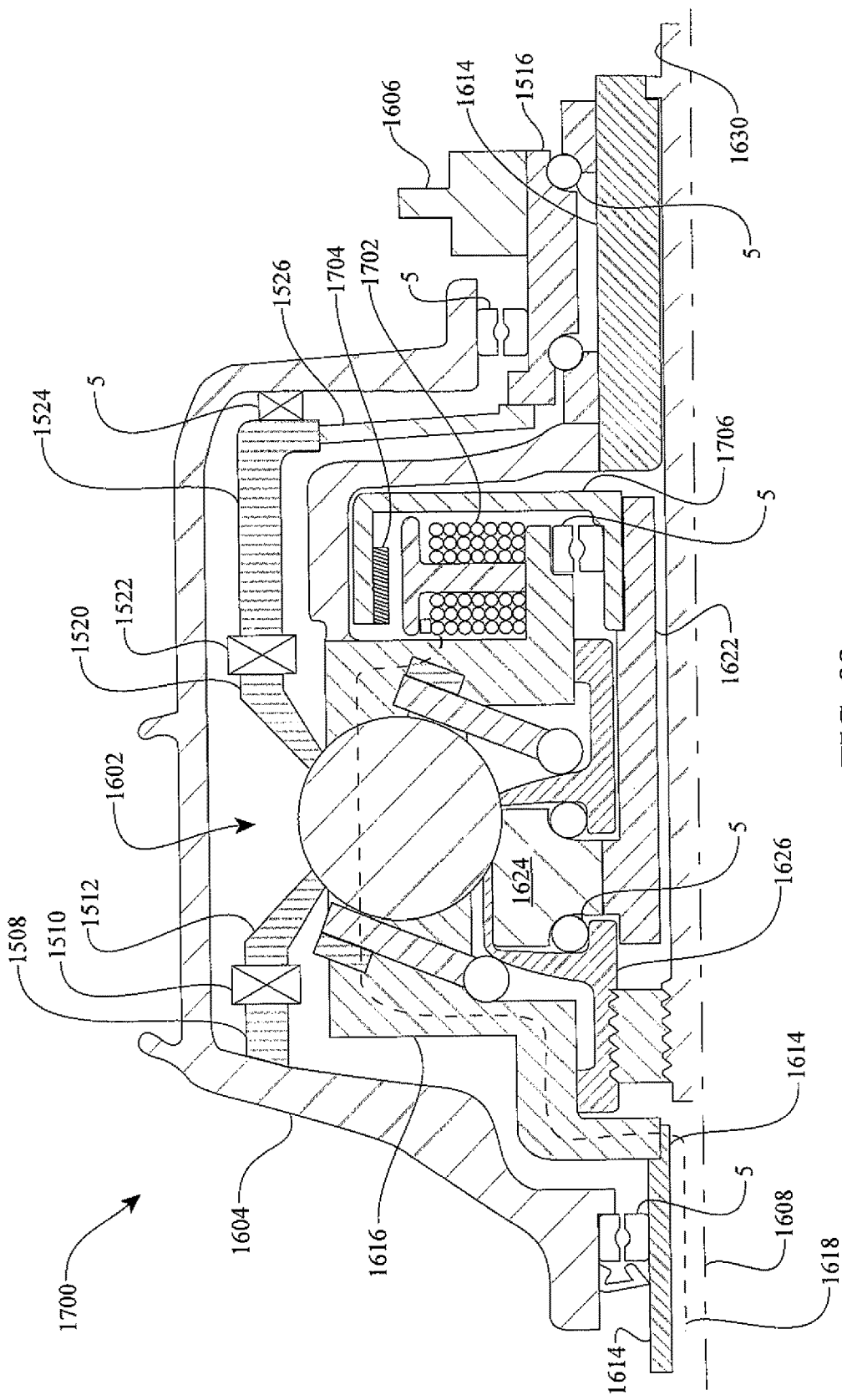
FIG. 99 is a cross-sectional view of yet another embodiment of an electric traction drive.

Turning to FIG. 99 now, another embodiment of an electric traction drive 1700 is illustrated. The electric traction drive 1700 is similar to the electric traction drive 1600; hence, only the differences will be described. In one embodiment, the electric traction drive 1700 includes fields windings 1702 rigidly coupled to the carrier 1616. A permanent magnet rotor assembly 1704 is configured to be rotatable about the longitudinal axis 1608. In some embodiments, the permanent magnet rotor assembly 1704 is located radially outward of the field windings 1702. A support frame 1706 can be adapted to support the permanent magnet rotor assembly 1704 and is coupled to a traction sun shaft 1622, which is adapted to couple to and transfer torque to the traction sun 1624. In one embodiment, the support frame 1706 couples to the traction sun shaft 1622 by a sliding spline, for example.

Figure 100:
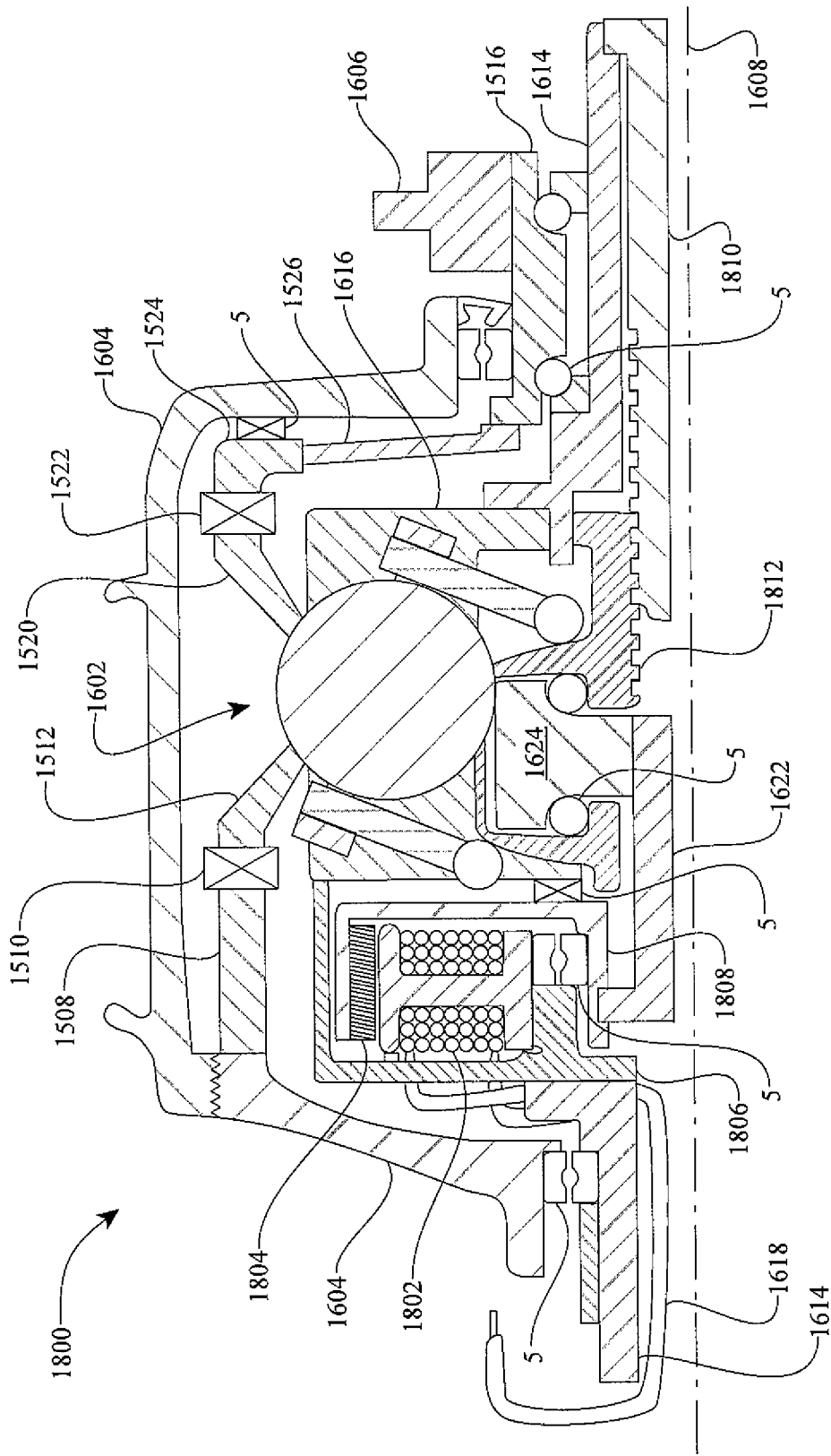
FIG. 100 is a cross-sectional view of another embodiment of an electric traction drive.

Referring to FIG. 100, yet another electric traction drive 1800 will be described now. The electric traction drive 1800 is similar to the electric traction drives 1600, 1700 previously discussed. In one embodiment, the electric traction drive 1800 includes field windings 1802 which are located radially inward of an array of magnets 1804. The field windings 1802 can be rigidly coupled to a windings support frame 1806, which can be rigidly coupled to the main axle 1604. In some embodiments, the windings support frame 1806 is rigidly coupled to the carrier 1616, which can be rigidly coupled to the main axle 1604. In the embodiment illustrated in FIG. 100, the main axle 1604 is fixed rotationally and axially relative to the longitudinal axis 1608. The array of magnets 1804 can be supported on a magnet support frame 1808 which is configured to be rotatable about the longitudinal axis 1608. A traction sun shaft 1622 can be coupled by a sliding spline, for example, to the magnet support frame 1808 to transfer torque from the magnet support frame 1808 to the traction sun 1624. The traction sun shaft 1622 can translate axially but does not rotate. It should be noted that in the electric traction drive 1800, as compared to the electric traction drive 1700 for example, the electrical cables 1618 need not be routed through the carrier 1616 to the field windings 1802. In some embodiments, to adjust the speed ratio of the electric traction drive 1800 a shift actuator 1810 can be coupled to a shift cam cage 1812 by a threaded coupling, for example. In one embodiment, the shift actuator 1810 is configured to rotate about its own longitudinal axis to, thereby, actuate an axial translation of the shift cam cage 1812. To prevent rotation of the shift cam cage 1812 about the longitudinal axis 1608, the shift cam cage 1812 can be coupled to the main axle 1614 or to the carrier 1616 by a sliding spline.

Figure 101:
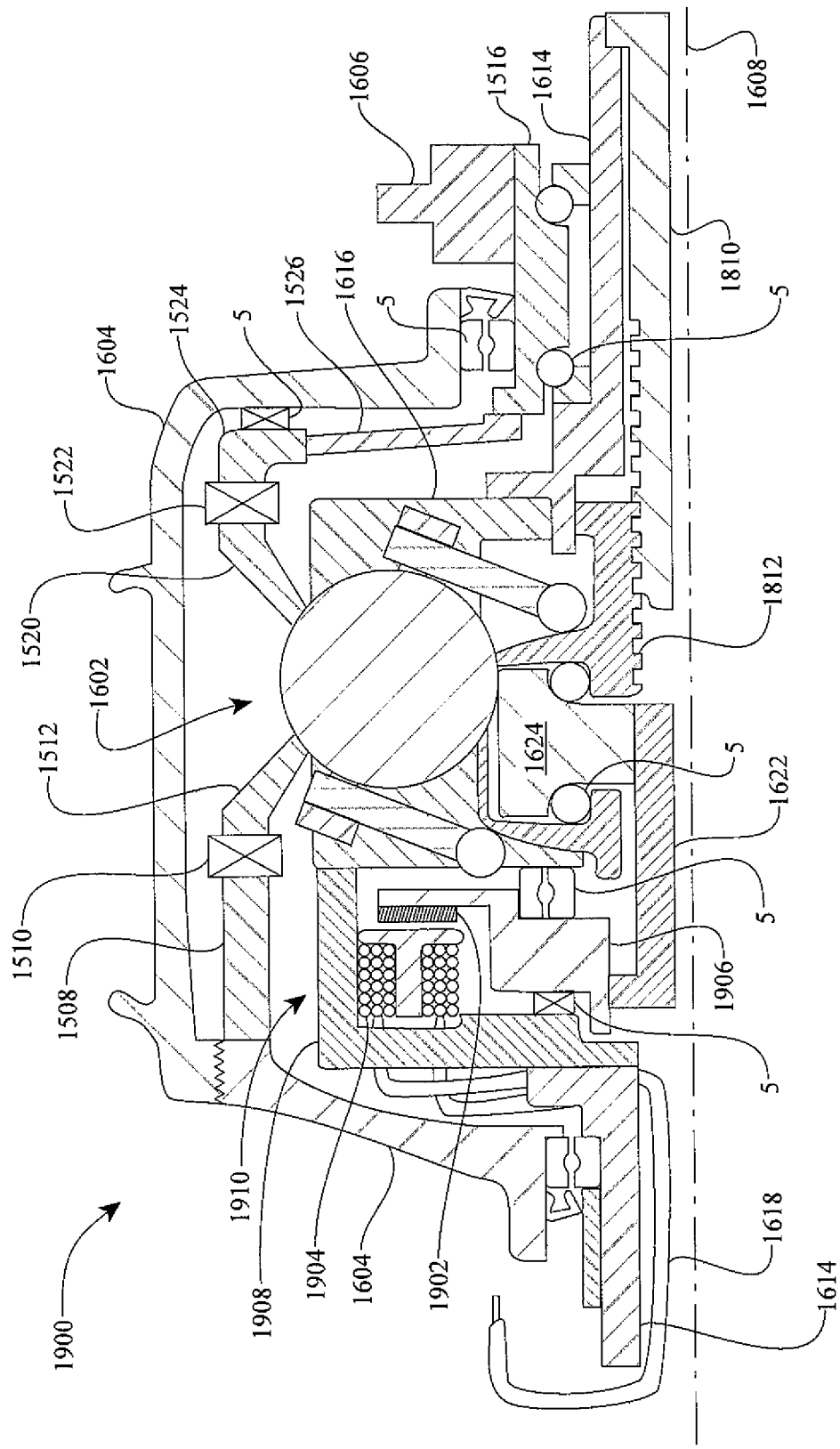
FIG. 101 is a cross-sectional view of one more embodiment of an electric traction drive.

As shown in FIG. 101, an electric traction drive 1900 is similar in certain respects to the electric traction drive 1800. The electric traction drive 1900 includes a permanent magnet rotor assembly 1902 positioned axially adjacent to a field windings 1904. The permanent magnet rotor assembly 1902 can be rigidly coupled to a magnet support frame 1906, which is rigidly rotationally coupled to the traction sun shaft 1622 by sliding splines, for example; the traction sun shaft 1622 is free to translate axially. The traction sun 1624 of a variator 1602 is rigidly coupled to the traction sun shaft 1622. In one embodiment, the field windings 1904 are rigidly coupled to a windings frame 1908, which can be rigidly coupled to the main axle 1614 and/or to the carrier 1616. It should be noted that in contrast to other embodiments described, the electric traction drive 1900 exhibits an axial air gap between the electromagnetic components (that is, field windings 1904 and magnets 1902) of the electromotive device 1910.

Figure 102:
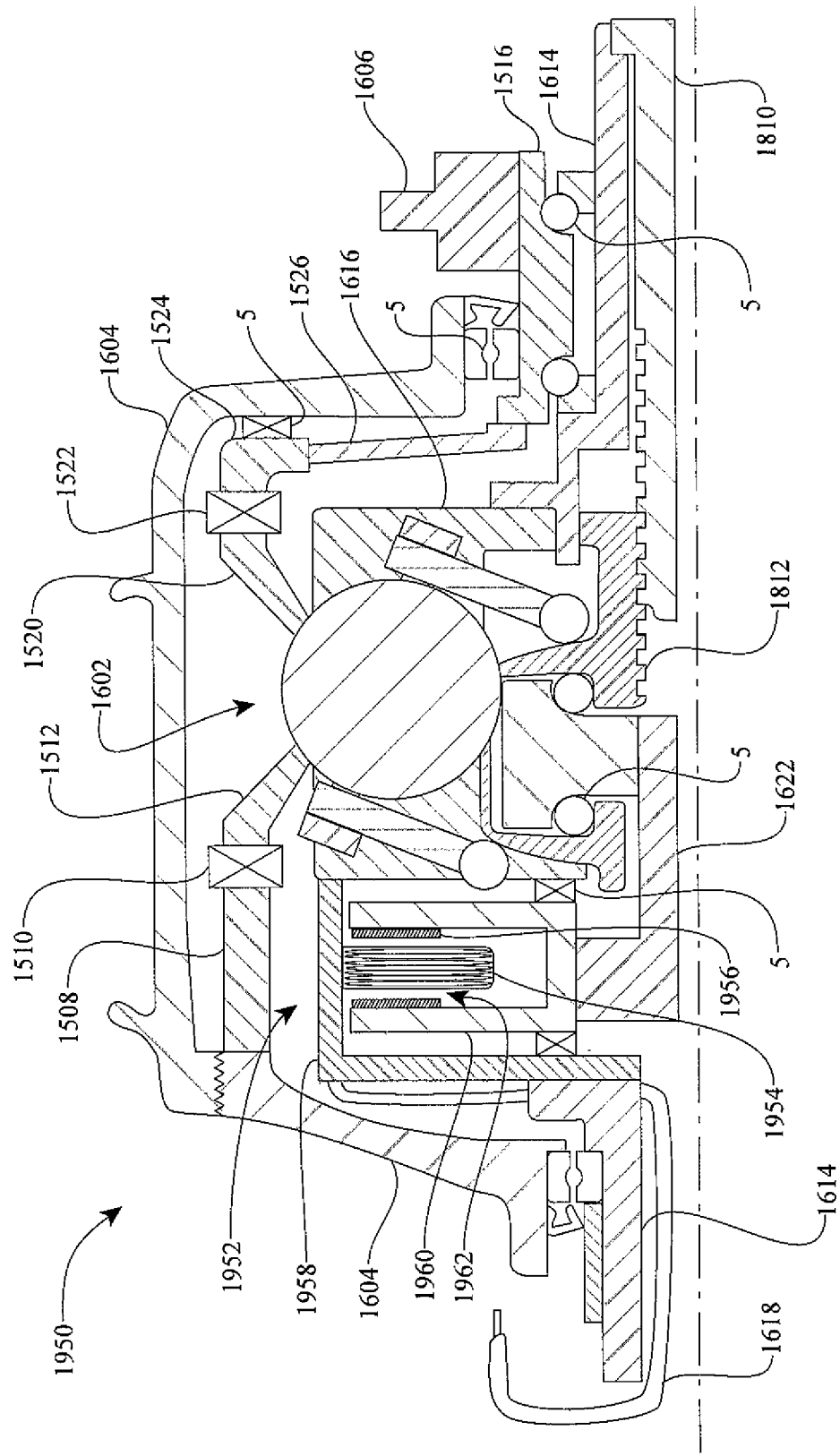
FIG. 102 is a cross-sectional view of yet another embodiment of an electric traction drive.

Yet another embodiment of an electric traction drive 1950 is shown in FIG. 102. The electric traction drive 1950 is similar in various respects to the electric traction drive 1900. In one embodiment, the electric traction drive 1950 includes a coreless, axial gap motor device 1952, which includes field windings 1954 and permanent magnets 1956. In some embodiments, the field windings 1954 are embedded in a resin and rigidly coupled to a field windings frame 1958. The permanent magnets 1956 can be rigidly coupled to a magnet support frame 1960, which is coupled to the traction sun shaft 1622 by, for example, a sliding spline that allows axial translation of the traction sun shaft 1622. The permanent magnets 1956 are placed such that there is an axial air gap between the permanent magnets 1956 and the field windings 1954. The field windings frame 1958 can be rigidly coupled to the main axle 1604 and/or to the carrier 1616. Throughout the various embodiments of components and assemblies described here, the reference label "5" is used to identify bearing elements that provide a rolling interface, thrust and/or radial support for, or between, components that are adjacent to each other.

Figure 103:
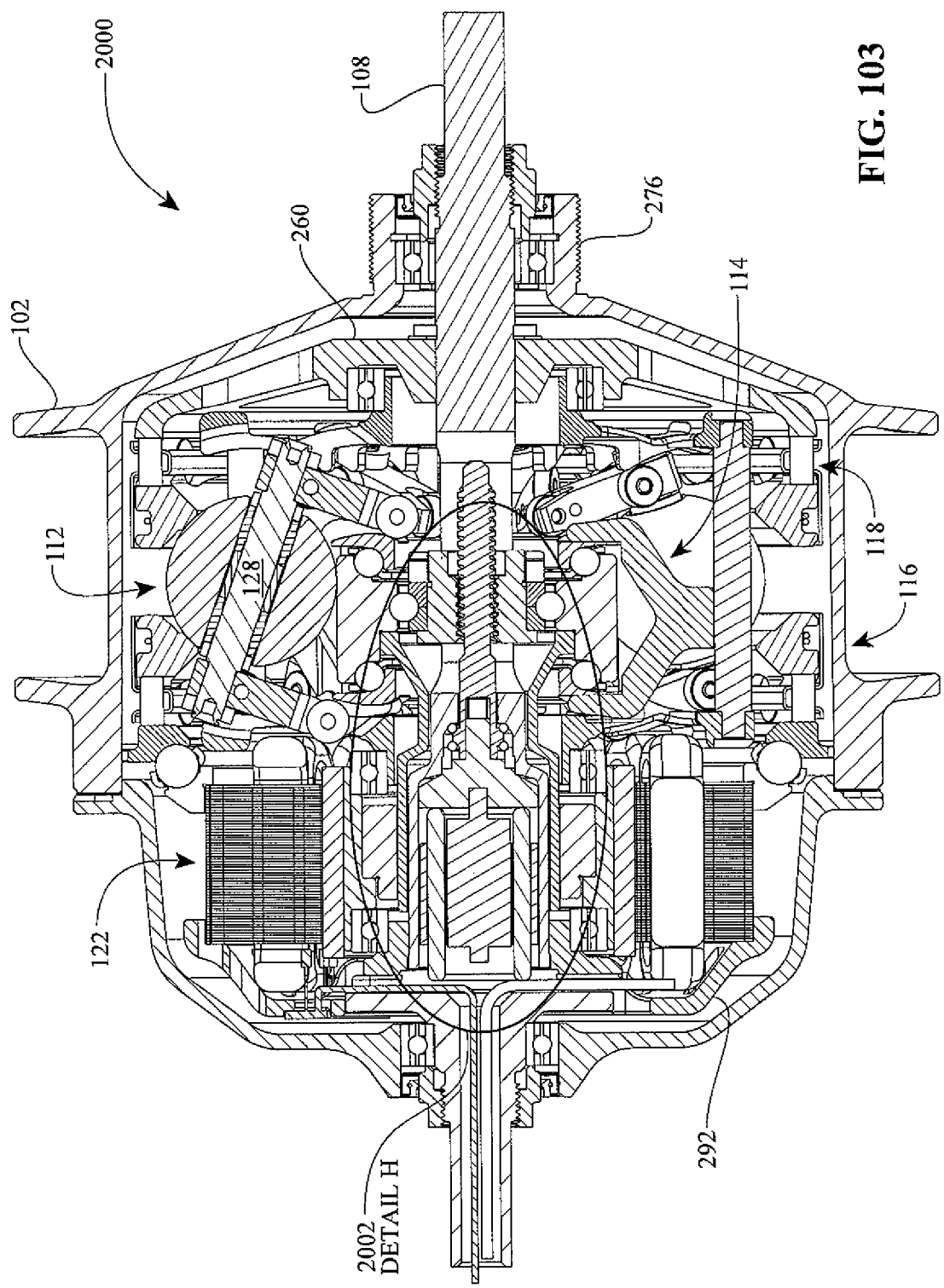
FIG. 103 is a cross-sectional view of another embodiment of an electric traction drive.
Figure 104:
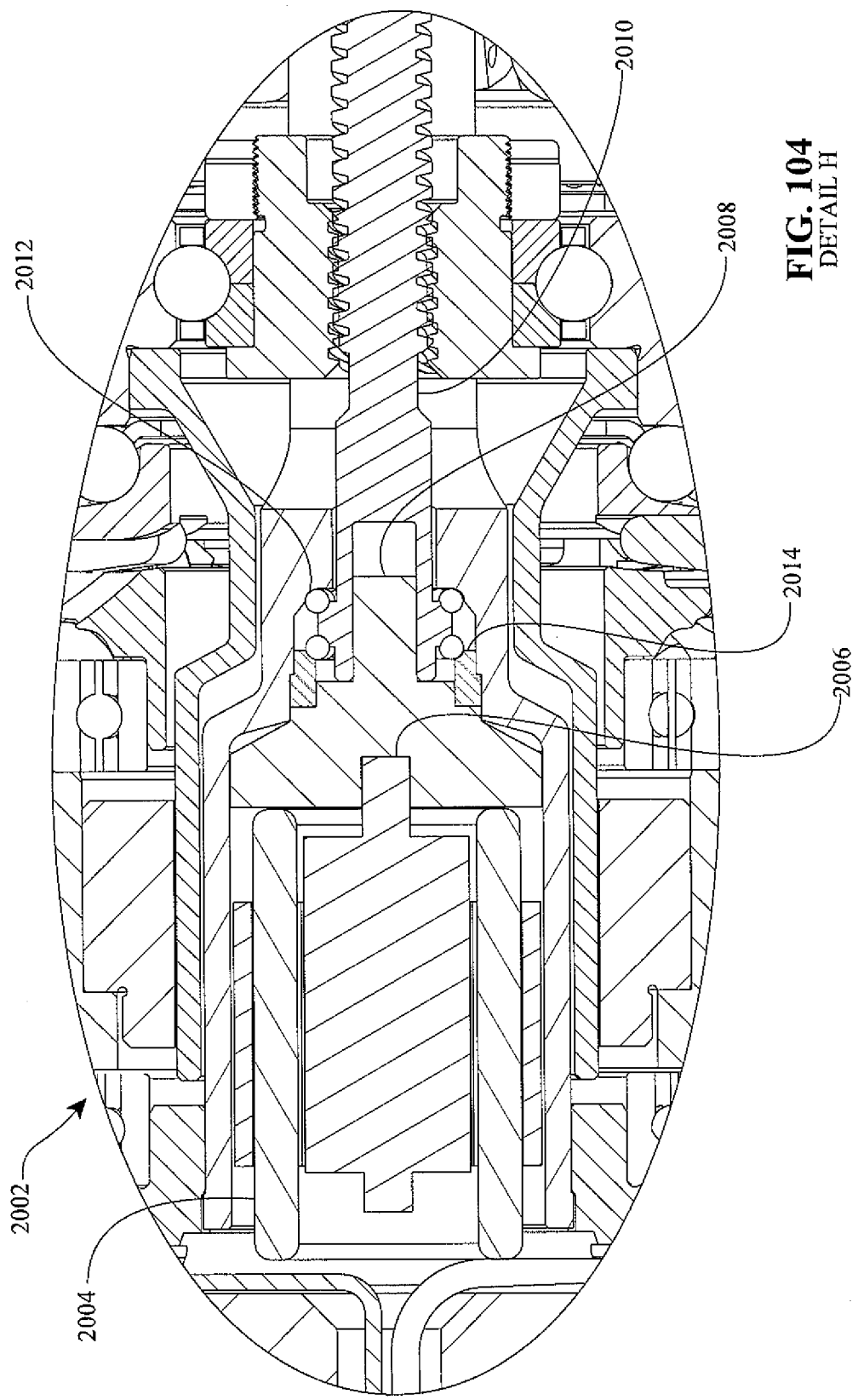
FIG. 104 is a Detail H view of the electric traction drive of FIG. 103, generally showing a speed ratio shift actuator.
Figure 105:
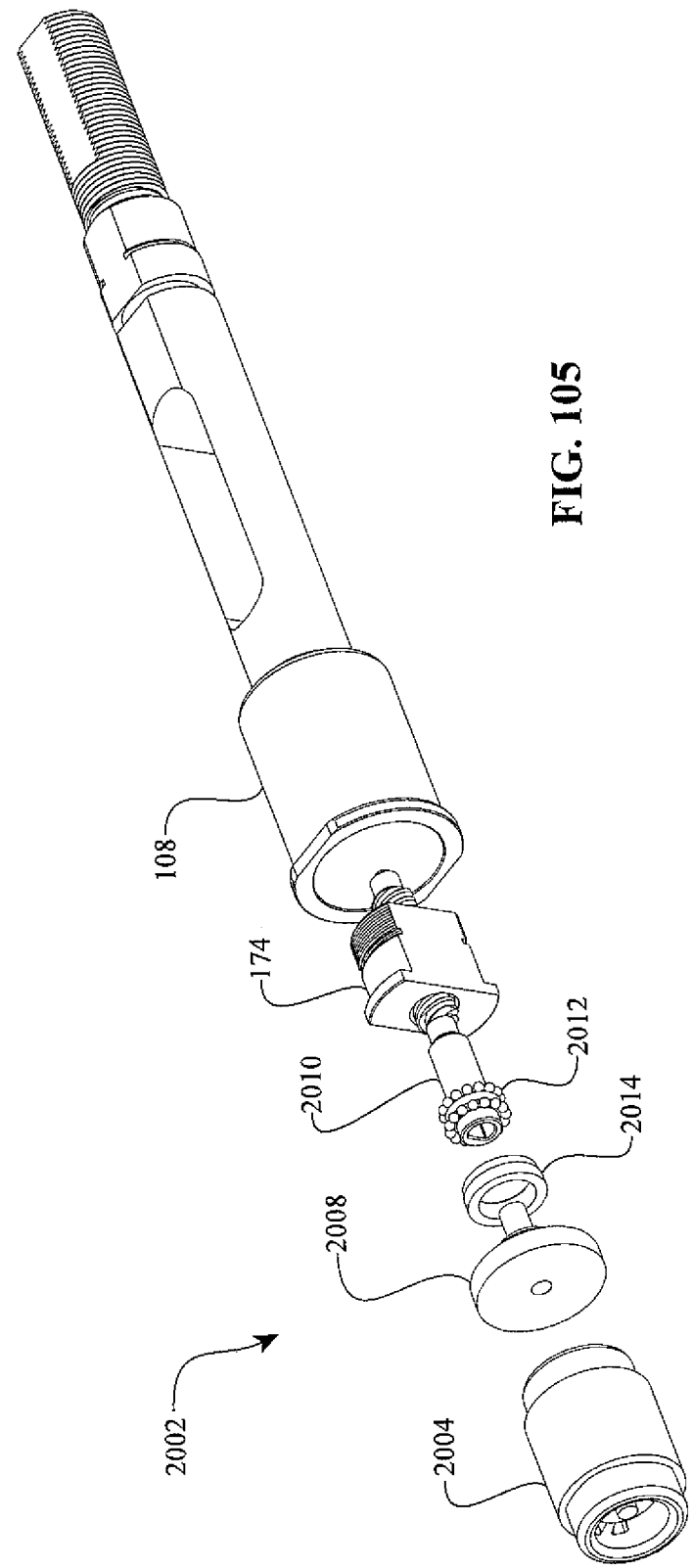
FIG. 105 is a partial exploded view of certain components of the speed ratio shift actuator of FIG. 104.

Passing to FIGS. 103-105 now, an electric traction drive 2000 is similar in various respects to the electric traction drive 100. In one embodiment, the electric traction drive 2000 includes a speed ratio shifter 2002 generally shown in Detail H of FIG. 103. In some embodiments, the shifter 2002 is generally received or housed within a cavity 421 (see FIG. 79) of the main axle 108. An electric motor 2004 can be rotationally fixed to the main axle 108. A rotor 2006 of the motor 2004 can be operationally coupled to a speed reducer assembly 2008. A shift rod 2010 can be operationally coupled to the speed reducer assembly 2008. In one embodiment, the shift rod 2010 is coupled to the shift rod nut 174 by, for example, an acme thread. The shift rod 2010 can be constrained axially by the main axle 108 through bearing assemblies 2012 and thrust races 2014. As previously explained, in one embodiment, the main axle 108 is configured to constrain the shift rod nut 174 rotationally. As the rotor 2006 rotates the shift rod 2010, the shift rod nut 174 is made to translate axially by its interaction with the shift rod 2010. Hence, activation of the electric motor 2004 results in an axial translation of the shift rod nut 174. As shown in FIG. 103, in one embodiment, the shift rod nut 174 is operationally coupled to traction-sun-and-shift-rod subassembly 112. Because the shift rod nut 174 is operationally coupled to the planet axles 128, axial translation of the shift rod nut 174 ultimately causes a tilt in the position of the planet axles 128, and thereby, a shift in the speed ratio of the electric traction drive 2000. In some embodiments, the electric motor 2004 can be controlled in such a manner to provide various speed ratio control schemes.

Figure 106:
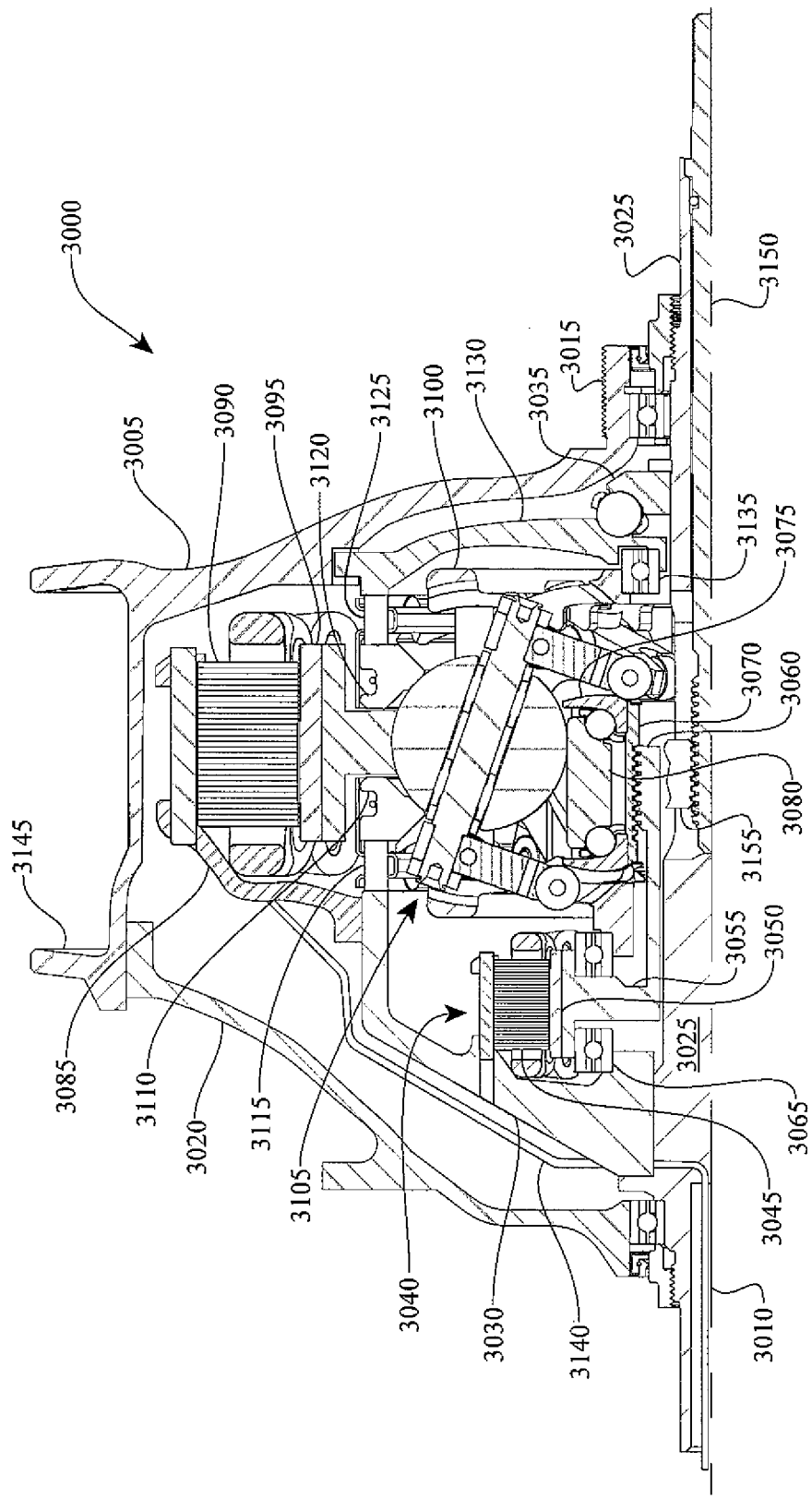
FIG. 106 is a cross-sectional view of yet another embodiment of an electric traction drive.

Referencing FIG. 106 now, an electric traction drive 3000 includes a housing 3005 adapted to be rotatable about a longitudinal axis 3010 of the electric traction drive 3000. In one embodiment, the housing 3005 is provided with a power input/output interface 3015, which can be a threaded coupling, for example, that receives a freewheel, freewheel adapter, sprocket, etc. In some embodiments, the housing 3005 can be adapted to couple to a housing cover 3020, which cooperates with the housing 3005 to enclose substantially all, or most of, the components of the electric traction drive 300. For some applications, a main axle 3025 is provided to, among other things, support a shift actuator frame 3030 and a thrust reaction bearing 3035. In one embodiment, a shifter actuator motor 3040 rigidly couples to the shifter actuator frame 3030, which is prevented from rotating about the axis 3010 or translating axially by the main axle 3025. In some embodiments, a field windings assembly 3045 is coupled rigidly to the shifter actuator frame 3030. In one application, a magnet assembly 3050 is placed radially inward of the field windings assembly 3045 to, thereby, form a motorized shifter actuator for facilitating the adjustment of the speed ratio of the electric traction drive 300. The magnet assembly 3050 is adapted to rotate about the axis 3010.

In one embodiment, the magnet assembly 3050 rigidly couples to a shifter shaft 3055 that is rigidly coupled to a shift screw 3060. In some cases, the shifter shaft 3055 and the shifter screw 3060 are formed as a single piece. The shifter shaft 3055 can be supported and/or located by, for example, angular thrust bearings 3065. In some embodiments, the shifter screw 3060 couples to a shifter bushing 3070 that includes mating threads for engaging the shifter screw 3060. The shifter bushing 3070 can couple to shift cams 3075 to, thereby, produced an axial translation of a traction sun 3080. In some cases, the shifter bushing 3070 and one or both of the shift cams 3075 are, at least partially, formed as a single piece. Actuation of the shifter actuator motor 3040 produces an axial translation of the traction sun 3080.

In one embodiment, a drive motor support 3080 rigidly couples to a motor support frame 3085, which is preferably adapted to provide axial, radial, and anti-rotation support for a drive windings assembly 3090. In some embodiments, the drive windings assembly 3090 is located radially outward of a drive magnet assembly 3095, which is coupled to a carrier 3100. As illustrated in FIG. 106, in some cases, the drive windings 3090 and the drive magnet assembly 3095 are placed substantially coaxially with, radially outward of, axially aligned with a traction planet assembly 3105. In some embodiments, a traction ring 3110 and a load cam assembly 3115 are operationally coupled to the shifter actuator frame 3030 and/or to the motor support frame 3085 in such a way that the traction ring 3110 is substantially nonrotatable about the axis 3010. A traction ring 3120 and a load cam assembly 3125 can be operationally coupled to the planet assembly 3105. A drive plate 3130 can be adapted to transfer torque between the load cam assembly 3125 and the housing 3005. In one application, a bearing 3135 provides a rolling interface between the drive plate 3130 and the carrier 3100. In some embodiments, electrical conductors 3140 can be routed through a portion of the main axle 3025 and/or the shifter actuator frame 3030 and connected to the drive field windings 3090.

During operation, electrical power can be provided to the field windings 3090 via the electrical conductors 3140. This energizes the field windings 3090 and results in the driving of the drive magnet assembly 3095 about the axis 3010. Since the carrier 3100 is coupled to the drive magnet assembly 3095, and the traction planets assembly 3105 is coupled to the carrier 3100, mechanical power flows from the drive magnet assembly 3095 to the traction planets assembly 3105. The traction ring 3110 is rotationally fixed;

hence, the traction ring 3110 does not transfer power and only reacts the rolling of the planets of the traction planets assembly 3105. Mechanical power flows from the traction planets assembly 3105 to the traction ring 3120, load cam assembly 3125, drive plate 3130, and housing 3005. Power can then be transferred from the housing 3005 via the power input/output interface 3015 and/or housing flanges or spokes 3145. It should be noted that the direction of power flow just described can be reversed, in some applications, such that mechanical power can be applied the housing 3005 and electrical energy can be, thereby, produced at the drive field windings 3090; the electrical energy can then be delivered out of the electric traction drive 3000 via the electrical conductors 3140. Hence, the electric traction drive 3000 can be operated either as a device that receives electrical power and converts it to mechanical power, or as a device that receives mechanical power and converts at least some of that mechanical power to electrical power. Of course, in some embodiments, the electric traction drive 3000 can be alternatively operated, that is switched back and forth, between the motoring function and the electricity generating function.

The electric traction drive 3000 can be used in any mechanical context in which modulation between a power input and a power output is implemented. A preferred use of the electric traction drive 3000 is an electrical motor assisted bicycle, in which a rider (or vehicle automatic control) can actuate the drive windings 3090 to provide assistive mechanical power to the rider. Alternatively, or in addition, the power from the rider can be taken via the electric traction drive to generate electricity to actuate, among other things, the shifter actuator motor 3040 and/or other bicycle components. In one case, the electric traction drive 3000 is conveniently sized to fit within the standard width of certain bicycle dropouts (for example, the dropout width is preferably 130-170 mm, more preferably 140-165 mm, and most preferably 150-160 mm). It should be noted that, in some embodiments, the electric traction drive 3000 need not include the shifter actuator motor 3040, but instead, the speed ratio of the electric traction drive 3000 can be actuated via any of the previously discussed speed ratio adjustment mechanisms including, but not limited to, the shift rod 3150 and shift rod nut 3155. In such embodiments, the electric traction drive 3000 can be sized to fit the widths of bicycle dropouts at the lower range of widths (for example, preferably 80 mm-135 mm, more preferably 90-120 mm, and most preferably 100-110 mm).

The foregoing description details certain inventive embodiments. It will be appreciated, however, that no matter how detailed the foregoing appears in text, the inventions disclosed here can be practiced in many ways. It should be noted that the use of particular terminology when describing certain features or aspects of the inventive embodiments should not be taken to imply that the terminology is being redefined herein to be restricted to including any specific characteristics of the features or aspects of the invention with which that terminology is associated.

I claim:

1. An electric traction drive comprising:
   a main axle defining a longitudinal axis;
   a plurality of traction planets distributed radially about the main axle, each traction planet configured to rotate about a planet axle, each planet axle providing a tiltable axis of rotation, wherein an adjustment of a tilt angle of the planet axle adjusts a speed ratio of a continuously variable variator;
   a first traction ring positioned on a first side of the plurality of traction planets;
   a second traction ring positioned on a second side of the plurality of traction planets;
   a traction sun rotatable about the main axle and positioned radially inward of the plurality of traction planets, the traction sun capable of transferring power to or from the plurality of traction planets;
   a housing rotatable about the longitudinal axis;
   a carrier coupled to the main axle;
   a set of electrical cables routed through a portion of the continuously variable variator;
   a set of non-rotatable field windings coupled to the set of electrical cables; and
   a set of magnets located radially outward of the set of field windings, the set of magnets being rotatable relative to the main axle, wherein the first traction ring, the plurality of traction planets, and the second traction ring form a first power path to the housing, and wherein the electrical cables, the set of non-rotatable field windings, the set of magnets, and the carrier form a second power path.

2. The electric traction device of claim 1, wherein the set of electrical cables are routed through a hollow portion of the main axle.

3. The electric traction device of claim 1, wherein the set of electrical cables are routed through the housing.

4. The electric traction device of claim 1, wherein the set of non-rotatable field windings are rigidly coupled to the main axle.

5. The electric traction device of claim 4, wherein the set of non-rotatable field windings are rigidly coupled to the carrier, the carrier being rigidly coupled to the main axle.

6. The electric traction device of claim 1, wherein the first power path includes a load cam assembly and a load cam driver, and wherein the set of magnets is coupled to the load cam driver.

7. The electric traction device of claim 6, wherein the first power path includes a load cam drive plate coupled to the housing.

8. The electric traction device of claim 1, wherein the second power path includes an electric power source.

9. The electric traction device of claim 1, wherein the second power path includes an electric power load.

10. A vehicle comprising:
    a mechanical power source;
    an electric power source;
    an electric traction drive for transferring power from the mechanical power source and the electric power source into a single output power source, the electric traction device comprising:
    a main axle defining a longitudinal axis;
    a plurality of traction planets distributed radially about the main axle, each traction planet configured to rotate about a planet axle, each planet axle providing a tiltable axis of rotation, wherein an adjustment of a tilt angle of the planet axle adjusts a speed ratio of a continuously variable variator;
    a first traction ring positioned on a first side of the plurality of traction planets;
    a second traction ring positioned on a second side of the plurality of traction planets;
    a traction sun rotatable about the main axle and positioned radially inward of the plurality of traction planets, the traction sun capable of transferring power to or from the plurality of traction planets;
    a housing rotatable about the longitudinal axis;

a carrier coupled to the main axle;
a set of electrical cables routed through a portion of the continuously variable variator;
a set of non-rotatable field windings coupled to the set of electrical cables; and
a set of magnets located radially outward of the set of field windings, the set of magnets being rotatable relative to the main axle, wherein the first traction ring, the plurality of traction planets, and the second traction ring form a first power path to the housing, and wherein the electrical cables, the set of non-rotatable field windings, the set of magnets, and the carrier form a second power path.

11. The vehicle of claim 10, wherein the set of electrical cables are routed through a hollow portion of the main axle.

12. The vehicle of claim 10, wherein the set of electrical cables are routed through the housing.

13. The vehicle of claim 10, wherein the set of non-rotatable field windings are rigidly coupled to the main axle.

14. The vehicle of claim 13, wherein the set of non-rotatable field windings are rigidly coupled to the carrier, the carrier being rigidly coupled to the main axle.

15. The vehicle of claim 10, wherein the first power path includes a load cam assembly and a load cam driver, and wherein the set of magnets is coupled to the load cam driver.

16. The vehicle of claim 15, wherein the first power path includes a load cam drive plate coupled to the housing.

17. The vehicle of claim 10, wherein the mechanical power source comprises a bicycle component.

18. The vehicle of claim 10, wherein the second power path includes an electric power source.

19. The vehicle of claim 10, wherein the second power path includes an electric power load.

* * * * *